US012731945B2

(12) United States Patent
Sarault

(10) Patent No.: US 12,731,945 B2
(45) Date of Patent: Sep. 8, 2026

(54) ACCESS CONTROL ASSEMBLY, SYSTEM, AND METHOD FOR CONTROLLING ACCESS TO A PLUG END OF A POWER PLUG ASSEMBLY

(71) Applicant: The Boeing Company, Arlington, VA (US)

(72) Inventor: Mark W. Sarault, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 340 days.

(21) Appl. No.: 18/516,931

(22) Filed: Nov. 21, 2023

(65) Prior Publication Data

US 2025/0167492 A1 May 22, 2025

(51) Int. Cl.
*H01R 13/639* (2006.01)
*H01R 13/447* (2006.01)

(52) U.S. Cl.
CPC ....... *H01R 13/6397* (2013.01); *H01R 13/447* (2013.01)

(58) Field of Classification Search
CPC . H01R 13/6397; H01R 13/447; H01R 13/639
USPC ................................ 439/133, 369, 372, 373
See application file for complete search history.

(56) References Cited

U.S. PATENT DOCUMENTS 4,169,643 A * 10/1979 Gallagher .......... H01R 13/6392 439/369
4,550,966 A 11/1985 Riley
4,750,898 A * 6/1988 Soulard ................. F16B 41/005 439/304
5,052,939 A * 10/1991 Koch ................. H01R 13/6397 439/304
5,139,429 A * 8/1992 Herman ................. H01R 13/60 439/368
7,101,201 B1 9/2006 McCollum
7,425,146 B2 * 9/2008 Valentin ............. H01R 13/6397 439/304

(Continued)

FOREIGN PATENT DOCUMENTS

FR 2732165 A1 9/1996

OTHER PUBLICATIONS

Extended European Search Report (EESR), European Patent Office, Mar. 31, 2025, for counterpart Application No. EP24211352.0, Applicant The Boeing Company, 14 pages.

*Primary Examiner* — Gary F Paumen

(57) ABSTRACT

There is provided an access control assembly for controlling access to a plug end of a power plug assembly. The access control assembly includes a hinged ring having a first portion pivotably connected to a second portion, so that the first portion pivots toward and away from the second portion to close and open the hinged ring. The first portion and the second portion each has one or more lockout holes. The access control assembly includes one or more locking elements, a cap having an internal cavity and an exterior lip, and a cap connector element. The access control assembly controls access to the plug end of the power plug assembly by preventing connection of the plug end when the plug end is in an unplugged position, and by preventing disconnection of the plug end when the plug end is plugged into a power outlet in a plugged-in position.

20 Claims, 29 Drawing Sheets

(56) References Cited

U.S. PATENT DOCUMENTS

| | | | | |
|---|---|---|---|---|
| 2007/0207645 | A1* | 9/2007 | Valentin | H01R 13/5812 439/133 |
| 2012/0064744 | A1* | 3/2012 | Messner | H01R 13/44 439/133 |
| 2015/0099379 | A1* | 4/2015 | Borden | H01R 13/44 439/147 |

* cited by examiner

ACCESS CONTROL ASSEMBLY, SYSTEM, AND METHOD FOR CONTROLLING ACCESS TO A PLUG END OF A POWER PLUG ASSEMBLY

FIELD

The present disclosure relates generally to access control devices, systems, and methods, and more particularly to access control devices, systems, and methods for controlling access to a plug end of a power cord, to prevent disconnection from and connection to a power outlet.

BACKGROUND

Access control devices, systems, and methods can be used to control connection and disconnection of plug ends of power cords to and from power outlets connected to power sources, such as power carts, power generators, and other types of power sources. For example, such access control devices, systems, and methods can be used to ensure only qualified personnel can connect and disconnect plug ends of power cords to and from power outlets connected to power carts used to provide power to aircraft during maintenance or service. Power carts may take several minutes to power down after they are shut off. Improper disconnection of the plug ends of the power cords from the power outlets connected to the power carts may pose a risk of an arc flash if proper power down procedures are not followed.

Known access control devices, systems, and methods exist. Known access control devices include box-type plug lockout devices used to lock out a wide range of large corded plugs, to prevent energization and powering of equipment during maintenance or service. However, such known box-type plug lockout devices are bulky in size and only lock over a plug when it is in a disconnected state, to keep the plug from being plugged into a power outlet connected to a power source. Moreover, such known box-type plug lockout devices do not address locking out access and preventing disconnection of a plug end of a power cord from a power outlet connected to a power source, such as a power cart.

Accordingly, there is a need in the art for an improved access control assembly, system, and method for preventing both connection and disconnection of a plug end of a power plug assembly to and from a power outlet connected to a power source, such as a power cart or other power source, that secure a plug end of a power plug assembly in both a plugged-in position and an unplugged position, that lock a plug end of a power plug assembly to a power outlet connected to a power source, to prevent a risk of an arc flash or an electrical shock from unintentional disconnection of the plug end, that ensure only qualified personnel can connect and disconnect plug ends of power plug assemblies or power cords to and from power outlets connected to power carts used to provide power to a vehicle such as an aircraft, that allow for clearance of a hinged power outlet cover plate connected to a power outlet, when a plug end is plugged into the power outlet, that provide an improved access control device that is smaller and lighter weight as compared to known devices, and that provide other advantages over known assemblies, devices, systems, and methods.

SUMMARY

Example implementations of the present disclosure provide for an improved access control assembly, system, and method for controlling access to a plug end of a power plug assembly. As discussed in the below detailed description, versions of the improved assembly, system, and method may provide significant advantages over known assemblies, devices, systems, and methods.

In a version of the disclosure, there is provided an access control assembly for controlling access to a plug end of a power plug assembly. The access control assembly comprises a hinged ring having a first portion pivotably connected to a second portion, via a hinge pin at a hinged end, so that the first portion pivots toward and away from the second portion to close and open the hinged ring. The first portion and the second portion each has one or more lockout holes formed through an outer tab at a non-hinged end, and the second portion has an interior concave recessed portion and a cap attachment hole, wherein when the hinged ring is in a closed position, the first portion and the second portion define a circular opening, the outer tabs of the first portion and the second portion abut against each other, and the one or more lockout holes of the first portion and the second portion are aligned as aligned lockout holes.

The access control assembly further comprises one or more locking elements configured to be inserted through the one or more aligned lockout holes of the first portion and the second portion, to lock the hinged ring in the closed position. The access control assembly further comprises a cap having an internal cavity with an interior ridge and having an exterior lip around a first end of the cap. The exterior lip has an attachment point tab extending outwardly from the exterior lip. The access control assembly further comprises a cap connector element having a first end connected to the attachment point tab of the cap and having a second end connected to the cap attachment hole on the second portion of the hinged ring.

The access control assembly controls access to the plug end of the power plug assembly, by preventing connection of the plug end to a power outlet, when the plug end is in an unplugged position with the cap covering the plug end, and the hinged ring is locked around the plug end and around an exterior portion of the cap, and by preventing disconnection of the plug end from the power outlet, when the plug end is plugged into the power outlet in a plugged-in position and the hinged ring is locked around the plug end and around an exterior portion of the power outlet.

In another version of the disclosure, there is provided an access control system for controlling access to a plug end of a power plug assembly. The access control system comprises a power outlet. The access control system further comprises the power plug assembly comprising a plug with the plug end configured to be plugged into the power outlet in a plugged-in position to create an electrical connection. The power plug assembly further comprises a power cord, and a coupling element coupling the power cord to the plug.

The access control system further comprises an access control assembly. The access control assembly comprises a hinged ring having a first portion pivotably connected to a second portion, via a hinge pin at a hinged end, so that the first portion pivots toward and away from the second portion to close and open the hinged ring. The first portion and the second portion each has one or more lockout holes formed through an outer tab at a non-hinged end, and the second portion has an interior concave recessed portion and a cap attachment hole, wherein when the hinged ring is in a closed position, the first portion and the second portion define a circular opening, the outer tabs of the first portion and the second portion abut against each other, and the one or more lockout holes of the first portion and the second portion are aligned as aligned lockout holes.

The access control assembly further comprises one or more locking elements configured to be inserted through the one or more aligned lockout holes of the first portion and the second portion, to lock the hinged ring in the closed position. The access control assembly further comprises a cap having an internal cavity with an interior ridge and an exterior lip around a first end of the cap. The exterior lip has an attachment point tab extending outwardly from the exterior lip.

The access control assembly further comprises a cap connector element having a first end connected to the attachment point tab of the cap and having a second end connected to the cap attachment hole on the second portion of the hinged ring. The access control assembly controls access to the plug end of the power plug assembly by preventing disconnection of the plug end from the power outlet, when the plug end is plugged into the power outlet in the plugged-in position and the hinged ring is locked around the plug end and around an exterior portion of the power outlet.

In another version of the disclosure, there is provided a method for controlling access to a plug end of a power plug assembly using an access control assembly. The method comprises the step of providing the access control assembly. The access control assembly comprises a hinged ring having a first portion pivotably connected to a second portion, via a hinge pin at a hinged end, so that the first portion pivots toward and away from the second portion to close and open the hinged ring. The first portion and the second portion each has one or more lockout holes formed through an outer tab at a non-hinged end, and the second portion has an interior concave recessed portion and a cap attachment hole, wherein when the hinged ring is in a closed position, the first portion and the second portion define a circular opening, the outer tabs of the first portion and the second portion abut against each other, and the one or more lockout holes of the first portion and the second portion are aligned as aligned lockout holes.

The access control assembly further comprises one or more locking elements configured to be inserted through the one or more aligned lockout holes of the first portion and the second portion, to lock the hinged ring in the closed position. The access control assembly further comprises a cap having an internal cavity with an interior ridge and having an exterior lip around a first end of the cap. The exterior lip has an attachment point tab extending outwardly from the exterior lip. The access control assembly further comprises a cap connector element having a first end connected to the attachment point tab of the cap and having a second end connected to the cap attachment hole on the second portion of the hinged ring.

The method further comprises the step of covering the plug end of the power plug assembly with the cap when the plug end is in an unplugged position. The method further comprises the step of locking the hinged ring of the access control assembly in the closed position around the plug end and around an exterior portion of the cap, to prevent connection of the plug end to a power outlet.

The method further comprises the step of unlocking the hinged ring from around the plug end and from around the exterior portion of the cap, and removing the cap from the plug end, when connection of the plug end to the power outlet is desired. The method further comprises the step of plugging the plug end of the power plug assembly into the power outlet, so that the plug end is in a plugged-in position to create an electrical connection. The method further comprises the step of locking the hinged ring of the access control assembly in the closed position around the plug end and around an exterior portion of the power outlet, to prevent disconnection of the plug end from the power outlet, when the plug end is plugged into the power outlet in the plugged-in position.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
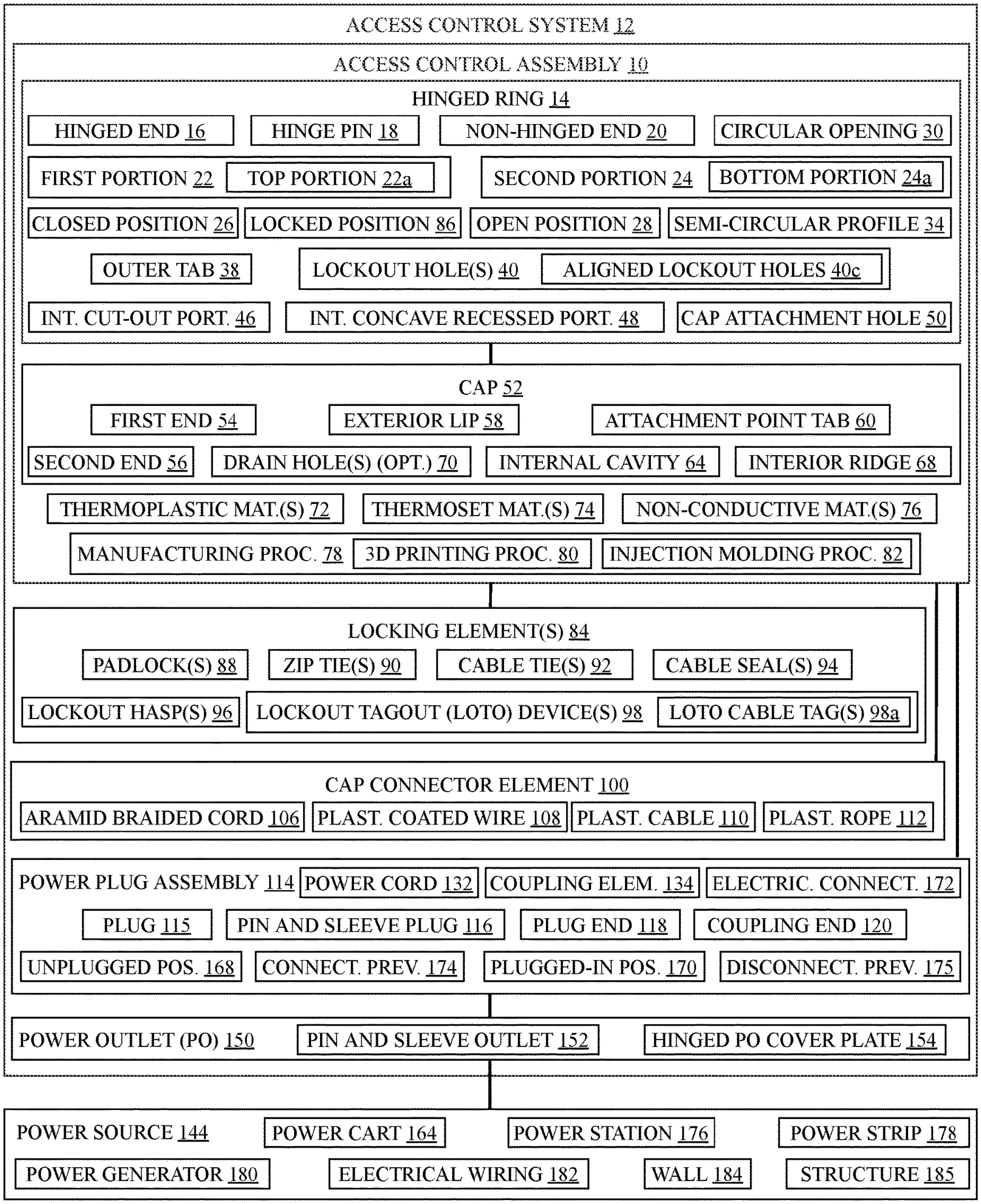
FIG. 1 is an illustration of a block diagram of an exemplary access control assembly that is part of an exemplary access control system of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to “one version” or “a version”. The instances of the phrases “one version” or “a version” do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, “comprising” is an open-ended term, and as used in the claims, this term does not foreclose additional structures or steps.

As used herein, “configured to” means various parts or components may be described or claimed as “configured to” perform a task or tasks. In such contexts, “configured to” is used to connote structure by indicating that the parts or components include structure that performs those task or tasks during operation. As such, the parts or components can be said to be configured to perform the task even when the specified part or component is not currently operational (e.g., is not on).

As used herein, the terms “first”, “second”, etc., are used as labels for nouns that they precede, and do not imply any type of ordering (e.g., spatial, temporal, logical, etc.).

As used herein, an element or step recited in the singular and preceded by the word “a” or “an” should be understood as not necessarily excluding the plural of the elements or steps. As used herein, the term “and/or” includes any and all combinations of one or more of the associated listed items. As also used herein, the term “combinations thereof” includes combinations having at least one of the associated listed items, wherein the combination can further include additional, like non-listed items.

As used herein, the phrase “at least one of,” when used with a list of items, means different combinations of one or more of the listed items may be used, and only one of each item in the list may be needed. In other words, “at least one of” means any combination of items and number of items may be used from the list, but not all of the items in the list are required. The item may be a particular object, a thing, or a category.

Now referring to FIG. 1, FIG. 1 is an illustration of a block diagram of an exemplary access control assembly 10 that is part of an exemplary access control system 12 of the disclosure. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustration of the exemplary access control assembly 10 that is part of the exemplary access control system 12 in FIG. 1 is not meant to imply physical or architectural limitations to the manner in which an illustrative example may be implemented. Other components in addition to, or in place of, the ones illustrated may be used. Some components may be unnecessary.

As shown in FIG. 1, the access control system 12 comprises the access control assembly 10. As shown in FIG. 1, the access control assembly 10 comprises a hinged ring 14 having a hinged end 16 with a hinge pin 18, and having a non-hinged end 20 opposite the hinged end 16. The hinged ring 14 has a clamshell configuration 21 (see FIGS. 2A, 3A), or clamshell design that opens and closes at the hinged end 16.

Figure 2B:
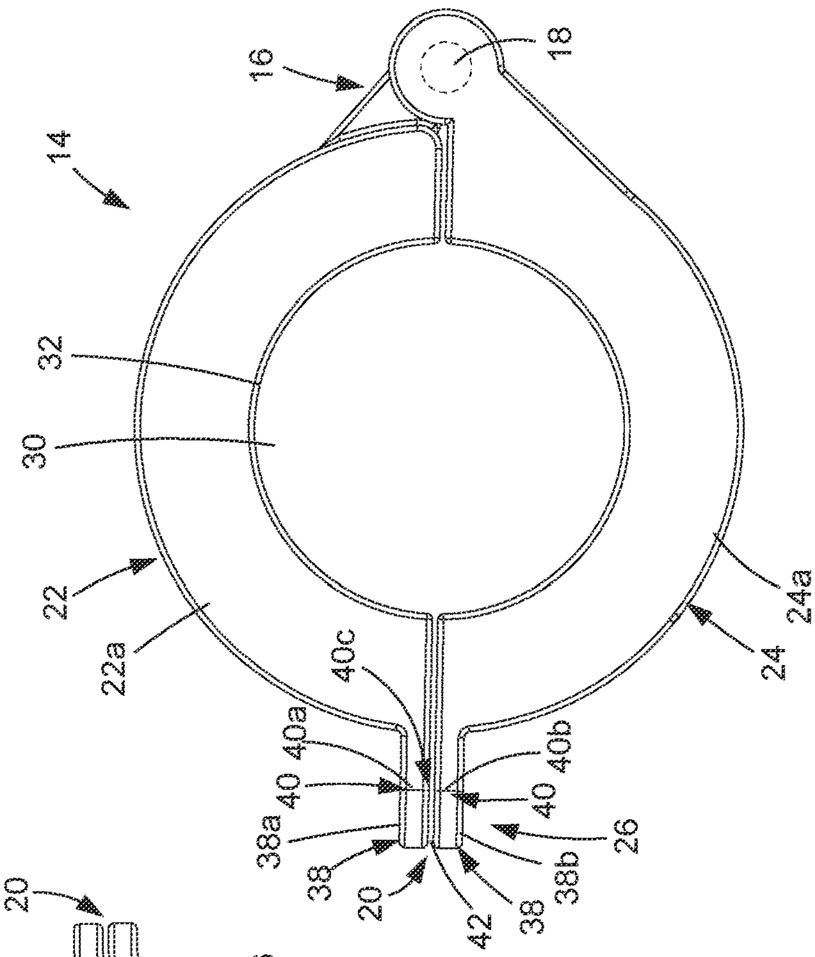
FIG. 2B is an illustration of a back view of the hinged ring of FIG. 2A in the closed position.
Figure 2A:
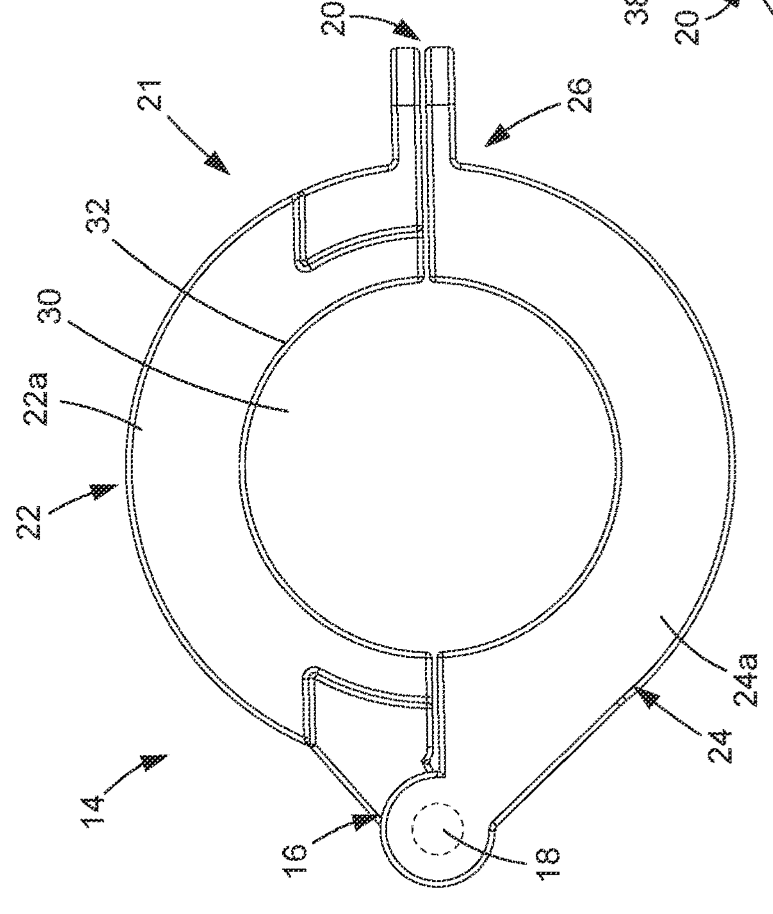
FIG. 2A is an illustration of a front view of an exemplary version of a hinged ring of an access control assembly the disclosure, where the hinged ring is in a closed position.
Figure 2F:
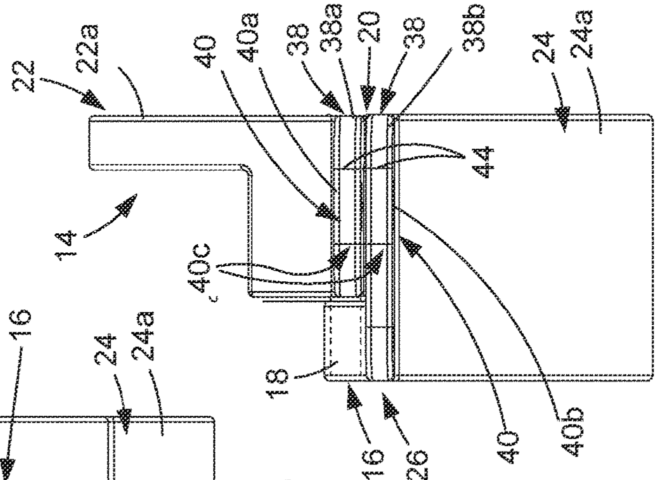
FIG. 2F is an illustration of a right side view of the hinged ring of FIG. 2A in the closed position.
Figure 2E:
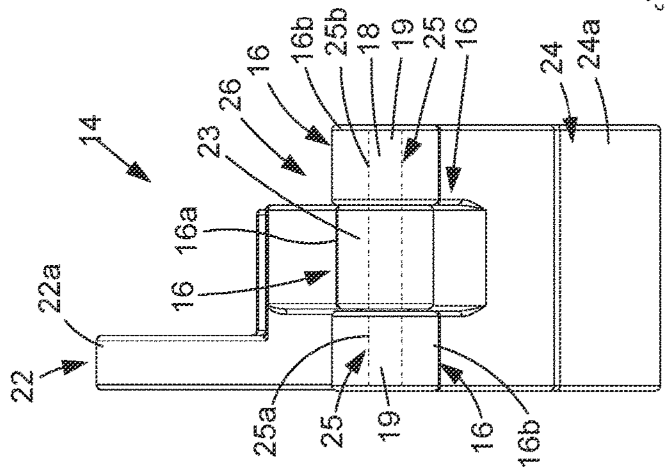
FIG. 2E is an illustration of a left side view of the hinged ring of FIG. 2A in the closed position.
Figure 2C:
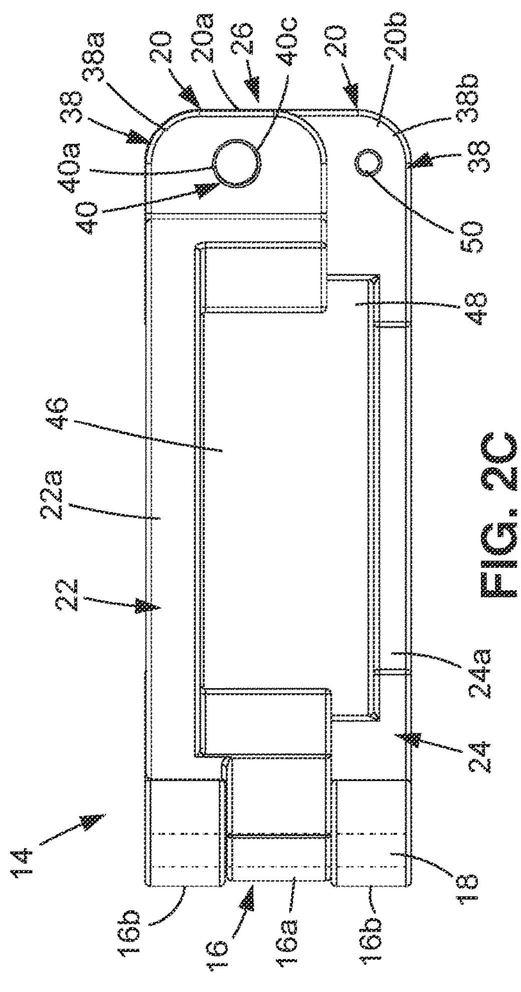
FIG. 2C is an illustration of a top view of the hinged ring of FIG. 2A in the closed position.
Figure 2D:
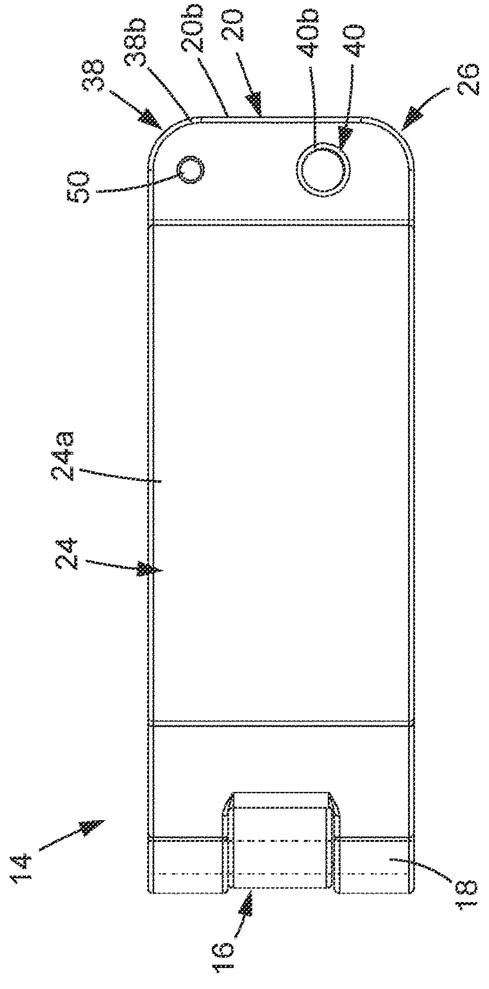
FIG. 2D is an illustration of a bottom view of the hinged ring of FIG. 2A in the closed position.

FIGS. 2A-2F show an exemplary version of the hinged ring 14 of the access control assembly 10 (see FIG. 1) of the disclosure, where the hinged ring 14 is in the closed position 26. FIG. 2A is an illustration of a front view of an exemplary version of the hinged ring 14 of the access control assembly 10 the disclosure, where the hinged ring 14 is in the closed position 26. FIG. 2B is an illustration of a back view of the hinged ring 14 of FIG. 2A in the closed position 26. FIG. 2C is an illustration of a top view of the hinged ring 14 of FIG. 2A in the closed position 26. FIG. 2D is an illustration of a bottom view of the hinged ring 14 of FIG. 2A in the closed position 26. FIG. 2E is an illustration of a left side view of the hinged ring 14 of FIG. 2A in the closed position 26. FIG. 2F is an illustration of a right side view of the hinged ring 14 of FIG. 2A in the closed position 26.

As shown in FIG. 1 and FIGS. 2A-2F, the hinged ring 14 comprises a first portion 22, such as a top portion 22*a*, and a second portion 24, such as a bottom portion 24*a*. The first portion 22, such as the top portion 22*a*, is pivotably connected to the second portion 24, such as the bottom portion 24*a*, via the hinge pin 18 at the hinged end 16, so that the first portion 22, such as the top portion 22*a*, pivots toward and away from the second portion 24, such as the bottom portion 24*a*, to close and open the hinged ring 14, and move the hinged ring 14 back and forth between the closed position 26 (see FIGS. 1, 2A) and an open position 28 (see FIGS. 1, 3A).

The hinge pin 18 (see FIGS. 2C, 3A) of the hinged ring 14 couples, or connects, together a first portion hinged end 16*a* (see FIGS. 2C, 3A, 4A) of the first portion 22, such as the top portion 22*a*, and a second portion hinged end 16*b* (see FIGS. 2C, 3A, 5A) of the second portion 24, such as the bottom portion 24*a*. The hinge pin 18 is inserted through, and partially positioned within, a first portion opening 23 (see FIGS. 2E, 3A, 4A-4B) of the first portion 22, such as the top portion 22*a*, at the hinged end 16, such as the first portion hinged end 16*a* (see FIGS. 2E, 3A). The hinge pin 18 has hinge pin ends 19 (see FIGS. 2E, 3A) inserted through second portion openings 25 (see FIGS. 2E, 3A, 5C) of the second portion 24, such as the bottom portion 24*a*, at the hinged end 16, such as the second portion hinged end 16*b* (see FIGS. 2E, 3A). As shown in FIG. 2E, the hinged ring 14, when assembled in the assembled position, shows the hinge pin 18 extending across and through a second portion opening 25*a*, through the first portion opening 23, and through a second portion opening 25*b*, to join together the first portion 22, such as the top portion 22*a*, and the second portion 24, such as the bottom portion 24*a*, at the hinged end 16 of the hinged ring 14.

When the hinged ring 14 is in the closed position 26 (see FIGS. 2A-2F), the first portion 22, such as the top portion 22*a*, and the second portion 24, such as the bottom portion 24*a*, define a circular opening 30 (see FIGS. 1, 2A-2B) having a circular shape 32 (see FIGS. 2A-2B).

Figure 3A:
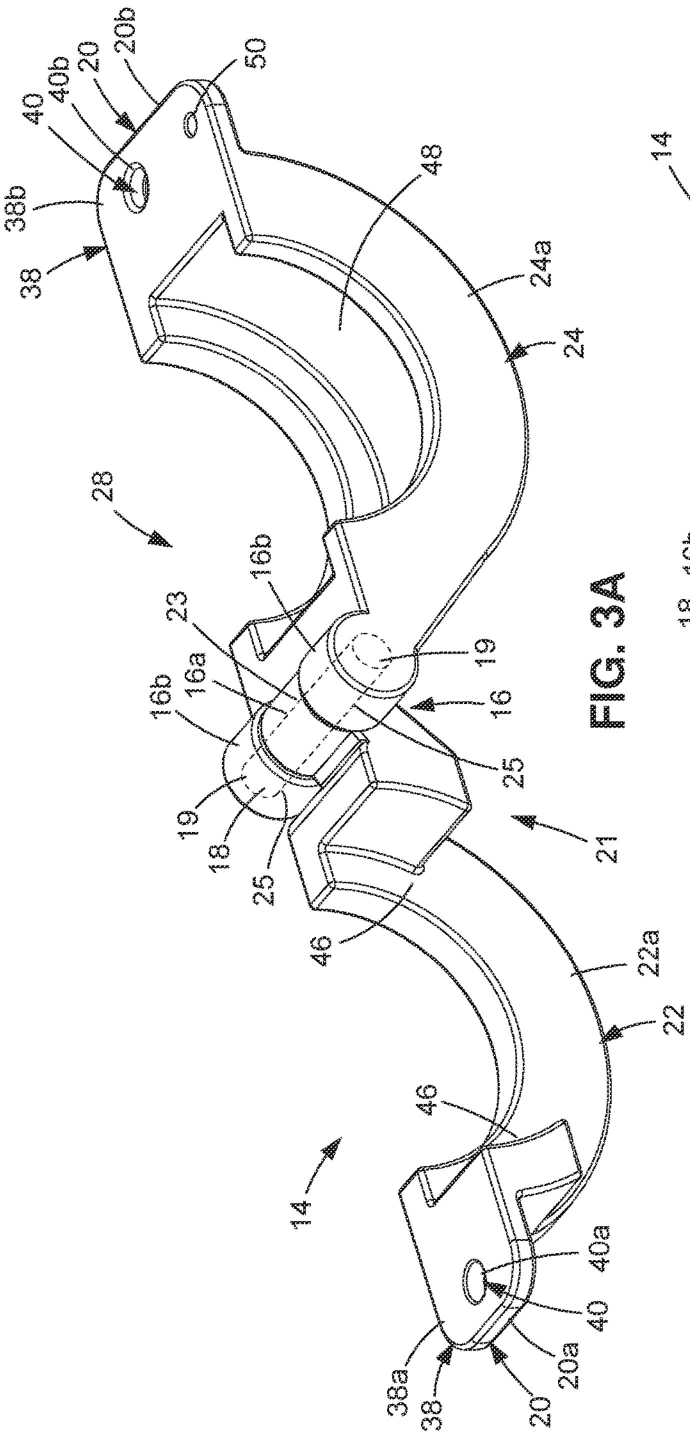
FIG. 3A is an illustration of a front perspective view of the exemplary version of the hinged ring of FIG. 2A in an open position.
Figure 3B:
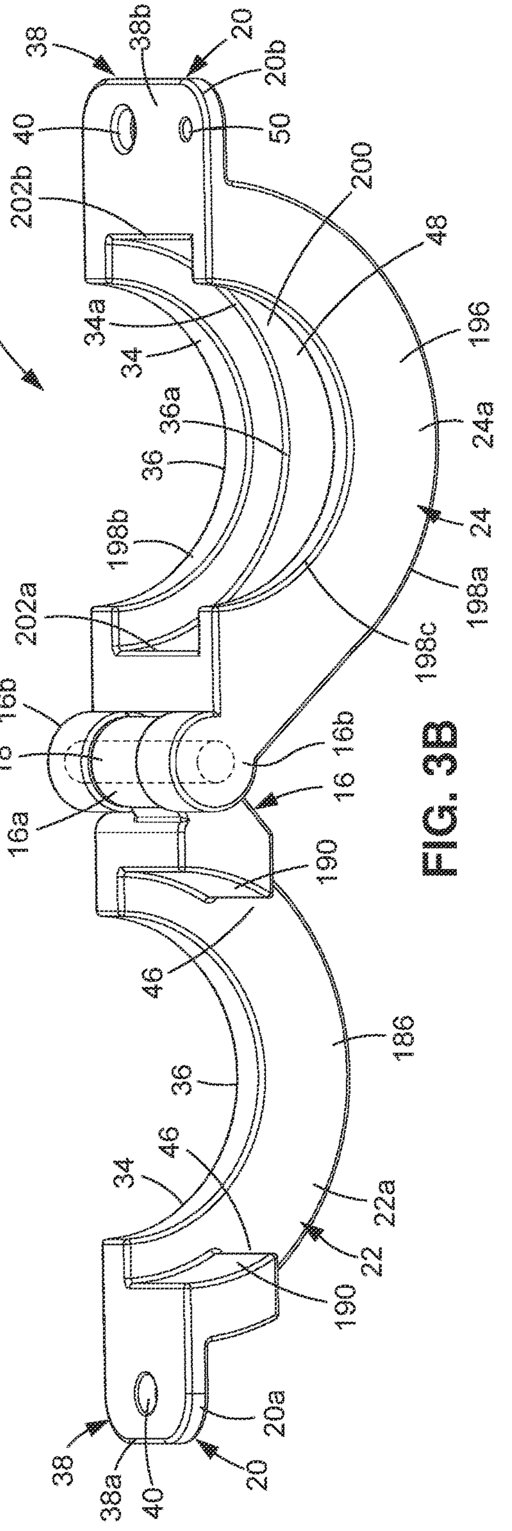
FIG. 3B is an illustration of another front perspective view of the hinged ring of FIG. 3A in the open position.
Figure 3C:
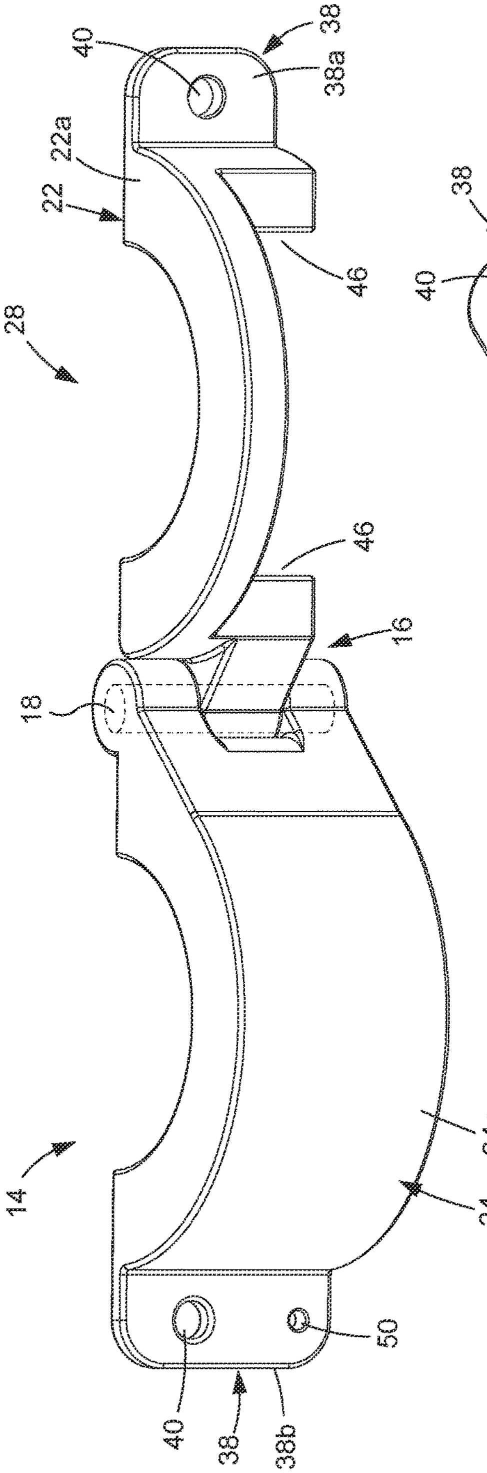
FIG. 3C is an illustration of a bottom perspective view of the hinged ring of FIG. 3A in the open position.
Figure 3D:
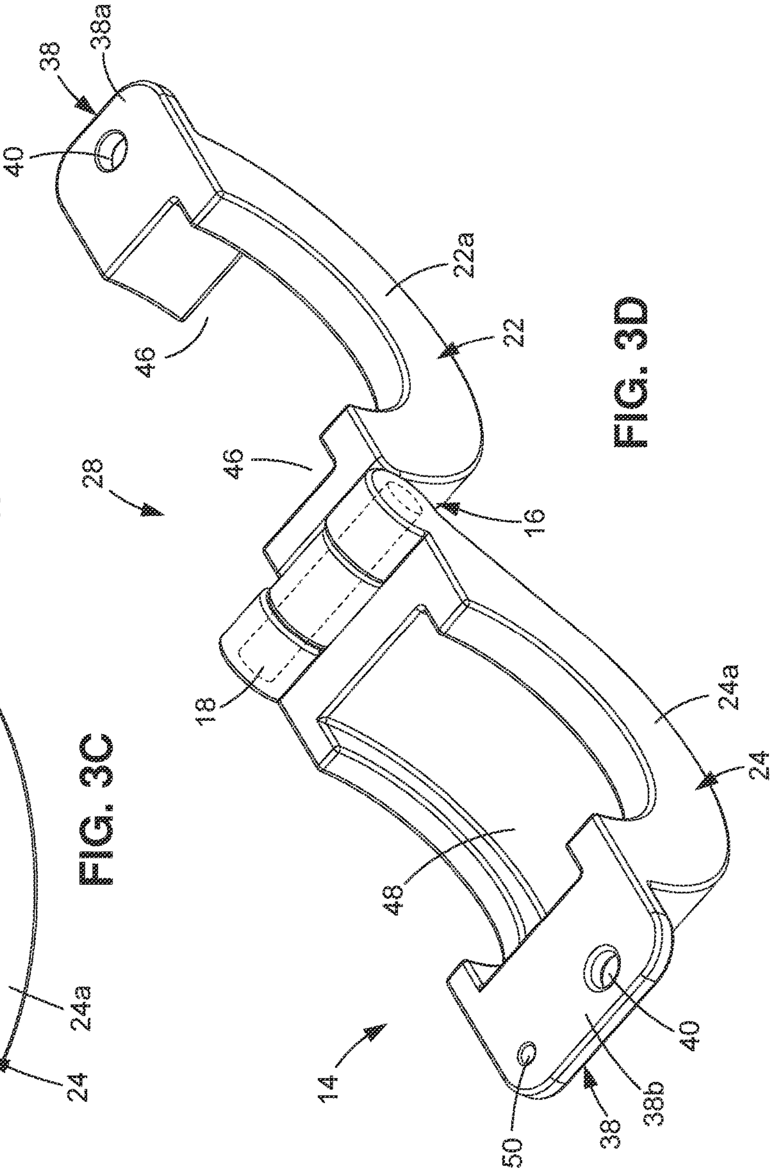
FIG. 3D is an illustration of a top back perspective view of the hinged ring of FIG. 3A in the open position.

FIGS. 3A-3D show an exemplary version of the hinged ring 14 of FIG. 2A of the access control assembly 10 (see FIG. 1) of the disclosure, where the hinged ring 14 is in the open position 28. FIG. 3A is an illustration of a front perspective view of the exemplary version of the hinged ring 14 of FIG. 2A in the open position 28. FIG. 3B is an illustration of another front perspective view of the hinged ring 14 of FIG. 3A in the open position 28. FIG. 3C is an illustration of a bottom perspective view of the hinged ring 14 of FIG. 3A in the open position 28. FIG. 3D is an illustration of a top back perspective view of the hinged ring 14 of FIG. 3A in the open position 28.

As shown in FIGS. 1, 3B, the first portion 22, such as the top portion 22*a*, and the second portion 24, such as the bottom portion 24*a*, each has a semi-circular profile 34 with an arc shape 36. As further shown in FIGS. 1, 2C-2D, 3A-3D, the first portion 22, such as the top portion 22*a*, and the second portion 24, such as the bottom portion 24*a*, each has an outer tab 38 at the non-hinged end 20 of the hinged ring 14. As shown in FIGS. 2C, 3A, the first portion 22, such as the top portion 22*a*, has the outer tab 38, such as a first portion outer tab 38*a*, at the non-hinged end 20, such as a first portion non-hinged end 20*a*. As further shown in FIGS. 2C, 3A, the second portion 24, such as the bottom portion 24*a*, has the outer tab 38, such as a second portion outer tab 38*b*, at the non-hinged end 20, such as a second portion non-hinged end 20*b*.

As further shown in FIGS. 1, 2C-2D, 3A-3D, the first portion 22, such as the top portion 22*a*, and the second portion 24, such as the bottom portion 24*a*, each has one or more lockout holes 40 formed through the outer tab 38 at the non-hinged end 20.

As shown in FIGS. 2C, 3A, the first portion 22, such as the top portion 22*a*, has one lockout hole 40, such as a first portion lockout hole 40*a*, formed through the outer tab 38, such as the first portion outer tab 38*a*, at the non-hinged end 20, such as the first portion non-hinged end 20*a*. As further shown in FIGS. 2D, 3A, the second portion 24, such as the bottom portion 24*a*, has one lockout hole 40, such as a second portion lockout hole 40*b*, formed through the outer tab 38, such as the second portion outer tab 38*b*, at the non-hinged end 20, such as the second portion non-hinged end 20*b*.

Preferably, the first portion 22, such as the top portion 22*a*, and the second portion 24, such as the bottom portion 24*a*, have a same number of lockout holes 40. However, the first portion 22, such as the top portion 22*a*, and the second portion 24, such as the bottom portion 24*a*, may have a different number of lockout holes 40. Preferably, the number of lockout holes 40 on each of the first portion 22, such as the top portion 22*a*, and the second portion 24, such as the bottom portion 24*a*, is in a range of from one (1) lockout hole 40 to eight (8) lockout holes 40 formed through the outer tab 38 of each of the first portion 22, such as the top portion 22*a*, and the second portion 24, such as the bottom portion 24*a*. However, the number of lockout holes 40 may be greater than eight (8) lockout holes 40, depending on the size of the outer tab 38, such as the first portion outer tab 38*a*, on the first portion 22, such as the top portion 22*a*, and depending on the size of the outer tab 38, such as the second portion outer tab 38*b*, on the second portion 24, such as the bottom portion 24*a*.

As shown in FIGS. 2B, 2F, when the hinged ring 14 is in the closed position 26, the outer tabs 38, such as the first portion outer tab 38*a* of the first portion 22, such as the top portion 22*a*, and such as the second portion outer tab 38*b* of the second portion 24, such as the bottom portion 24*a*, abut against each other in an abutted configuration 42 (see FIG. 2B), and the one or more lockout holes 40, including the first portion lockout hole 40*a* of the first portion 22, such as the top portion 22*a*, and including the second portion lockout hole 40*b* of the second portion 24, such as the bottom portion 24*a*, are aligned in an aligned configuration 44 (see FIG. 2F) on top of one another or in a vertical alignment, and comprise aligned lockout holes 40*c* (see FIGS. 1, 2B, 2F). As shown in FIGS. 2B, 2F, when the hinged ring 14 is in the closed position 26, the lockout holes 40 of the first portion 22, such as the top portion 22*a*, and the second portion 24, such as the bottom portion 24*a*, are aligned as, and comprise, the aligned lockout holes 40*c*.

As shown in FIGS. 1, 2C, 3A-3D, the first portion 22, such as the top portion 22*a*, further has an interior (INT.) cut-out portion (PORT.) 46. The second portion 24, such as the bottom portion 24*a*, further has an interior (INT.) concave recessed portion (PORT.) 48 (see FIGS. 1, 2C, 3B-3D), and a cap attachment hole 50 (see FIGS. 1, 2C-2D, 3A-3D). As shown in FIGS. 2C-2D, 3A-3D, the cap attachment hole 50 is formed through the outer tab 38, such as the second portion outer tab 38*b*, of the second portion 24, such as the bottom portion 24*a*. In one version, as shown in FIGS. 2C-2D, 3A-3D, there is one cap attachment hole 50 formed through the outer tab 38, such as the second portion outer tab 38*b*, and horizontally aligned with the lockout hole 40, and the cap attachment hole 50 is smaller in size and diameter than the lockout hole 40. However, in other versions, the cap attachment hole 50 may be formed through another portion of, or location on, the outer tab 38 of the second portion 24, and the cap attachment hole 50 may be of a different shape and size, or may be of a similar, or larger, size as compared to the size of the lockout hole 40. In yet other versions, the cap attachment hole 50 may be formed through another portion of, or location on, the hinged ring 14, as long as it does not interfere with closing of the hinged ring 14. The second portion outer tab 38*b* of the second portion 24 may also have more than one cap attachment hole 50, such as two, three, or more cap attachment holes 50, as desired, depending on the size of the second portion outer tab 38*b* of the second portion 24.

As shown in FIG. 1, the access control assembly 10 further comprises a cap 52 configured to be attached to the hinged ring 14. As further shown in FIGS. 1, 10A, the cap 52 has a first end 54, such as a bottom end, and a second end 56, such as a top end. The first end 54 has an exterior lip 58 (see FIGS. 1, 10A) formed around the exterior circumference of the first end 54 of the cap 52. The exterior lip 58 has an attachment point tab 60 (see FIGS. 1, 10A), in one version, extending or projecting outwardly from a portion 58*a* (see FIG. 10A) of the exterior lip 58. In another version, the attachment point tab 60 may extend from the second end 56, or top, of the cap 52 or from other areas of the cap 52. The attachment point tab 60 has an opening 62 (see FIG. 10A) formed through the thickness and body of the attachment point tab 60. The cap 52 further has an internal cavity 64 (see FIGS. 1, 10B) with an interior wall 66 (see FIG. 10B) having an interior ridge 68 (see FIGS. 1, 10B) that projects from a portion 66*a* (see FIG. 10B) of the interior wall 66.

The cap 52 may further optionally (OPT.) comprise one or more drain holes 70 (see FIGS. 1, 10A) formed through the second end 56 of the cap 52. In one version of the cap 52, the second end 56 has drain holes 70 (see FIG. 10A). In another version of the cap 52, as shown in FIGS. 11A-11B, the second end 56 has no drain holes, and the second end 56 is closed completely. The cap 52 is discussed in further detail below with respect to FIGS. 10A-10D and 11A-11B.

The hinged ring 14 and the cap 52 may be made of one or more thermoplastic materials (MAT. (S)) 72 (see FIG. 1), or one or more thermoset materials (MAT. (S)) 74 (see FIG. 1). The thermoplastic materials 72 may comprise one or more of, a thermoplastic resin, polyetherimide (PEI), acrylonitrile butadiene styrene (ABS), polyether ether ketone (PEEK), acetal (also referred to as polyoxymethylene (POM)), polyethylene (PE), polyester, polyethylene terephthalate (PET), nylon, or another suitable thermoplastic material. The thermoset materials 74 may comprise one or more of, a thermoset plastic, a thermoset resin, a composite plastic, a fiber-reinforced plastic, a carbon fiber-reinforced plastic, a glass fiber-reinforced plastic, fiberglass, or another suitable thermoset material. Preferably, the hinged ring 14 and the cap 52 are made of one or more non-conductive materials (MAT. (S)) 76 (see FIG. 1), such as one or more non-conductive thermoplastic materials, one or more non-conductive thermoset materials, one or more non-conductive composite materials, or another suitable non-conductive material.

As shown in FIG. 1, the hinged ring 14 and the cap 52 of the access control assembly 10 are preferably manufactured with a manufacturing process (PROC.) 78 comprising one of, a three-dimensional (3D) printing process (PROC.) 80, an injection molding process (PROC.) 82, or another suitable manufacturing process. In one version, the hinge pin 18 (see FIGS. 1, 2E, 3A-3D) is manufactured with the hinged ring 14, such as with the 3D printing process 80, the injection molding process 82, or another suitable manufacturing process. In another version, the hinge pin 18 (see FIGS. 1, 2E, 3A-3D) is manufactured separately from the hinged ring 14 and is separately manufactured with the 3D printing process 80, the injection molding process 82, or another suitable manufacturing process, and is then added to the hinged ring 14 that has been separately manufactured.

As shown in FIG. 1, the access control assembly 10 further comprises one or more locking elements 84. The one or more locking elements 84 (see FIGS. 1, 16B-16D) are configured to be inserted through the one or more lockout holes 40, such as the aligned lockout holes 40*c* (see FIGS. 16B-16D), of the first portion 22, such as the top portion 22*a*, and the second portion 24, such as the bottom portion 24*a*, to lock the hinged ring 14 in the closed position 26 (see FIGS. 16B-16D), and in a locked position 86 (see FIGS. 16B-16D). As shown in FIG. 1, the one or more locking elements 84 may comprise one or more of, one or more padlocks 88, one or more zip ties 90, one or more cable ties 92, one or more cable seals 94, one or more lockout hasps 96, one or more lockout tagout (LOTO) devices 98, including one or more lockout tagout (LOTO) cable tags 98*a*, or another suitable locking element. The lockout hasp 96 may comprise a multi-lock lockout hasp, a lockout tagout (LOTO) lockout hasp, or another suitable lockout hasp. As used herein, the term "lockout tagout" means a security system for equipment and machinery that uses a lockout device, such as a lock, a padlock, a blank flange, or other locking device, to secure the equipment or machinery in a safe position, thereby preventing energizing and use of the equipment or machinery, and that uses a tagout device, such as a prominent warning tag or other attachment indicator, which can be securely fastened to the equipment or machinery, to provide an alert or indication that the equipment or machinery should not be operated until the tagout device is removed, and where the tagout device is substantial enough to prevent inadvertent or accidental removal, such as being non-reusable, self-locking, non-releasable, and/or attachable by hand.

Figure 12A:
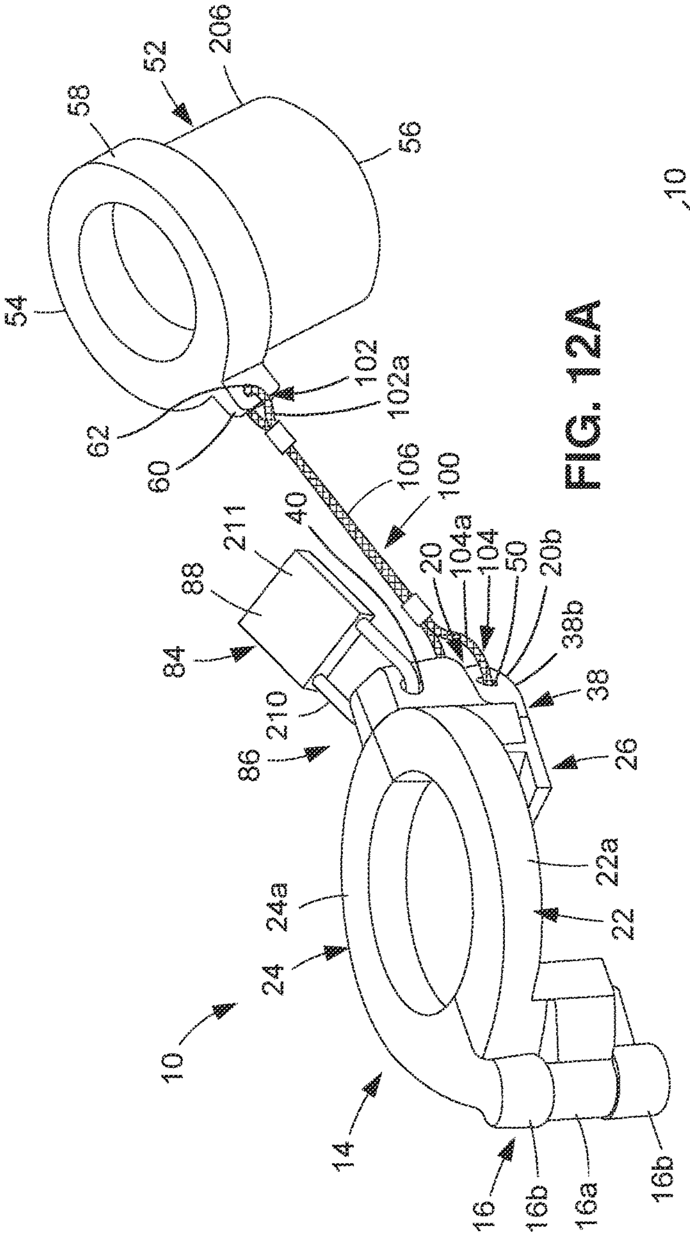
FIG. 12A is an illustration of a perspective view of a version of an access control assembly of the disclosure.
Figure 12B:
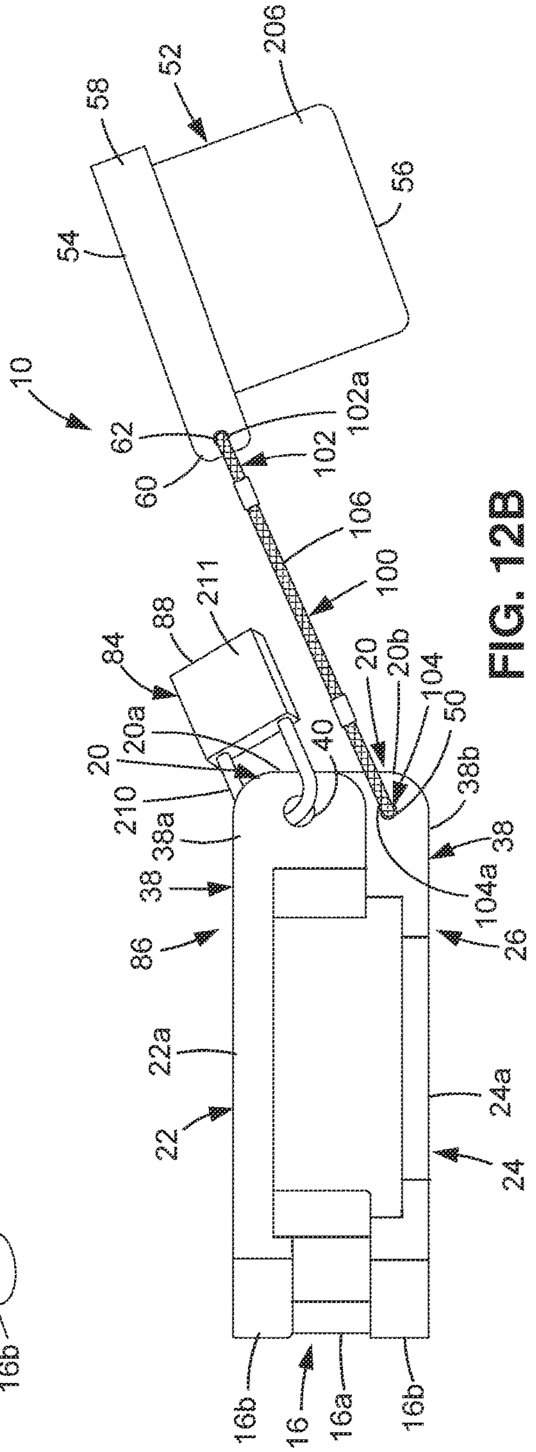
FIG. 12B is an illustration of a top view of a hinged ring and a side view of a cap of the access control assembly of FIG. 12A.

As shown in FIG. 1, the access control assembly 10 further comprises a cap connector element 100. The cap connector element 100 has a first end 102 (see FIGS. 12A-12B) connected to the attachment point tab 60 (see FIGS. 12A-12B) of the cap 52 (see FIGS. 12A-12B), and in particular, the first end 102 is preferably inserted through the opening 62 (see FIGS. 12A-12B) in the attachment point tab 60 of the cap 52. As shown in FIGS. 12A-12B, the cap connector element 100 further has a second end 104 connected to, and inserted through, the cap attachment hole 50 on the outer tab 38, such as the second portion outer tab 38*b*, of the second portion 24, such as the bottom portion 24*a*, of the hinged ring 14.

As shown in FIG. 1, the cap connector element 100 may comprise an aramid braided cord 106, a plastic (PLAST.) coated wire 108, a plastic (PLAST.) cable 110, a plastic (PLAST.) rope 112, or another suitable cap connector element. The aramid braided cord 106 preferably comprises a poly-paraphenylene terephthalamide (PPTA) braided cord, also referred to as a KEVLAR braided cord, as poly-paraphenylene terephthalamide is also known as KEVLAR. (KEVLAR is a registered trademark of Dupont Safety & Construction, Inc. of Wilmington, Delaware.) Poly-paraphenylene terephthalamide, also known as KEVLAR, is a strong, heat-resistant, synthetic fiber having a high tensile strength-to-weight ratio. The plastic cable 110 may comprise a nylon cable, a polypropylene cable, or another suitable plastic cable. The plastic rope 112 may comprise a nylon rope, a polypropylene rope, or another suitable plastic rope.

As shown in FIG. 1, the access control system 12 further comprises a power plug assembly 114. The power plug assembly 114 comprises a plug 115 (see FIGS. 1, 13, 15A-15B), such as a power plug 115*a* (see FIGS. 15A-15B). In a preferred version, the plug 115 comprises a pin and sleeve plug 116 (see FIGS. 1, 13, 15A-15B). The plug 115 has a plug end 118 (see FIGS. 1, 15A-15B), a coupling end 120 (see FIGS. 1, 15A-15B), and a plug sleeve 122 (see FIGS. 15A-15B), or plug housing, disposed between the plug end 118 and the coupling end 120. The plug sleeve 122, or plug housing, has an alignment slot 124 (see FIGS. 15A-15B), or alignment groove, formed in an exterior portion 125 (see FIGS. 15A-15B) of the plug sleeve 122. The interior ridge 68 (see FIG. 10D) of the cap 52 (see FIG. 10D) is configured to mate with, or fit within, the alignment slot 124 of the plug sleeve 122, when the cap 52 is positioned over the plug end 118 and over the plug sleeve 122, and the plug sleeve 122 is inserted into the internal cavity 64 (see FIG. 10B) of the cap 52.

Figure 15B:
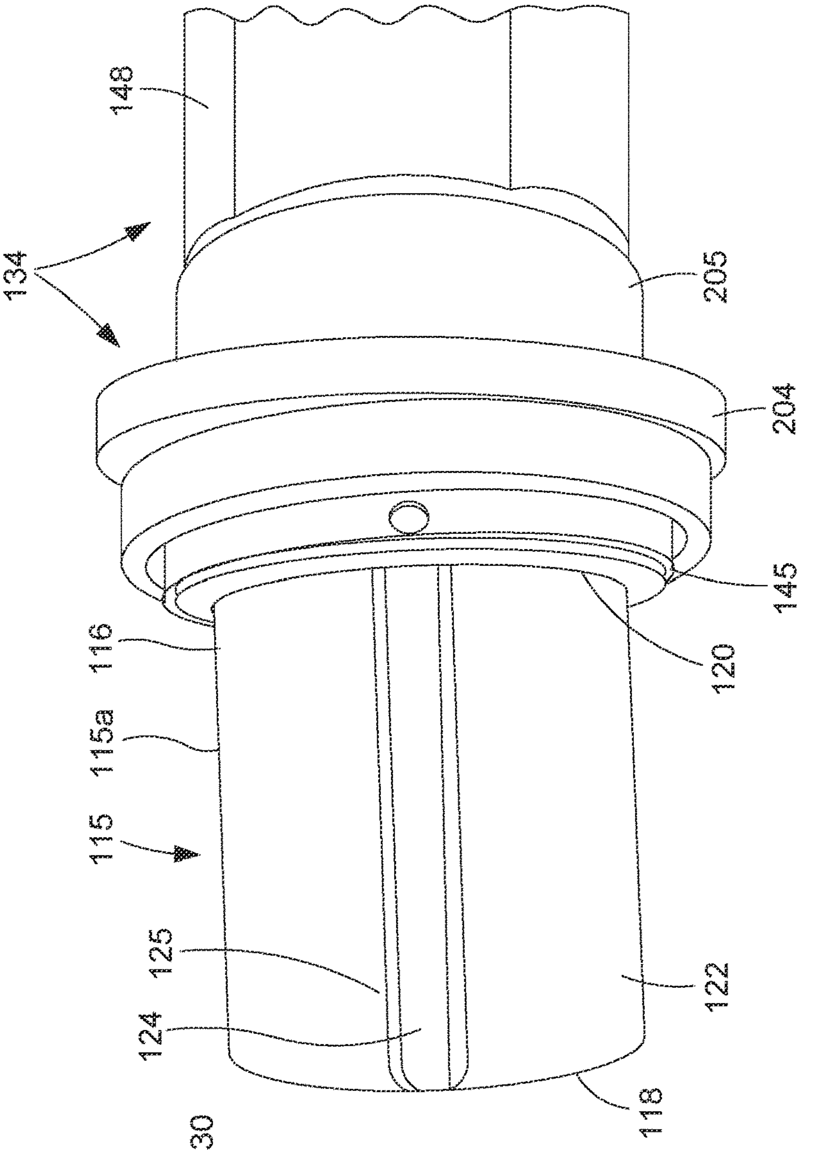
FIG. 15B is an illustration of an enlarged side perspective view of the plug end and the plug of FIG. 15A.
Figure 15A:
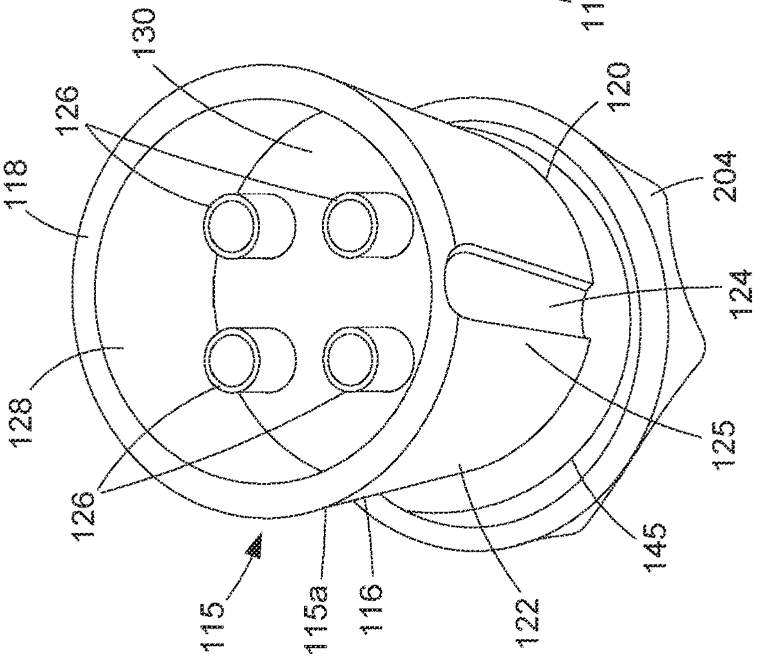
FIG. 15A is an illustration of an enlarged top perspective view of a plug end of a plug of the power plug assembly of FIG. 13.

As shown in FIG. 15A, the plug 115 further comprises one or more plug pins 126 housed within an interior 128 of the plug sleeve 122, or plug housing. FIG. 15A shows four (4) plug pins 126 projecting upwardly, or outwardly, from an interior base 130 within the interior 128 of the plug sleeve 122, or plug housing. The voltage and amperage ratings for the plug 115, such as the power plug 115*a*, is preferably in a range of 130 volt (V) 16 amp (A) for a plug with three (3) plug pins to 600 volt (V) 100 amp (A) for a plug with five (5) plug pins. For example, for the plug 115 with four (4) plug pins 126, shown in FIG. 15A, the plug 115 is 480 volt (V) 60 amp (A). The plug 115, such as the pin and sleeve plug 116, is discussed in further detail below with respect to FIGS. 15A-15B.

Figure 13:
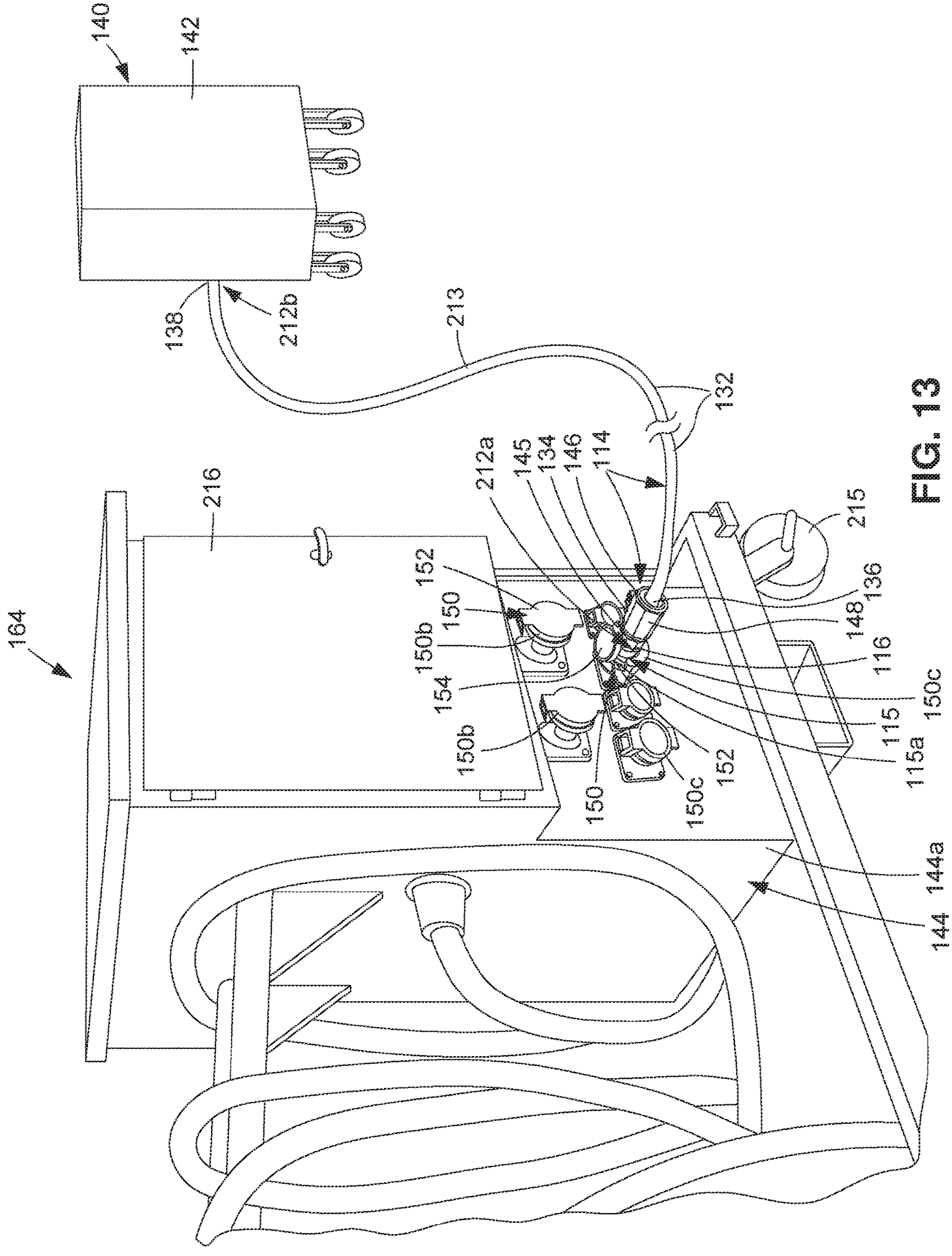
FIG. 13 is an illustration of a perspective view of a power plug assembly of which a version of an access control assembly of the disclosure may be used with, and showing the power plug assembly attached at a first end to a power outlet on a power cart and attached at a second end to an air supply cart.

As further shown in FIG. 1, the power plug assembly 114 comprises a power cord 132 and a coupling element (ELEM.) 134 coupling the power cord 132 to the plug 115. As shown in FIG. 13, the power cord 132 (see FIGS. 1, 13) has a first end 136 coupled, or attached, to the coupling element 134, and has a second end 138 coupled, or attached, to an equipment apparatus 140, such as a fresh air supply unit 142, or another suitable equipment apparatus, powered with electrical power from a power source 144 (see also FIG. 1). The coupling element 134 has a first end 145 (see FIG. 13) coupled, or attached, to the coupling end 120 of the plug 115, and has a second end 146 (see FIG. 13) coupled to the first end 136 of the power cord 132. The coupling element 134 has a body 148 (see FIGS. 13, 15B) formed between the first end 145 and the second end 146.

As shown in FIG. 1, the access control system 12 further comprises a power outlet (PO) 150. In a preferred version, the power outlet 150 comprises a pin and sleeve power outlet 152 (see FIGS. 1, 13, 14A-14B) having a hinged power outlet (PO) cover plate 154. The hinged power outlet cover plate 154 may comprise a spring-loaded hinged power outlet cover plate 154*a* (see FIG. 14B), or another suitable power outlet cover.

Figure 14B:
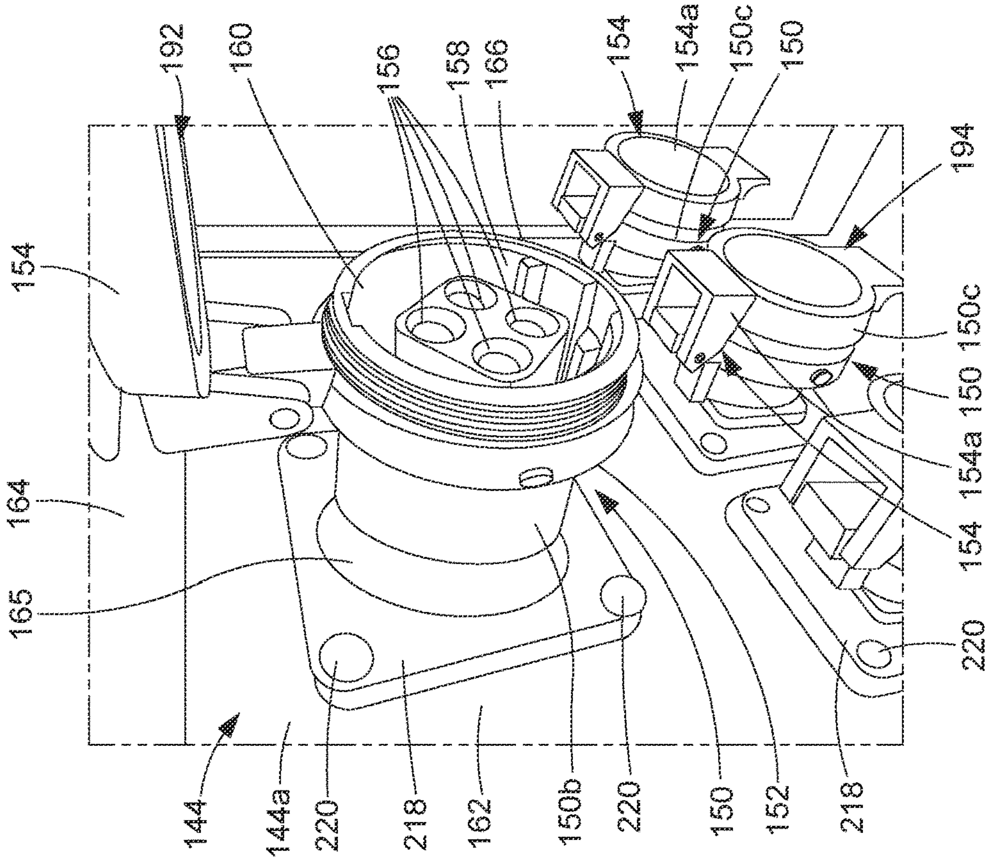
FIG. 14B is an illustration of an enlarged side perspective view of the power outlet of FIG. 14A, showing the hinged power outlet cover plate in an open position.

As shown in FIG. 14B, the power outlet 150, such as the pin and sleeve power outlet 152, further comprises outlet openings 156, or socket openings, positioned within an interior 158 of an outlet receptacle 160, or outlet housing. In one version, the power outlet 150 is connected to, or mounted on, an exterior surface 162 (see FIGS. 14A-14B) of a power source 144 (see FIGS. 1, 14A-14B), such as in the form of a power cart 164 (see FIGS. 1, 13, 14A-14B), to distribute power. In another version, the power outlet 150 provides an access point on equipment or machinery to power them in industrial environments, manufacturing environments, or other types of environments where inadvertent disconnections, impacts, moisture, and debris may be concerns. Inadvertent disconnection may also cause an arc flash.

Figure 14A:
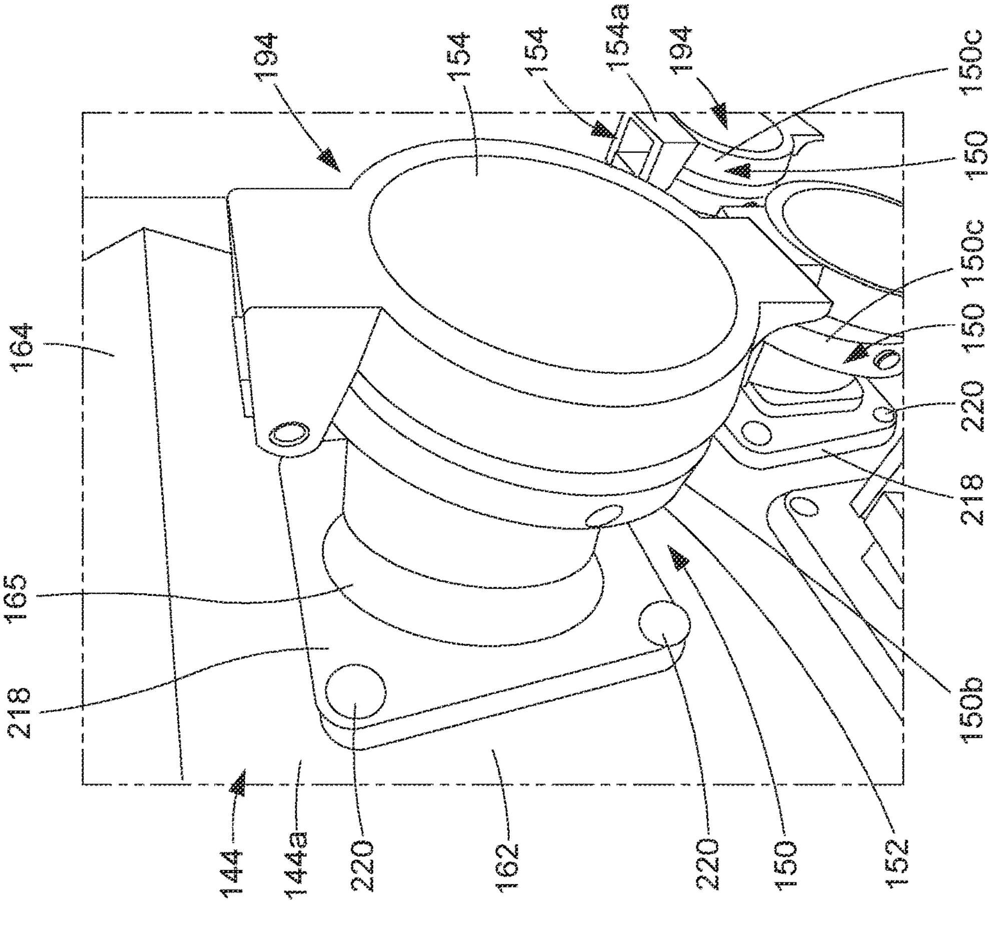
FIG. 14A is an illustration of an enlarged side perspective view of a power outlet on the power cart of FIG. 13, and showing a hinged power outlet cover plate of the power outlet in a closed position.

An inlet end 165 (see FIGS. 14A-14B) of the power outlet 150 connects with the power source 144, such as an electrical power source 144*a* (see FIGS. 14A-14B). The outlet openings 156 at an outlet opening end 166 (see FIG. 14B) are configured to mate with the plug pins 126 (see FIG. 15A) at the plug end 118 of the plug 115. In particular, the pin and sleeve plug 116 and the pin and sleeve outlet 152 are devices that conform to International Electrotechnical Commission (IEC) international standards. IEC is an international standards organization that prepares and publishes international standards for all electrical, electronic and related technologies.

The plug end 118 of the plug 115 is in an unplugged position (POS.) 168 (see FIGS. 1, 16B), such as when the plug end 118 is disconnected, or not connected, to anything, for example, to the power outlet 150. The plug end 118 of the plug 115 is in a plugged-in position (POS.) 170 (see FIGS. 1, 17A), such as when the plug end 118 is connected to, or plugged into, the power outlet 150, to create an electrical connection (ELECTRIC. CONNECT.) 172 (see FIG. 1).

Figure 16A:
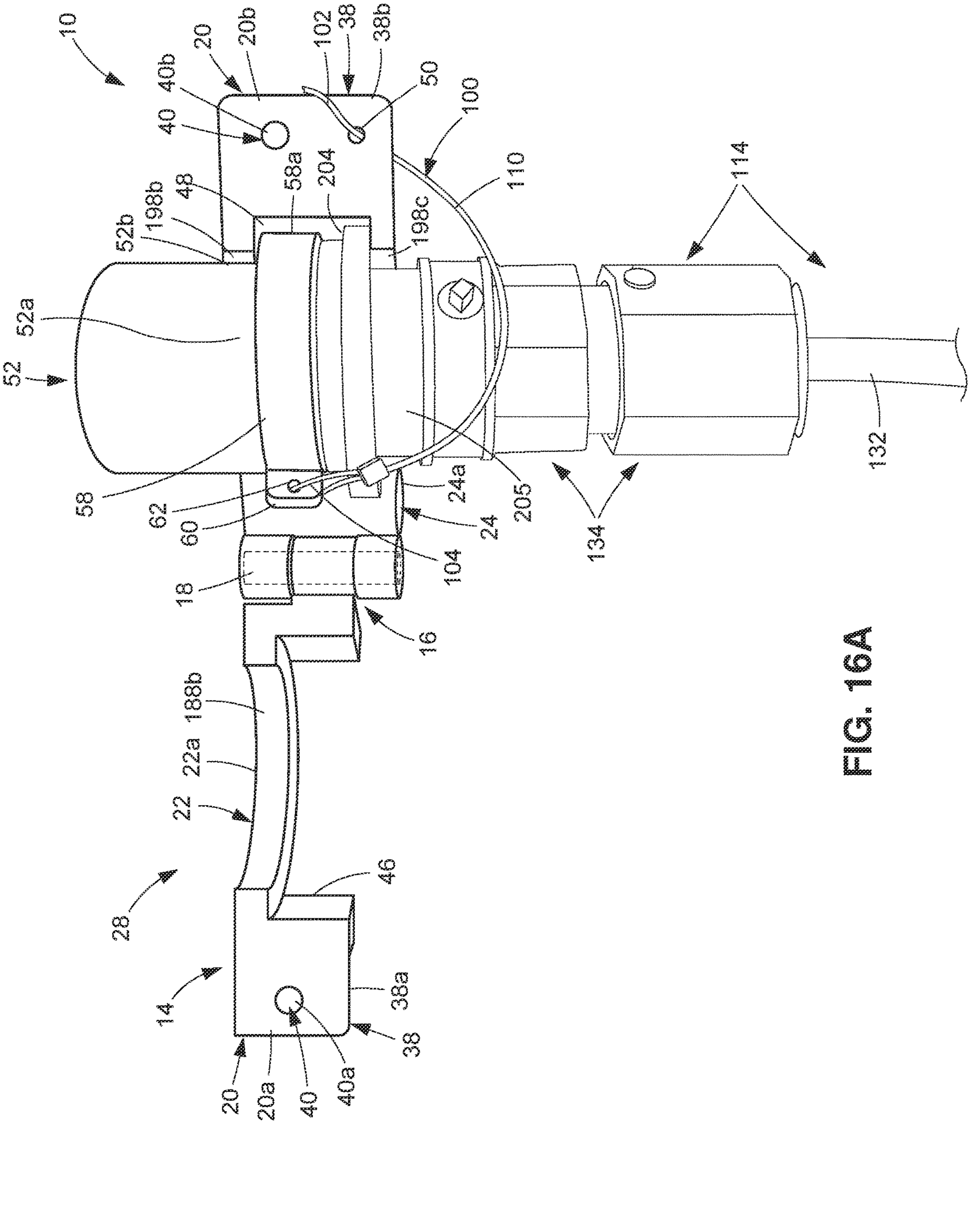
FIG. 16A is an illustration of a perspective view of a version of an access control assembly of the disclosure, with a hinged ring in an open position and a cap coupled to a plug end of a power plug assembly.
Figure 16B:
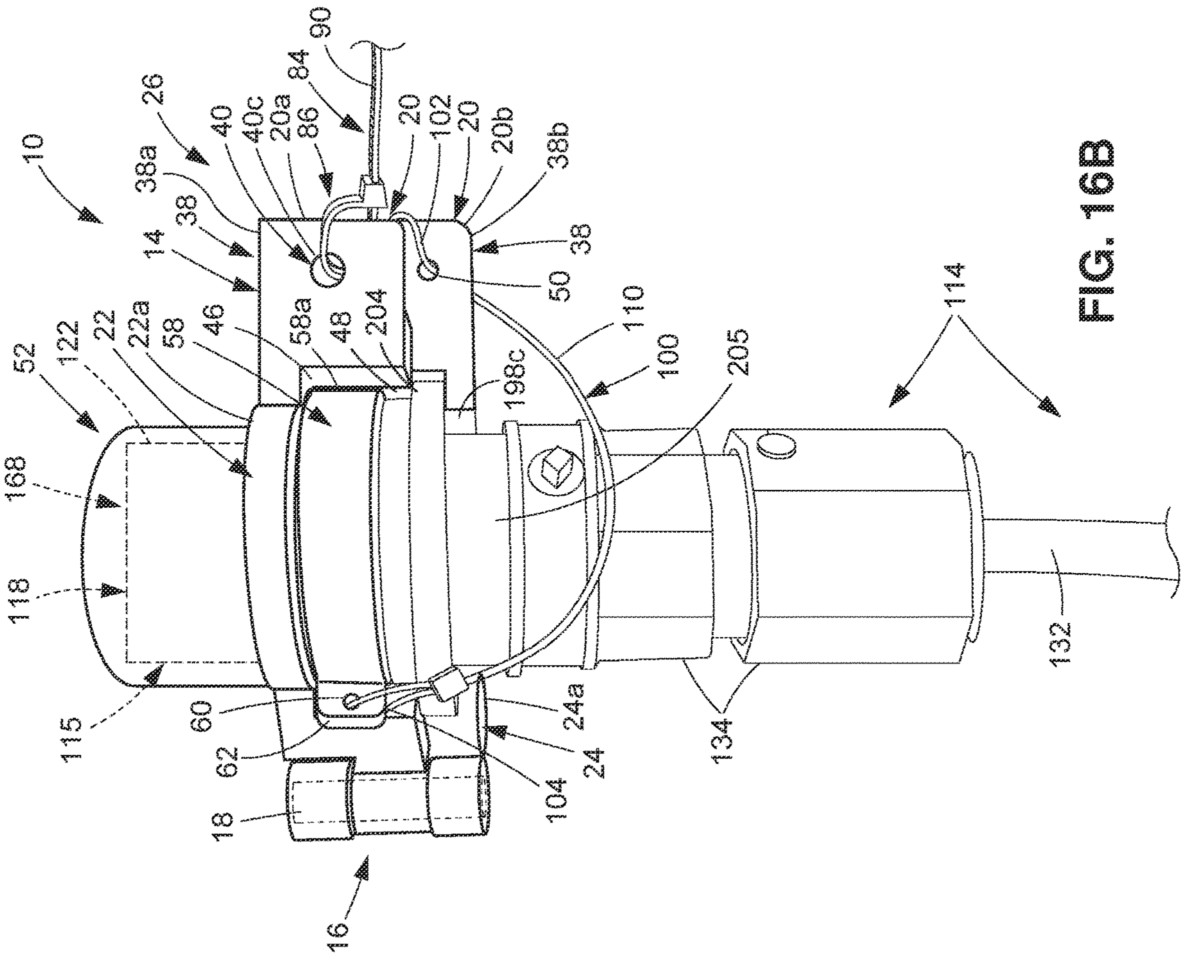
FIG. 16B is an illustration of a perspective view of the access control assembly of FIG. 16A, with the hinged ring in a closed position and locked around the cap and the attached plug end of the power plug assembly of FIG. 16A, and showing a version of a locking element in the form of a zip tie locking the hinged ring.

The access control assembly 10 controls access to the plug end 118 of the plug 115 of the power plug assembly 114, by preventing connection of the plug end 118 of the plug 115 to the power outlet 150, when the plug end 118 of the plug 115 is in the unplugged position 168. Preferably, as shown in FIG. 16B, when the plug end 118 of the plug 115 is in the unplugged position 168, the plug end 118 and the plug sleeve 122 of the plug 115 of the power plug assembly 114 are covered with the cap 52, and the hinged ring 14 of the access control assembly 10 is in the closed position 26 and in the locked position 86 locked around the plug end 118 and the plug sleeve 122 of the plug 115 and locked around an exterior portion 52*a* of the cap 52, to prevent connection of the plug end 118 of the plug 115 to the power outlet 150 (see FIG. 14B). Thus, the access control assembly 10 provides connection prevention (CONNECT. PREV.) 174 (see FIG. 1) of the plug end 118 to the power outlet 150, when the plug end 118 of the plug 115 is in the unplugged position 168.

Figure 17A:
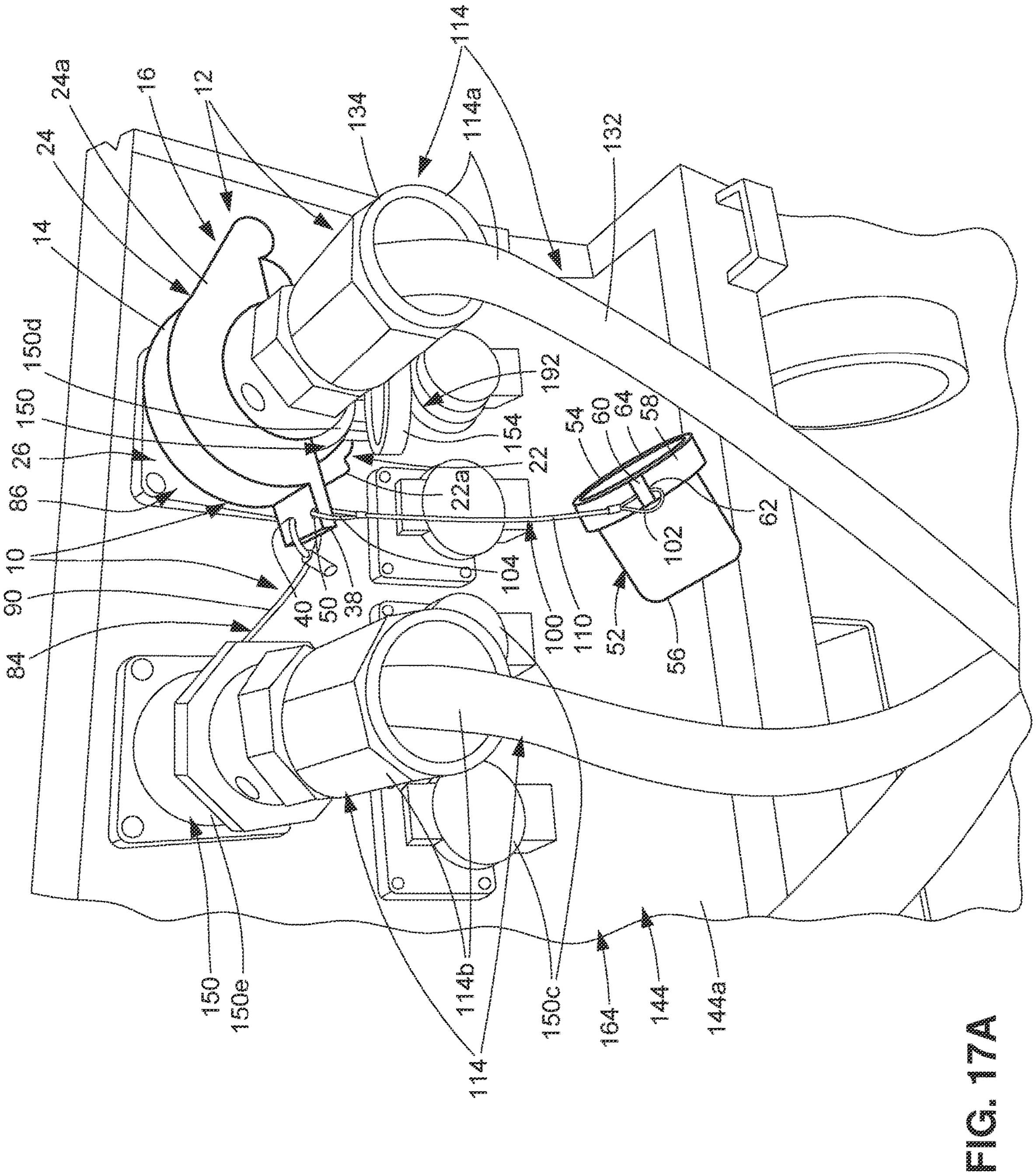
FIG. 17A is an illustration of a perspective view of a version of an access control system with an access control assembly of the disclosure, where a hinged ring is locked around a first power outlet on a power cart and a plug end of a first power plug assembly is plugged into the first power outlet.
Figure 17B:
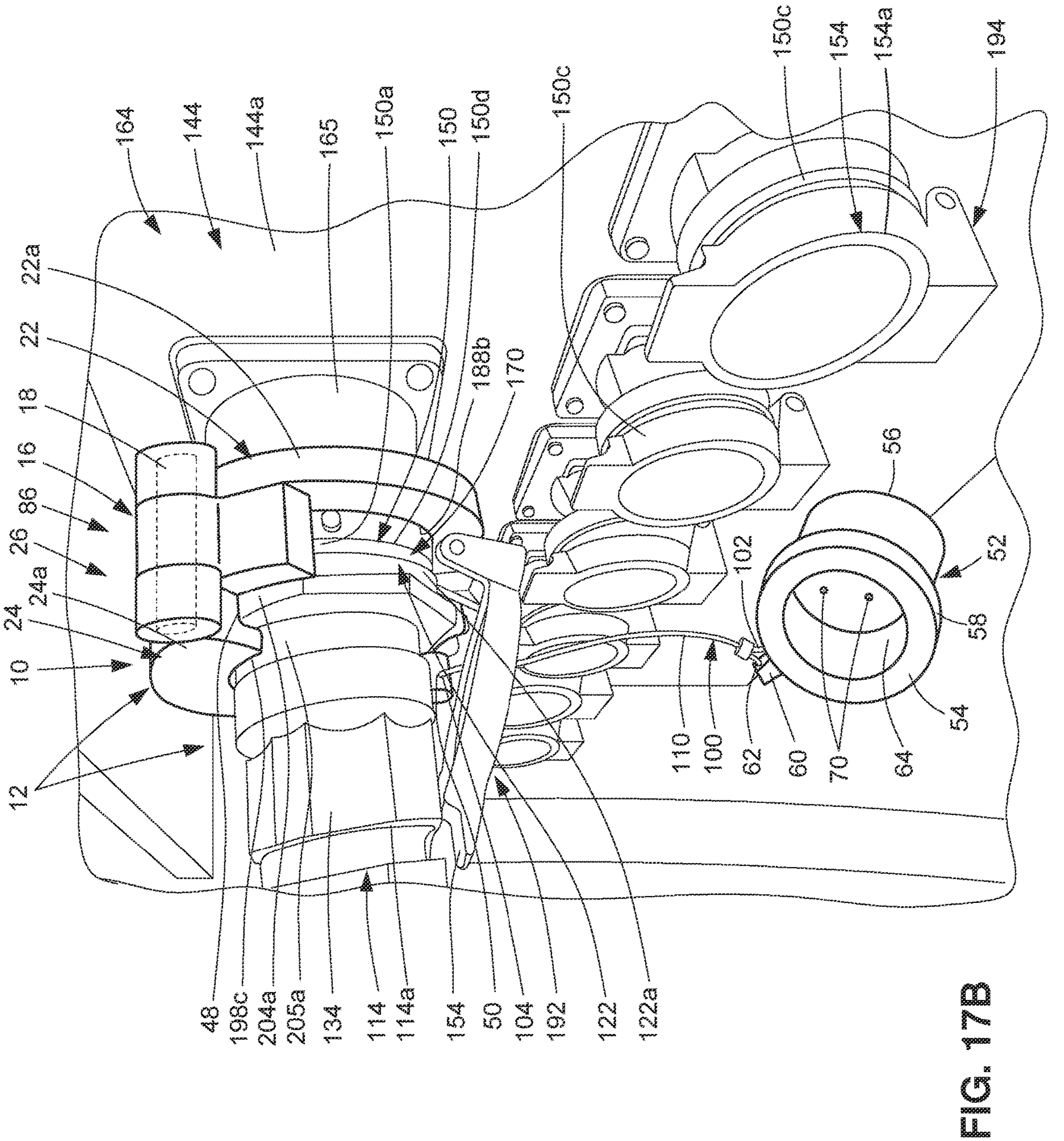
FIG. 17B is an illustration of a side perspective view of the access control system and the access control assembly of FIG. 17A, showing the hinged ring locked around the first power outlet and the plug end of the first power plug assembly of FIG. 17A.

Further, the access control assembly 10 controls access to the plug end 118 of the plug 115 of the power plug assembly 114, by preventing disconnection of the plug end 118 of the plug 115 from the power outlet 150, when the plug end 118 of the plug 115 is in the plugged-in position 170 to create the electrical connection 172 (see FIGS. 1, 17B). Preferably, as shown in FIG. 17B, when the plug end 118 (see FIG. 15A) of the plug 115 (see FIG. 15A) is in the plugged-in position 170, the plug end 118 and the plug sleeve 122 (see FIG. 15A) of the plug 115 of the power plug assembly 114 are not covered with the cap 52, and the hinged ring 14 of the access control assembly 10 is in the closed position 26 and in the locked position 86 locked around the plug end 118 of the plug 115 and around an exterior portion 150*a* of the power outlet 150, to prevent disconnection of the plug end 118 from the power outlet 150, when the plug end 118 is plugged into the power outlet 150 in the plugged-in position 170. Thus, the access control assembly 10 provides disconnection prevention (DISCONNECT. PREV.) 175 (see FIG. 1) of the plug end 118 from the power outlet 150, when the plug end 118 of the plug 115 is in the plugged-in position 170.

As further shown in FIG. 1, the power outlet 150 is preferably coupled to, connected, to, or mounted on, a power source 144. A shown in FIG. 1, the power source 144 may comprise one of, a power cart 164, a power station 176, a power strip 178, a power generator 180, or electrical wiring 182 in a wall 184 of a structure 185, or another suitable power source. The structure 185 may comprise an aircraft 280 (see FIG. 19), a building, a warehouse, a tower, or another suitable structure. The structure 185 may further comprise various types of equipment utilizing International Electrotechnical Commission (IEC) international standard pin and sleeve devices implemented on industrial equipment, conveyor systems, data centers, and other suitable equipment.

Figure 4A:
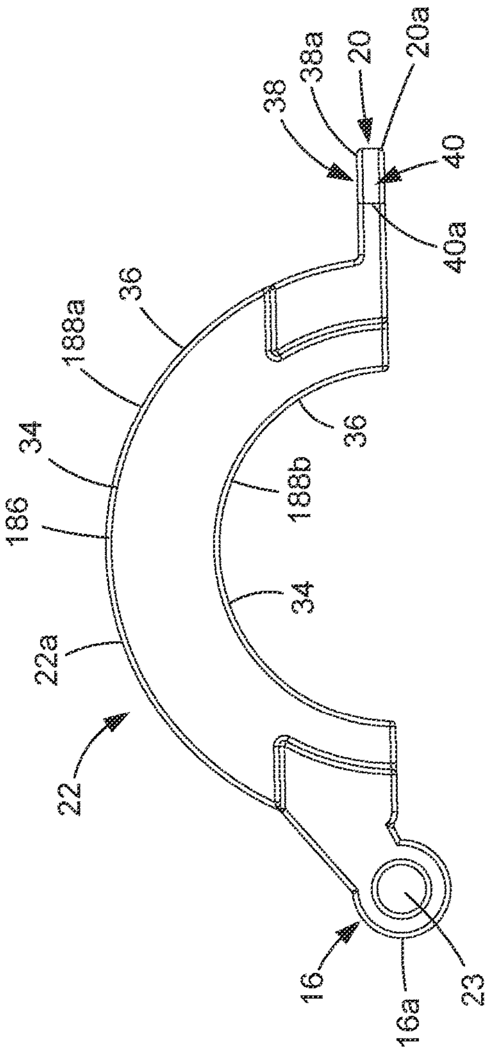
FIG. 4A is an illustration of a front view of a first portion of the hinged ring of FIG. 2A.
Figure 4B:
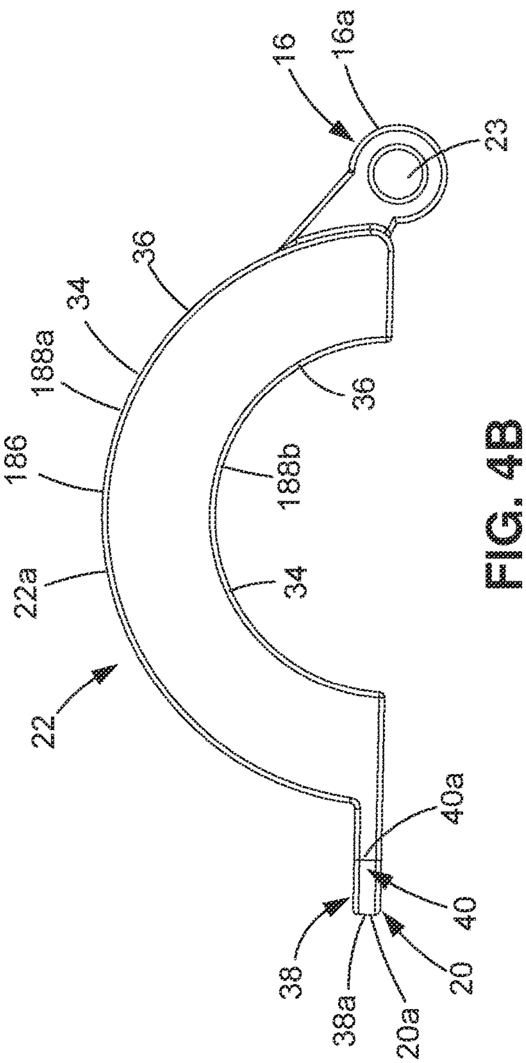
FIG. 4B is an illustration of a back view of the first portion of the hinged ring of FIG. 4A.
Figure 4D:
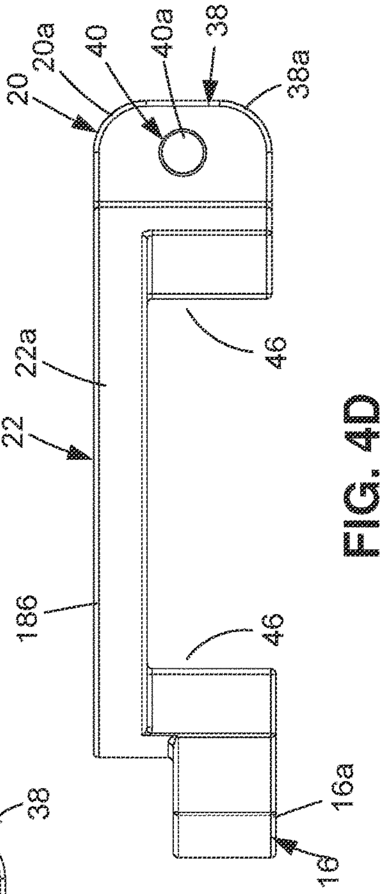
FIG. 4D is an illustration of a top view of the first portion of the hinged ring of FIG. 4A.
Figure 4F:
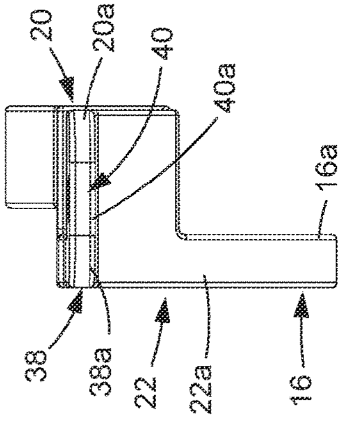
FIG. 4F is an illustration of a right side view of the first portion of the hinged ring of FIG. 4A.
Figure 4C:
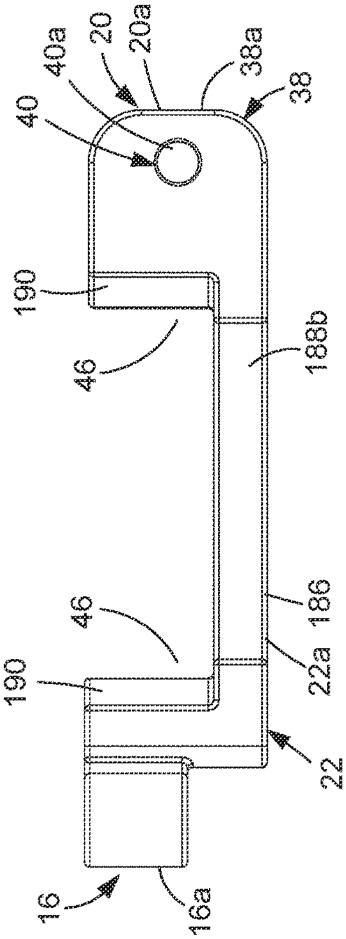
FIG. 4C is an illustration of a bottom view of the first portion of the hinged ring of FIG. 4A.
Figure 4E:
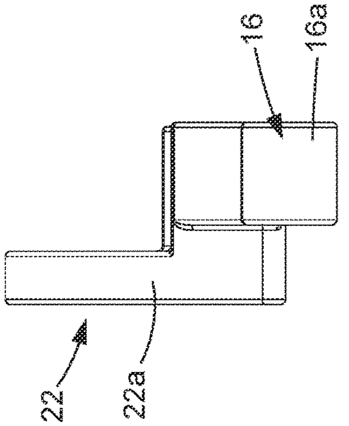
FIG. 4E is an illustration of a left side view of the first portion of the hinged ring of FIG. 4A.

Now referring to FIGS. 4A-4F, FIGS. 4A-4F show the first portion 22, such as the top portion 22*a*, of the hinged ring 14 of FIG. 2A. FIG. 4A is an illustration of a front view of the first portion 22, such as the top portion 22*a*, of the hinged ring 14 of FIG. 2A. FIG. 4B is an illustration of a back view of the first portion 22, such as the top portion 22*a*, of the hinged ring 14 of FIG. 4A. FIG. 4C is an illustration of a bottom view of the first portion 22, such as the top portion 22*a*, of the hinged ring 14 of FIG. 4A. FIG. 4D is an illustration of a top view of the first portion 22, such as the top portion 22*a*, of the hinged ring 14 of FIG. 4A. FIG. 4E is an illustration of a left side view of the first portion 22, such as the top portion 22*a*, of the hinged ring 14 of FIG. 4A. FIG. 4F is an illustration of a right side view of the first portion 22, such as the top portion 22*a*, of the hinged ring 14 of FIG. 4A.

Preferably, the first portion 22, such as the top portion 22*a*, has a unitary, one-piece configuration. The first portion 22, such as the top portion 22*a*, is made with the manufacturing process 78 (see FIG. 1) comprising one of, a three-dimensional (3D) printing process 80 (see FIG. 1), an injection molding process 82 (see FIG. 1), or another suitable manufacturing process.

As shown in FIGS. 4A-4F, the first portion 22, such as the top portion 22*a*, has the hinged end 16, such as the first portion hinged end 16*a*, with the first portion opening 23 (see FIGS. 4A-4B), which is a through opening formed through the first portion hinged end 16*a* of the first portion 22, to receive the hinge pin 18 (see FIG. 3A). As shown in FIGS. 4A-4B, the first portion hinged end 16*a* with the first portion opening 23 is substantially circular in shape. As further shown in FIGS. 4A-4D, 4F, the first portion 22, such as the top portion 22*a*, has the non-hinged end 20, such as the first portion non-hinged end 20*a*, opposite the first portion hinged end 16*a*, where the first portion non-hinged end 20*a* has the outer tab 38, such as the first portion outer tab 38*a*, with the lockout hole 40, such as the first portion lockout hole 40*a*.

As shown in FIGS. 4A-4B, the first portion 22 has a first portion body 186 that is integral with the first portion hinged end 16*a* and the first portion outer tab 38*a* at the first portion non-hinged end 20*a*. As further shown in FIGS. 4A-4B, the first portion body 186 has an exterior side 188*a* and an interior side 188*b*, where each of the exterior side 188*a* and the interior side 188*b* has the semi-circular profile 34 with the arc shape 36. The interior side 188*b* (see FIGS. 4C, 16A) is configured to be adjacent, and is adjacent, to the exterior portion 52*a* (see FIG. 16A) of the cap 52 (see FIG. 16A), with the hinged ring 14 (see FIG. 16B) in the closed position 26 (see FIG. 16B) and in the locked position 86 (see FIG. 16B) around the exterior portion 52*a* of the cap 52 and the plug 115 (see FIG. 16B), and with the plug 115 in the unplugged position 168 (see FIG. 16B). Further, the interior side 188*b* (see FIGS. 4C, 17B) is configured to be adjacent, and is adjacent, to the exterior portion 150*a* (see FIG. 17B) of the power outlet 150 (see FIG. 17B), with the hinged ring 14 (see FIG. 17B) in the closed position 26 (see FIG. 17B) and in the locked position 86 (see FIG. 17B) around the exterior portion 150*a* of the power outlet 150 and around the plug 115, and with the plug 115 in the plugged-in position 170 (see FIG. 17B).

As shown in FIGS. 3B, 4C-4D, the first portion body 186 has the interior cut-out portion 46 cut out between curved side edge portions 190, and the interior cut-out portion 46 and the curved side edge portions 190 are adjacent to the first portion body 186. As shown in FIG. 16B, the interior cut-out portion 46 is configured to provide clearance, and provides clearance, for the exterior lip 58 of the cap 52, with the hinged ring 14 in the closed position 26 and in the locked position 86 around the exterior portion 52*a* of the cap 52 and the plug 115, and with the plug 115 in the unplugged position 168.

Figure 17C:
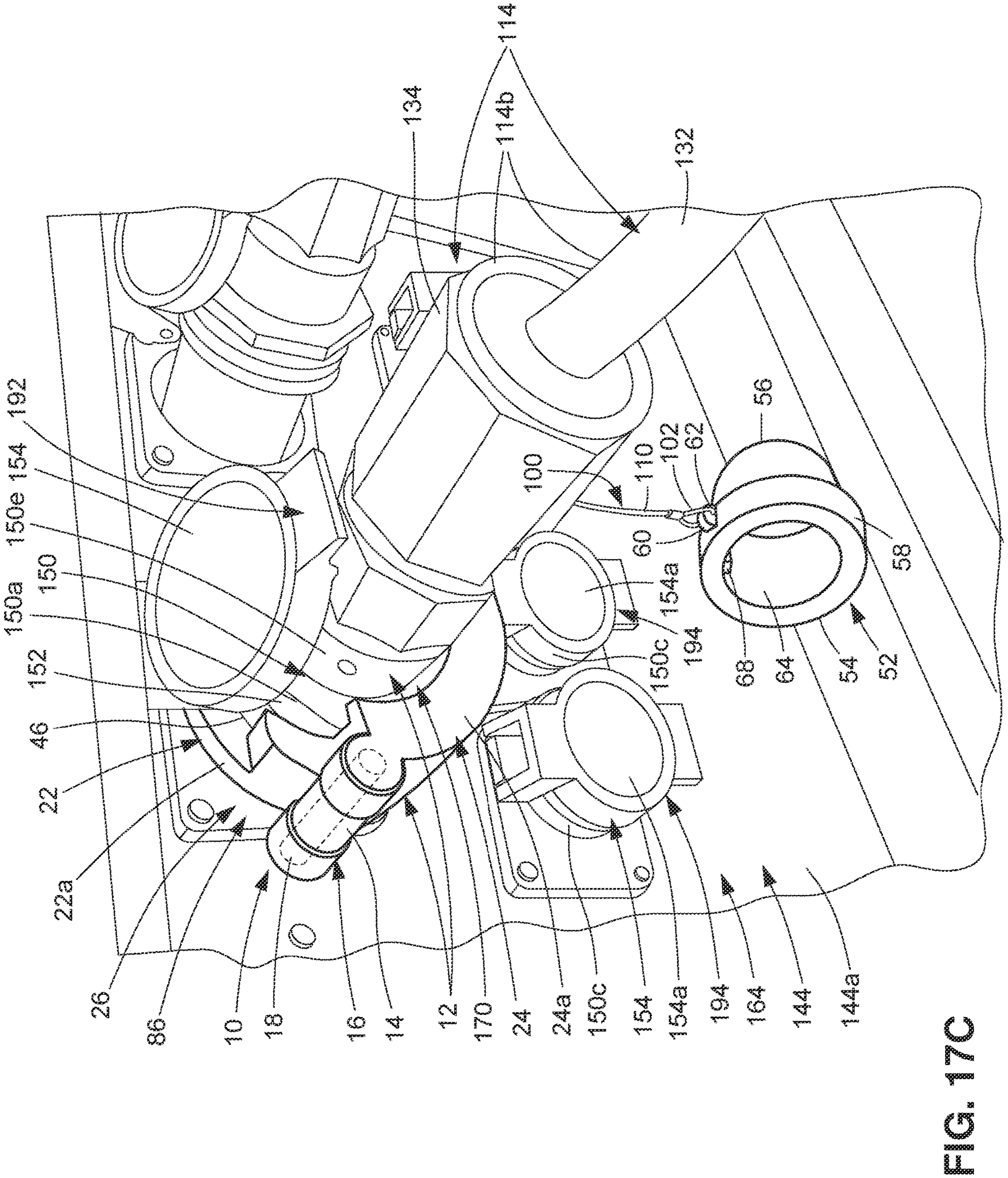
FIG. 17C is an illustration of a side perspective view of the access control system and the access control assembly of FIG. 17A, showing the hinged ring locked around a second power outlet on the power cart and around a plug end of a second power plug assembly of FIG. 17A.

Further, as shown in FIG. 17C, the interior cut-out portion 46 is configured to provide clearance, and provides clearance, for the hinged power outlet cover plate 154 coupled to the power outlet 150, with the hinged power outlet cover plate 154 in an open position 192 with the plug end 118 of the plug 115 plugged into the power outlet 150 in the plugged-in position 170. FIG. 17C also shows hinged power outlet cover plates 154 in a closed position 194.

Figure 5A:
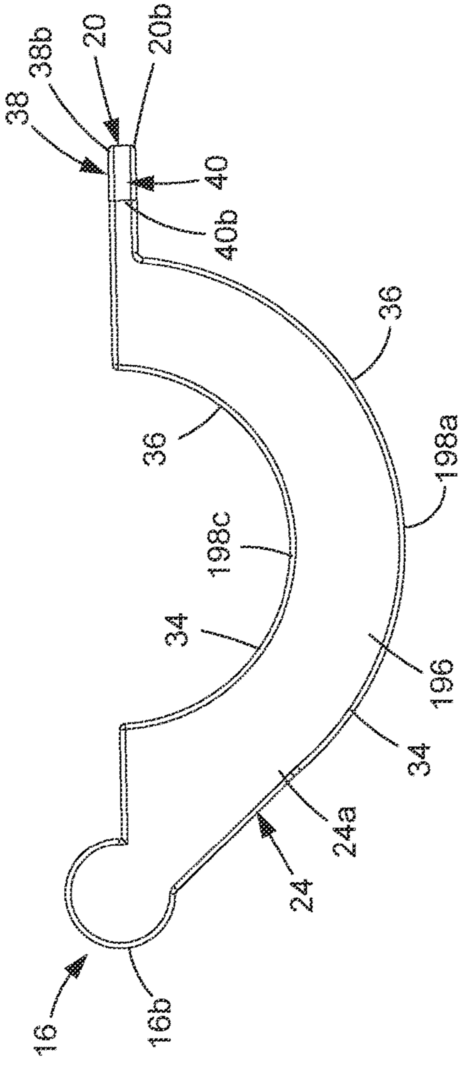
FIG. 5A is an illustration of a front view of a second portion of the hinged ring of FIG. 2A.
Figure 5B:
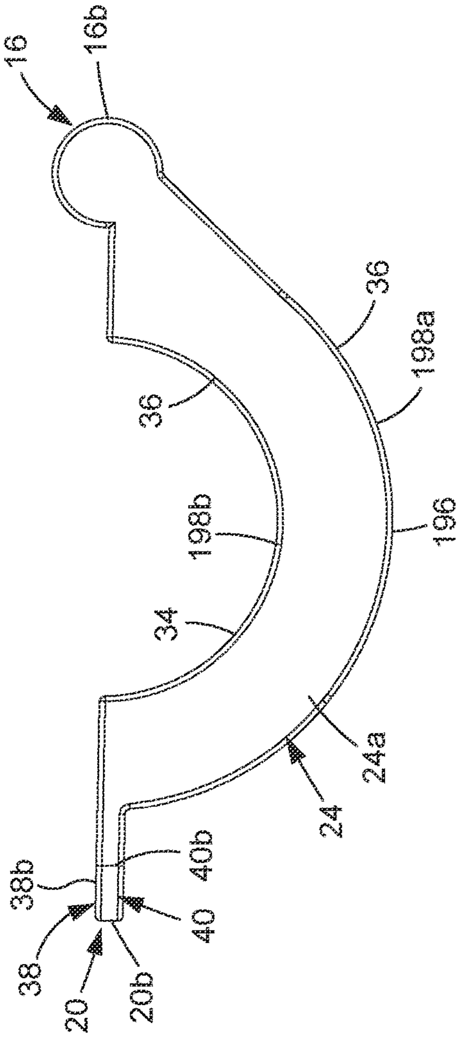
FIG. 5B is an illustration of a back view of the second portion of the hinged ring of FIG. 5A.
Figure 5E:
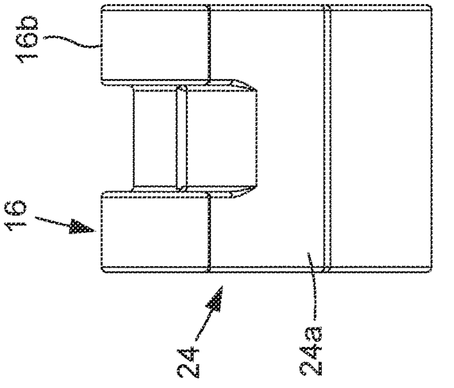
FIG. 5E is an illustration of a left side view of the second portion of the hinged ring of FIG. 5A.
Figure 5F:
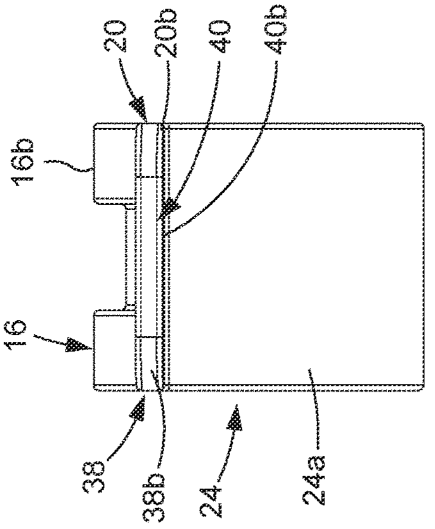
FIG. 5F is an illustration of a right side view of the second portion of the hinged ring of FIG. 5A.
Figure 5C:
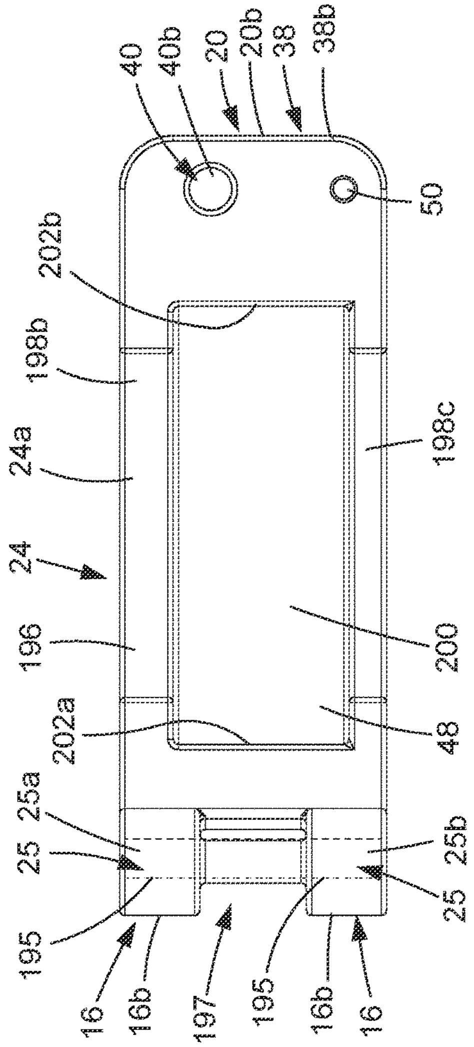
FIG. 5C is an illustration of a top view of the second portion of the hinged ring of FIG. 5A.
Figure 5D:
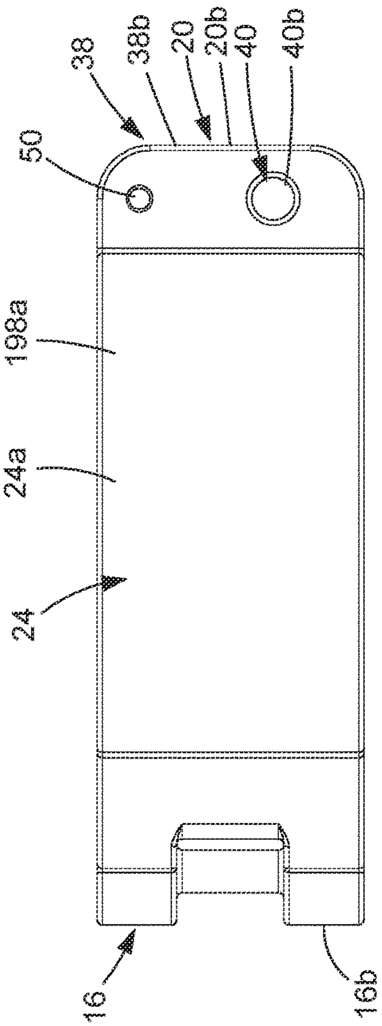
FIG. 5D is an illustration of a bottom view of the second portion of the hinged ring of FIG. 5A.

Now referring to FIGS. 5A-5F, FIGS. 5A-5F show a second portion 24, such as a bottom portion 24*a*, of the hinged ring 14 of FIG. 2A. FIG. 5A is an illustration of a front view of the second portion 24, such as the bottom portion 24*a*, of the hinged ring 14 of FIG. 2A. FIG. 5B is an illustration of a back view of the second portion 24, such as the bottom portion 24*a*, of the hinged ring 14 of FIG. 5A. FIG. 5C is an illustration of a top view of the second portion 24, such as the bottom portion 24*a*, of the hinged ring 14 of FIG. 5A. FIG. 5D is an illustration of a bottom view of the second portion 24, such as the bottom portion 24*a*, of the hinged ring 14 of FIG. 5A. FIG. 5E is an illustration of a left side view of the second portion 24, such as the bottom portion 24*a*, of the hinged ring 14 of FIG. 5A. FIG. 5F is an illustration of a right side view of the second portion 24, such as the bottom portion 24*a*, of the hinged ring 14 of FIG. 5A.

Preferably, the second portion 24, such as the bottom portion 24*a*, has a unitary, one-piece configuration. The second portion 24, such as the top portion 22*a*, is made with the manufacturing process 78 (see FIG. 1) comprising one of, the three-dimensional (3D) printing process 80 (see FIG. 1), the injection molding process 82 (see FIG. 1), or another suitable manufacturing process.

As shown in FIGS. 5A-5F, the second portion 24, such as the bottom portion 24*a*, has the hinged end 16, such as the second portion hinged end 16*b*, with the second portion openings 25 (see FIG. 5C), such as second portion openings 25*a*, 25*b* (see FIG. 5C), which are openings formed through interior portions 195 (see FIG. 5C) of the second portion hinged end 16*b* sides or portions of the second portion 24, to receive the hinge pin ends 19 (see FIG. 3A) of the hinge pin 18 (see FIG. 3A). As shown in FIG. 5C, there is a gap 197 between the second portion hinged end 16*b* sides or portions. The gap 197 is configured to receive the first portion hinged end 16*a* (see FIG. 4A), when the first portion 22 is joined together, or assembled together, with the second portion 24, and attached via the hinge pin 18 (see FIG. 3A). As shown in FIGS. 5A-5B, each portion of the second portion hinged end 16*a* with the second portion openings 25 is substantially circular in shape.

As further shown in FIGS. 5A-5D, 5F, the second portion 24, such as the bottom portion 24*a*, has the non-hinged end 20, such as the second portion non-hinged end 20*b*, opposite the second portion hinged end 16*b*, where the second portion non-hinged end 20*b* has the outer tab 38, such as the second portion outer tab 38*b*, with the lockout hole 40, such as the second portion lockout hole 40*b*, and the cap attachment hole 50 (see FIGS. 5C-5D).

As shown in FIGS. 3B, 5A-5C, the second portion 24 has a second portion body 196 that is integral with the second portion hinged end 16*b* and the second portion outer tab 38*b* at the second portion non-hinged end 20*b*. As further shown in FIGS. 3B, 5A-5B, the second portion body 196 has an exterior side 198*a* (see also FIG. 5D) and interior sides 198*b*, 198*c* (see also FIG. 5C), where each of the exterior side 198*a* and the interior sides 198*b*, 198*c*, has the semi-circular profile 34 with the arc shape 36. As further shown in FIGS. 3B, 5C, the second portion body 196 has the interior concave recessed portion 48 recessed between and below the interior sides 198*b*. 198*c*. The interior concave recessed portion 48 (see FIGS. 3B, 5C) comprises a concave surface 200 (see FIGS. 3B, 5C) having a semi-circular profile 34*a* (see FIG. 3B) with an arc shape 36*a* (see FIG. 3B). The concave surface 200 terminates at opposite ends at C-shaped cut-out end portions 202*a*. 202*b* (see FIGS. 3B, 5C). As shown in FIGS. 3B, 5C, the C-shaped cut-out end portion 202*a* is integral with the second portion hinged end 16*b* sides or portions, and the C-shaped cut-out end portion 202*b* is integral with the second portion outer tab 38*b*.

As shown in FIG. 16B, with the plug end 118 of the plug 115 in the unplugged position 168 and covered with the cap 52, and with the hinged ring 14 in the closed position 26 and in the locked position 86, the interior concave recessed portion 48 of the second portion 24 receives, and is engaged with, a portion 58*a* of the exterior lip 58 of the cap 52, and with a collar portion 204 of the coupling element 134 of the power plug assembly 114. As shown in FIG. 16A, the interior concave recessed portion 48 is also engaged with the portion 58*a* of the exterior lip 58 of the cap 52, and is also engaged with the collar portion 204, with the hinged ring 14 in the open position 28.

Further, as shown in FIG. 16A, the interior side 198*b* of the second portion 24 is configured to receive, and is engaged with, an exterior portion 52*b* of the cap 52 adjacent to a top end of the exterior lip 58 of the cap 52, with the hinged ring 14 in the open position 28, and similarly with the hinged ring 14 in the closed position 26 (see FIG. 16B) and in the locked position 86 (see FIG. 16B). Further, as shown in FIG. 16A, the interior side 198*c* of the second portion 24 is configured to receive, and is engaged with, a neck portion 205 of the coupling element 134 of the power plug assembly 114, with the hinged ring 14 in the open position 28, and similarly with the hinged ring 14 in the closed position 26 (see FIG. 16B) and in the locked position 86 (see FIG. 16B).

As shown in FIG. 17B, with the plug end 118 of the plug 115 plugged into the power outlet 150 in the plugged-in position 170, and with the hinged ring 14 in the closed position 26 and in the locked position 86, the interior concave recessed portion 48 of the second portion 24 receives, and is engaged with, an exterior portion 150*a* of the power outlet 150, an exterior collar portion 204*a* of the coupling element 134, and an exterior portion 122*a* of the plug sleeve 122 housing the plug pins 126 (see FIG. 15A). Further, as shown in FIG. 17B, the interior side 198*c* of the second portion 24 is configured to receive, and is engaged with, a neck portion 205*a* of the coupling element 134.

Figure 6A:
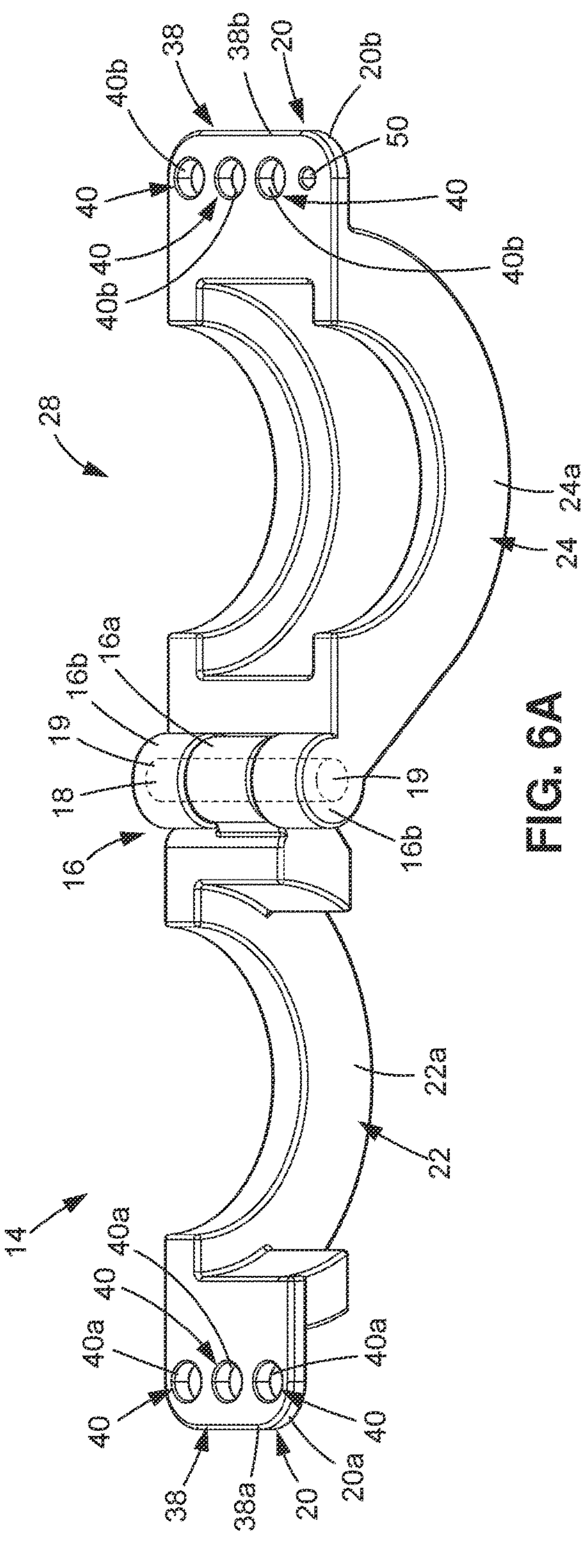
FIG. 6A is an illustration of a front perspective view of another exemplary version of a hinged ring in an open position.
Figure 6B:
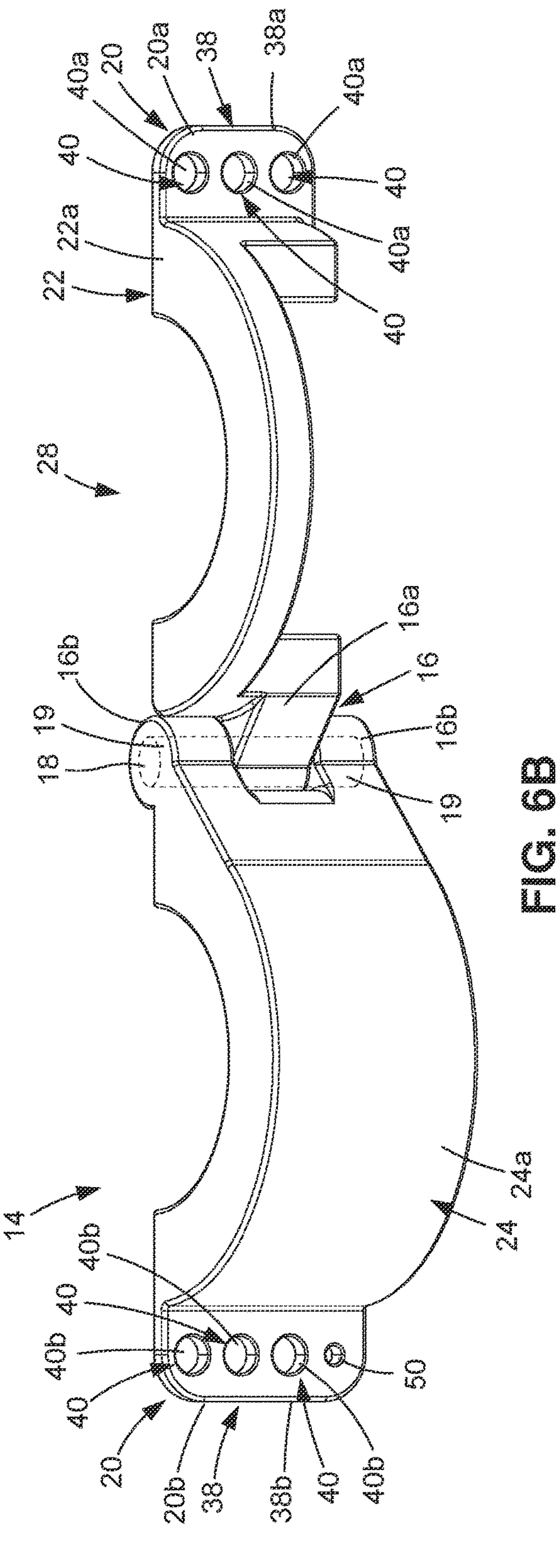
FIG. 6B is an illustration of a bottom perspective view of the hinged ring of FIG. 6A in the open position.

Now referring to FIGS. 6A-6B, FIG. 6A is an illustration of a front perspective view of another exemplary version of a hinged ring 14 in an open position 28, where the hinged ring 14 has multiple lockout holes 40, and FIG. 6B is an illustration of a bottom perspective view of the hinged ring 14 of FIG. 6A in the open position 28.

As shown in FIGS. 6A-6B, in this version of the hinged ring 14, the first portion 22, such as the top portion 22*a*, has three (3) lockout holes 40, such as the first portion lockout holes 40*a*, formed through the outer tab 38, such as the first portion outer tab 38*a*, at the non-hinged end 20, such as the first portion non-hinged end 20*a*. Further, as shown in FIGS. 6A-6B, in this version of the hinged ring 14, the second portion 24, such as the bottom portion 24*a*, has three (3) lockout holes 40, such as the second portion lockout holes 40*b*, formed through the outer tab 38, such as the second portion outer tab 38*b*, at the non-hinged end 20, such as the second portion non-hinged end 20*b*. FIGS. 6A-6B further show the cap attachment hole 50 aligned horizontally with the three (3) second portion lockout holes 40*b* and formed through the second portion outer tab 38*b* at the second portion non-hinged end 20*b* of the second portion 24.

FIGS. 6A-6B further show the first portion 22 pivotably and hingedly connected to the second portion 24, via the hinge pin 18 at the hinged end 16. As shown in FIGS. 6A-6B, the hinge pin 18 is partially inserted through the first portion hinged end 16*a* and the hinge pin ends 19 are inserted through the second portion hinged end 16*b* sides or portions.

Figure 7B:
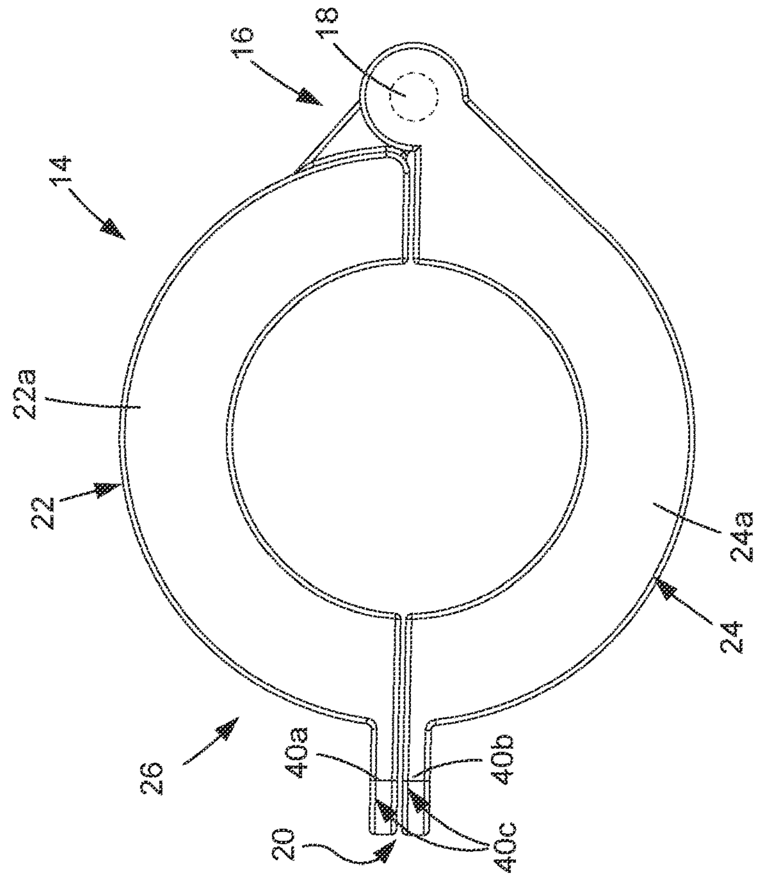
FIG. 7B is an illustration of a back view of the hinged ring of FIG. 7A in the closed position.
Figure 7A:
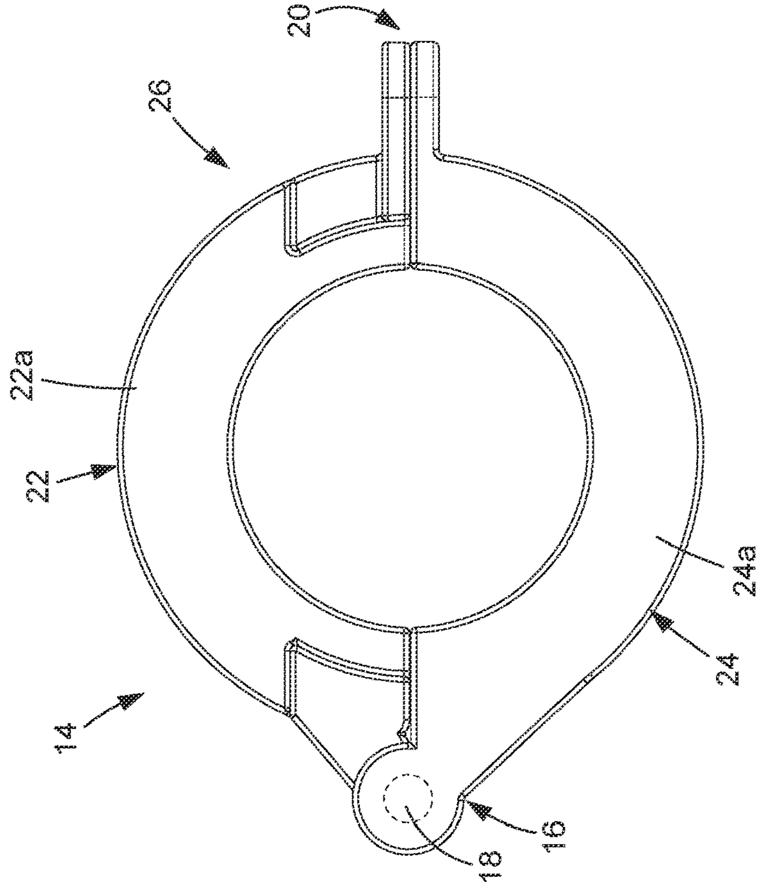
FIG. 7A is an illustration of a front view of the hinged ring of FIG. 6A in a closed position.
Figure 7C:
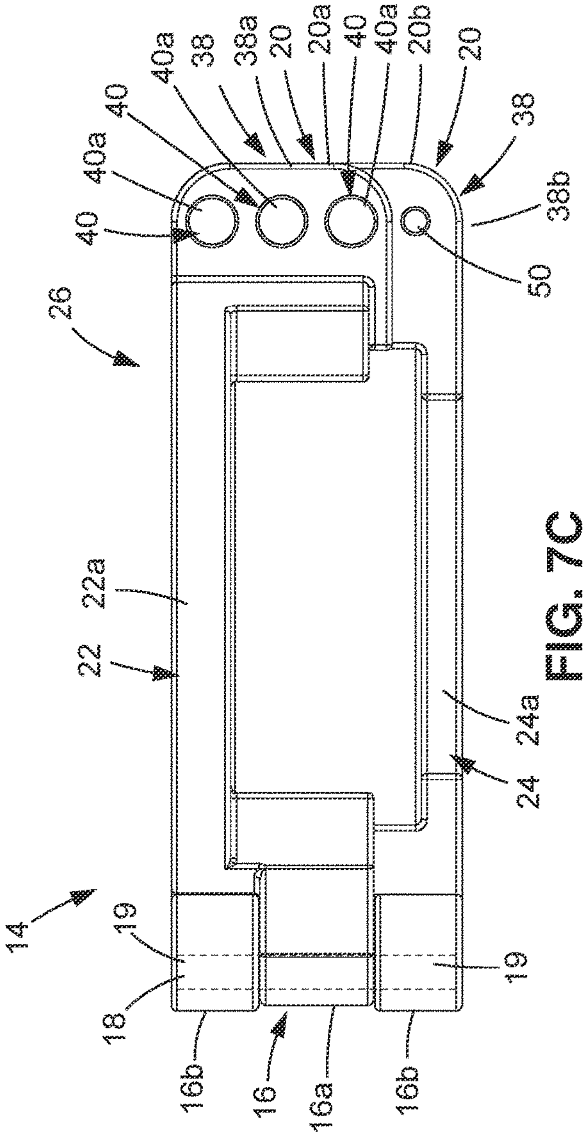
FIG. 7C is an illustration of a top view of the hinged ring of FIG. 7A in the closed position.
Figure 7D:
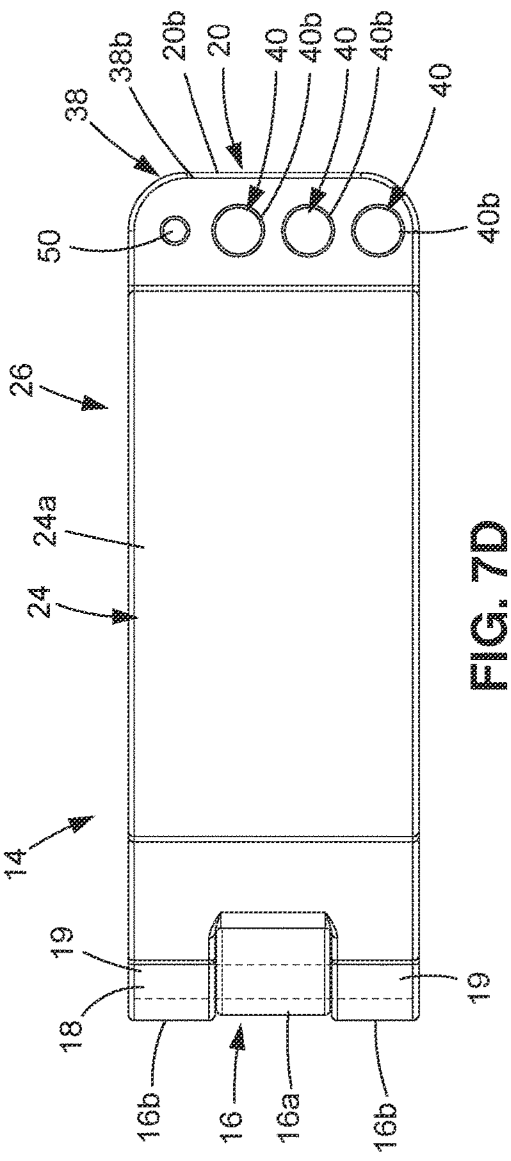
FIG. 7D is an illustration of a bottom view of the hinged ring of FIG. 7A in the closed position.

Now referring to FIGS. 7A-7D, FIGS. 7A-7D show the hinged ring 14 of FIG. 6A in the closed position 26. FIG. 7A is an illustration of a front view of the hinged ring 14 of FIG. 6A in the closed position 26. FIG. 7B is an illustration of a back view of the hinged ring 14 of FIG. 7A in the closed position 26. FIG. 7C is an illustration of a top view of the hinged ring 14 of FIG. 7A in the closed position 26. FIG. 7D is an illustration of a bottom view of the hinged ring 14 of FIG. 7A in the closed position 26.

As shown in FIG. 7C, in this version of the hinged ring 14, the first portion 22, such as the top portion 22*a*, has three (3) lockout holes 40, such as the first portion lockout holes 40*a*, formed through the outer tab 38, such as the first portion outer tab 38*a*, at the non-hinged end 20, such as the first portion non-hinged end 20*a*. Further, as shown in FIG. 7D, in this version of the hinged ring 14, the second portion 24, such as the bottom portion 24*a*, has three (3) lockout holes 40, such as the second portion lockout holes 40*b*, formed through the outer tab 38, such as the second portion outer tab 38*b*, at the non-hinged end 20, such as the second portion non-hinged end 20*b*. FIGS. 7C-7D further show the cap attachment hole 50 aligned horizontally with the three (3) second portion lockout holes 40*b* and formed through the second portion outer tab 38*b* at the second portion non-hinged end 20*b* of the second portion 24, such as the bottom portion 24*a*. FIG. 7B shows one of the first portion lockout holes 40*a* vertically aligned, or on top of one another, with one of the second portion lockout holes 40*b* to comprise the aligned lockout holes 40*c*.

FIGS. 7A-7D further show the first portion 22 pivotably and hingedly connected to the second portion 24, via the hinge pin 18 at the hinged end 16. As shown in FIGS. 7C-7D, the hinge pin 18 is partially inserted through the first portion hinged end 16*a* and the hinge pin ends 19 are inserted through the second portion hinged end 16*b* sides or portions.

Figure 8A:
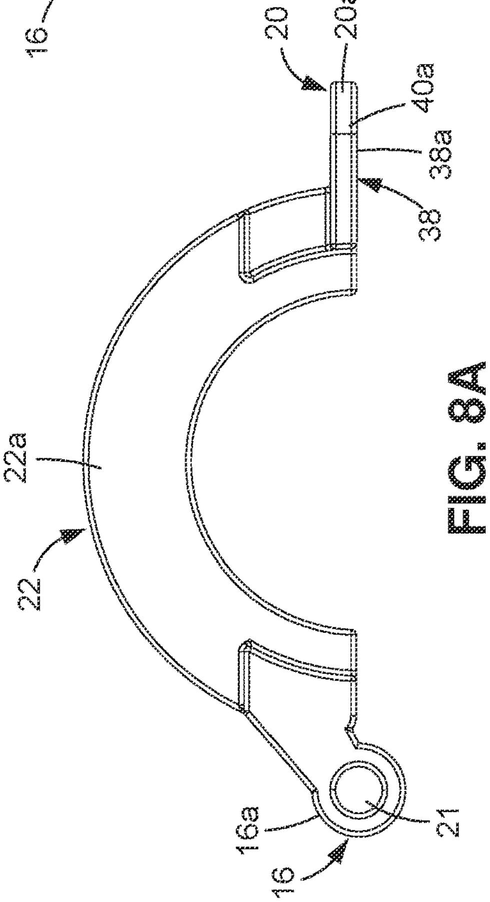
FIG. 8A is an illustration of a front view of a first portion of the hinged ring of FIG. 6A.
Figure 8B:
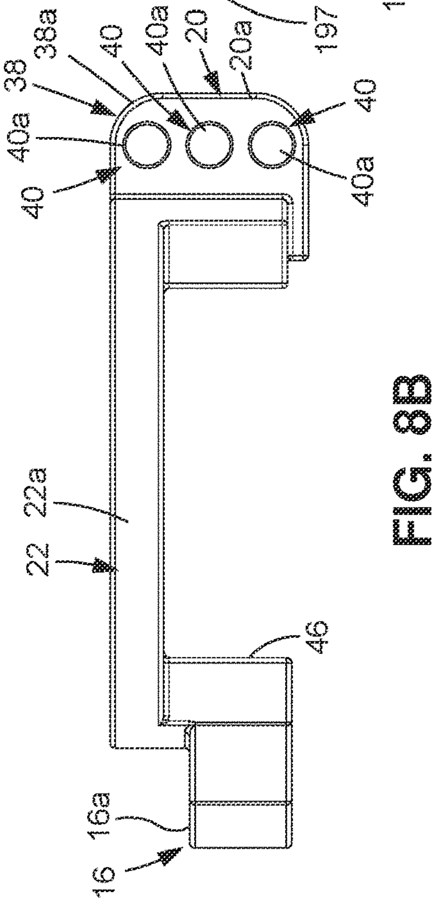
FIG. 8B is an illustration of a top view of the first portion of the hinged ring of FIG. 8A.

Now referring to FIGS. 8A-8B, FIG. 8A is an illustration of a front view of the first portion 22, such as the top portion 22*a*, of the hinged ring 14 of FIG. 6A, and FIG. 8B is an illustration of a top view of the first portion 22, such as the top portion 22*a*, of the hinged ring 14 of FIG. 8A, showing the three (3) lockout holes 40, such as the first portion lockout holes 40*a*, formed through the outer tab 38, such as the first portion outer tab 38*a*, at the non-hinged end 20, such as the first portion non-hinged end 20*a*. FIGS. 8A-8B further show the hinged end 16, such as the first portion hinged end 16*a*, with the first portion opening 23 (see FIG. 8A), of the first portion 22, such as the top portion 22*a*. FIG. 8B further shows the interior cut-out portion 46 of the first portion 22.

Figure 9A:
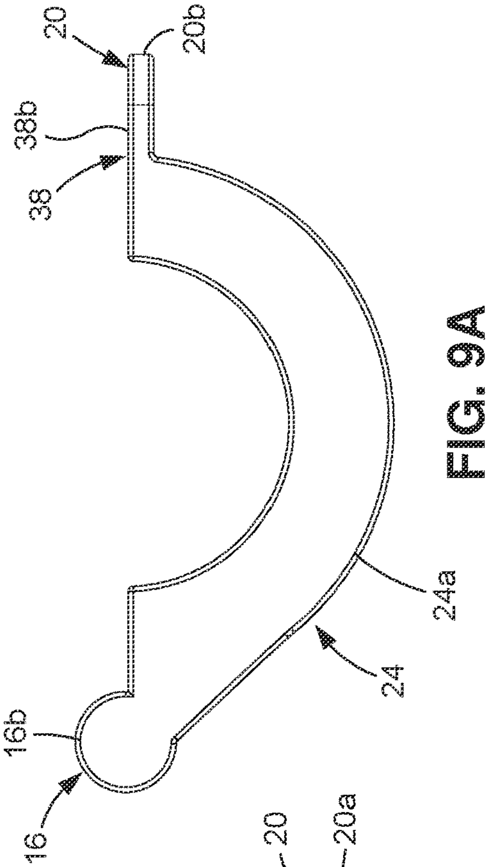
FIG. 9A is an illustration of a front view of a second portion of the hinged ring of FIG. 6A.
Figure 9B:
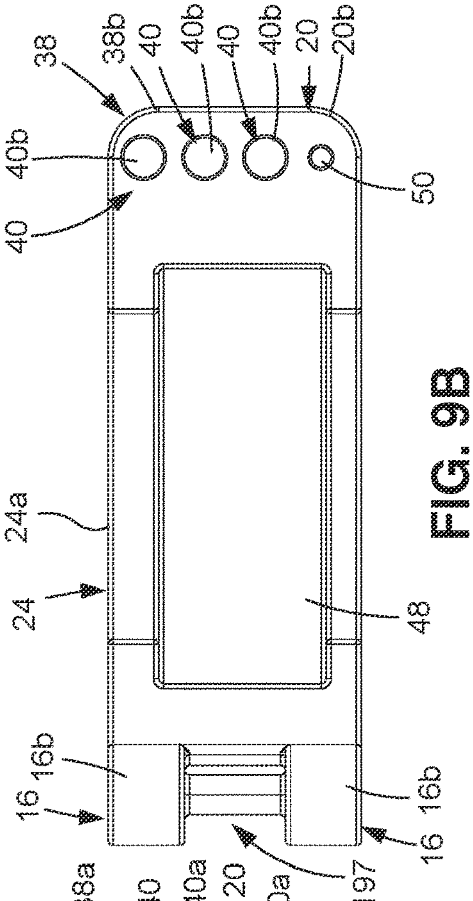
FIG. 9B is an illustration of a top view of the second portion of the hinged ring of FIG. 9A.

Now referring to FIGS. 9A-9B, FIG. 9A is an illustration of a front view of the second portion 24, such as the bottom portion 24*a*, of the hinged ring 14 of FIG. 6A, and FIG. 9B is an illustration of a top view of the second portion 24, such as the bottom portion 24*a*, of the hinged ring 14 of FIG. 9A, showing the three (3) lockout holes 40, such as the second portion lockout holes 40*b*, formed through the outer tab 38, such as the second portion outer tab 38*b*, at the non-hinged end 20, such as the second portion non-hinged end 20*b*. FIG. 9B further shows the cap attachment hole 50 aligned horizontally with the three (3) second portion lockout holes 40*b* and formed through the second portion outer tab 38*b* at the second portion non-hinged end 20*b* of the second portion 24, such as the bottom portion 24*a*.

FIGS. 9A-9B further show the hinged end 16, such as the second portion hinged end 16*b*. FIG. 9B shows the gap 197 between the second portion hinged end 16*b* sides or portions. FIG. 9B further shows the interior concave recessed portion 48.

Figure 10B:
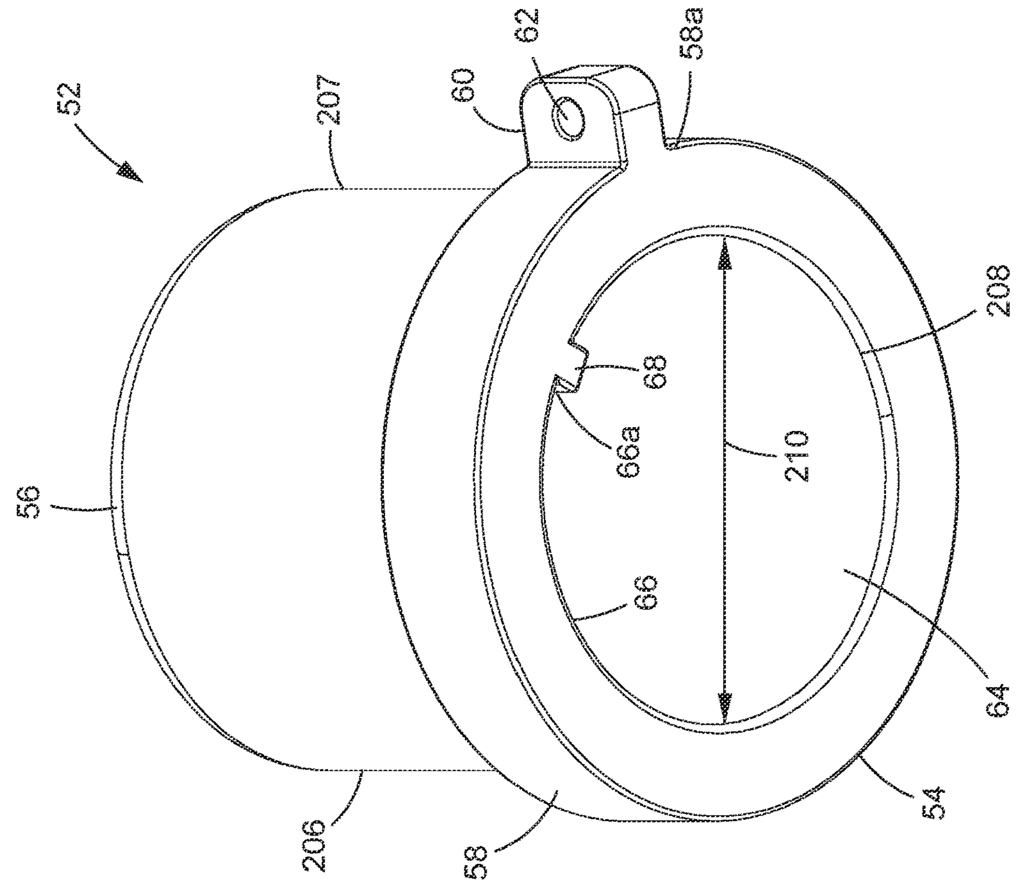
FIG. 10B is an illustration of a bottom perspective view of the cap of FIG. 10A.
Figure 10A:
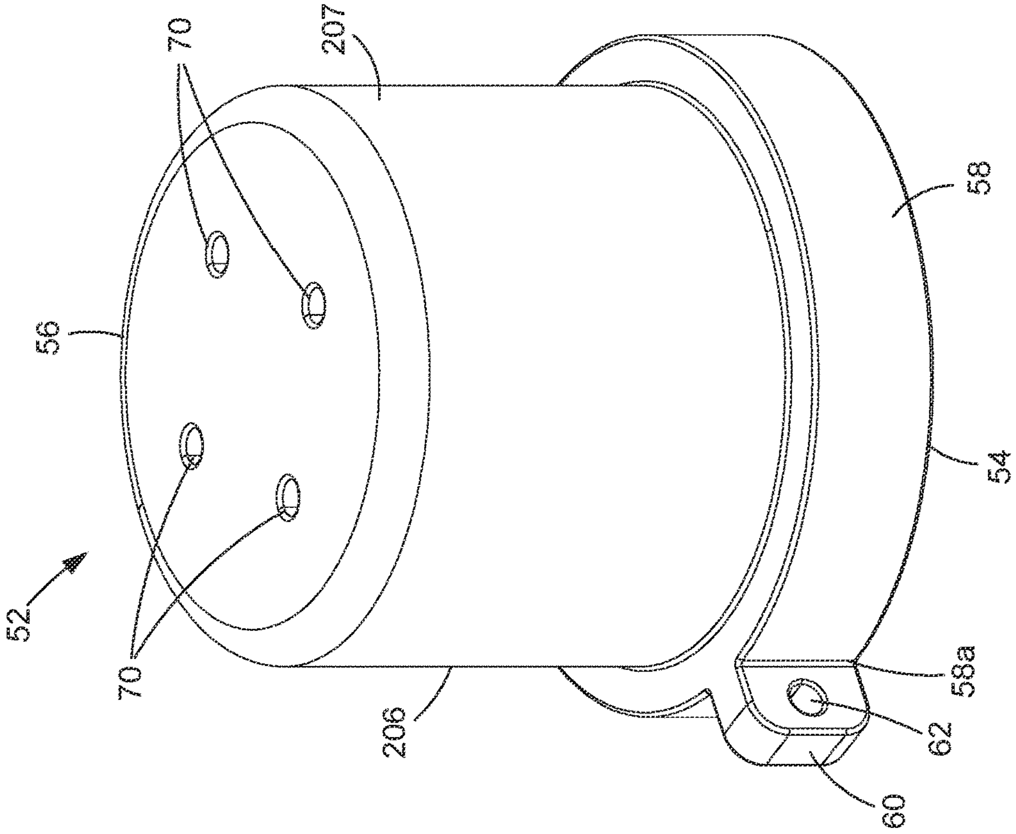
FIG. 10A is an illustration of a front perspective view of an exemplary version of a cap of an access control assembly of the disclosure.
Figure 10D:
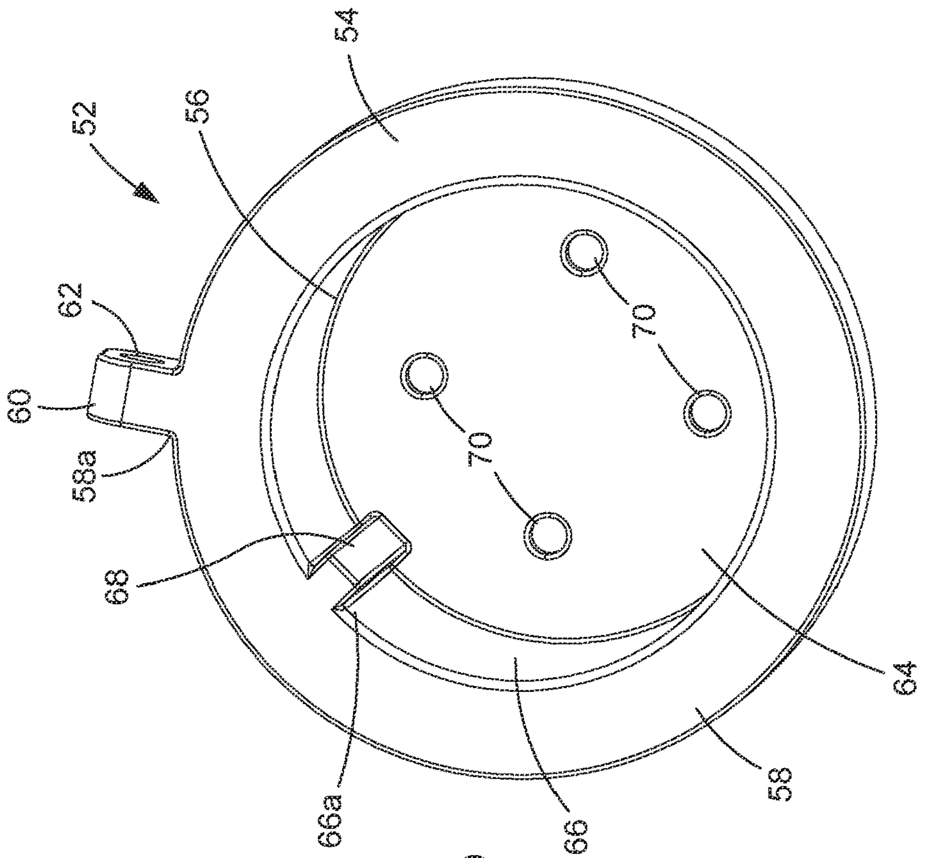
FIG. 10D is an illustration of a bottom perspective view of the cap of FIG. 10A.
Figure 10C:
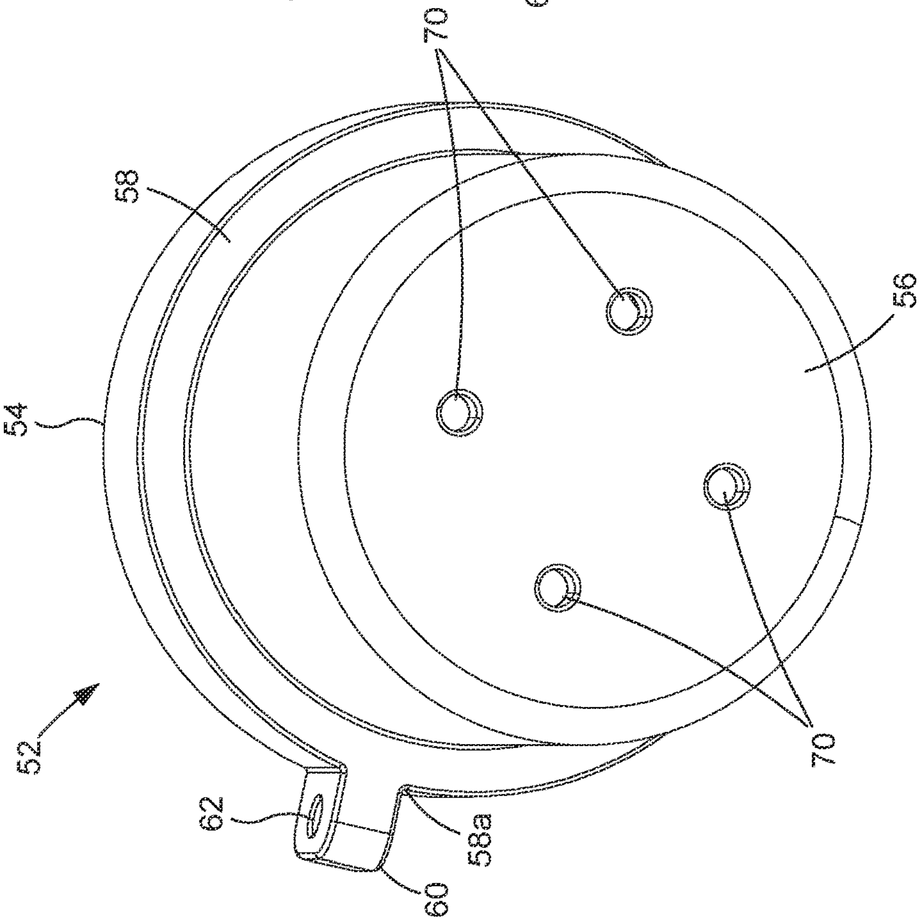
FIG. 10C is an illustration of a top perspective view of the cap of FIG. 10A.
Figure 11B:
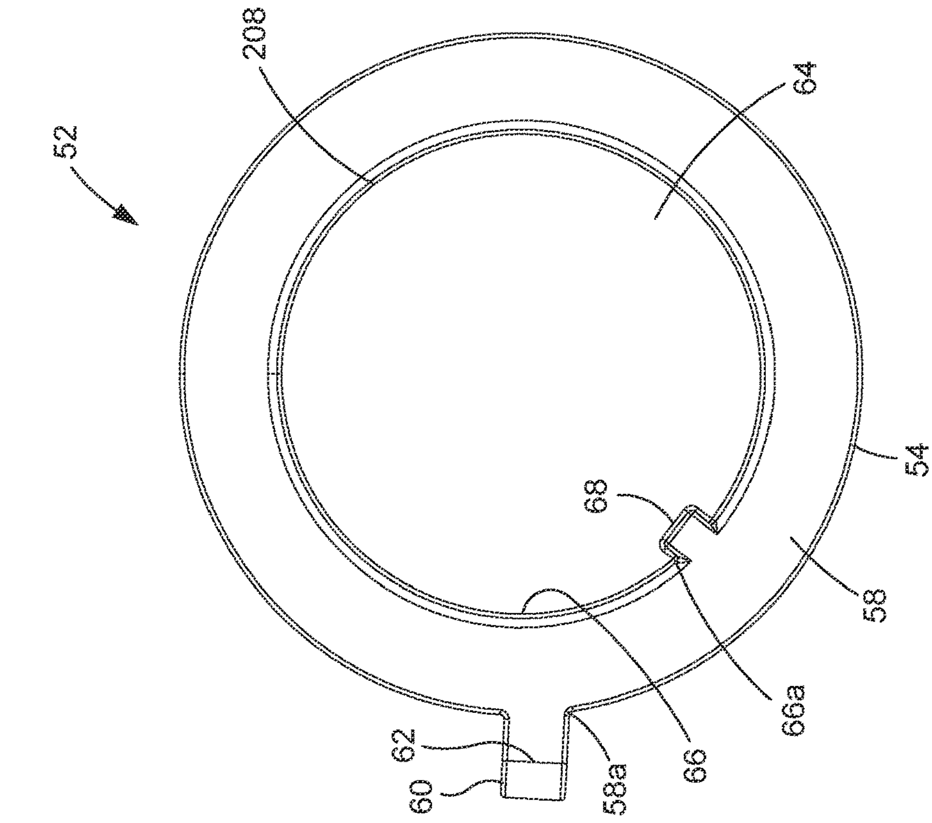
FIG. 11B is an illustration of a bottom view of the cap of FIG. 11A.
Figure 11A:
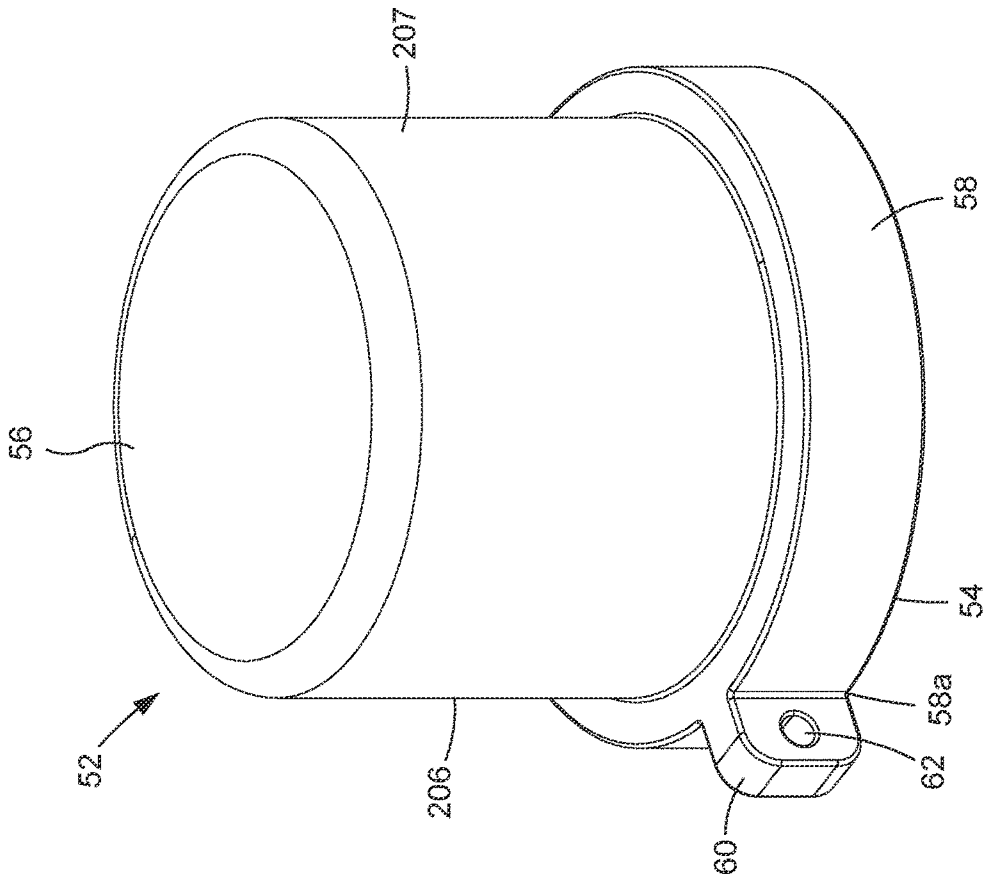
FIG. 11A is an illustration of a front perspective view of another exemplary version of a cap of an access control assembly of the disclosure.

Now referring to FIGS. 10A-10D, FIGS. 10A-10D show an exemplary version of the cap 52 used with a version of the access control assembly 10 (see FIG. 1) of the disclosure and configured to be attached to the hinged ring 14 (see FIGS. 2A, 3A, 12A). FIG. 10A is an illustration of a front perspective view of an exemplary version of the cap 52 of the access control assembly 10 (see FIG. 1) of the disclosure. FIG. 10B is an illustration of a bottom perspective view of the cap 52 of FIG. 10A. FIG. 10C is an illustration of a top perspective view of the cap 52 of FIG. 10A. FIG. 10D is an illustration of a bottom perspective view of the cap 52 of FIG. 10A.

As shown in FIGS. 10A-10D, and as discussed above, the cap 52 has the first end 54, the second end 56 opposite the first end 54, the exterior lip 58 formed around the exterior circumference of the first end 54, the attachment point tab 60 extending or projecting outwardly from a portion 58*a* of the exterior lip 58, and the attachment point tab 60 having an opening 62 formed through the thickness of the body of the attachment point tab 60. As further shown in FIGS. 10B, 10D, the cap 52 has the internal cavity 64 with the interior wall 66 having the interior ridge 68 projecting from a portion 66*a* of the interior wall 66. As shown in FIG. 10D, the interior ridge 68 extends vertically along the portion 66*a* of the interior wall 66 from the first end 54 to the second end 56 of the cap 52. The interior ridge 68 is configured to mate with, or fit within, the alignment slot 124 (see FIG. 15B) located on the exterior portion 125 (see FIG. 15B) of the plug sleeve 122 (see FIG. 15B) of the plug 115 (see FIG. 15B).

In one version of the cap 52, the second end 56 has drain holes 70 (see FIGS. 10A, 10C-10D) formed through the second end 56 of the cap 52, to provide a means to drain water, such as rainwater, or melted snow, or other liquids out of the cap 52, for example, when the cap 52 is attached to the hinged ring 14, and the hinged ring 14 is coupled to the power outlet 150 and the plug 115 in an outdoor environment. As shown in FIGS. 10A, 10C-10D, in one version, the cap 52 has four (4) drain holes 70 formed through the second end 56. However, the cap 52 may have one (1), two (2), or three (3) drain holes 70, or the cap 52 may have greater than four (4) drain holes 70 formed through the second end 56.

As shown in FIGS. 10A-10B, the cap 52 has a cylindrical body 206 with a cylinder shape 207, where the cylindrical body 206 is disposed between a top end of the exterior lip 58 and the second end 56 of the cap 52. As further shown in FIGS. 10A-10B, the opening 62 through the attachment point tab 60 is designed to be a sufficient shape and size to receive a first end 102 (see FIG. 12A) of the cap connector element 100 (see FIGS. 1, 12A). In one version, FIGS. 10A-10B show the shape of the opening 62 is circular or round. However, in other versions, the shape of the opening 62 may be another geometric shape, as long as it is of a sufficient size to receive the cap connector element 100.

As shown in FIG. 10B, the internal cavity 64 of the cap 52 has an opening 208 with a diameter 209. The opening 208 and the diameter 209 of the opening 208 are configured to receive the plug 115 (see FIG. 16B) of the power plug assembly 114 (see FIG. 16B), when the cap 52 is used to cover the plug end 118 (see FIG. 16B) in the unplugged position 168 (see FIG. 16B) and the hinged ring 14 (see FIG. 16B) is closed and locked around the cap 52 and the plug 115. Further, the internal cavity 64 (see FIGS. 10B, 10D) of the cap 52 is substantially hollow and is configured to receive the plug end 118 (see FIG. 16B) and the plug sleeve 122 (see FIG. 16B) of the plug 115 (see FIG. 16B) of the power plug assembly 114, when the cap 52 is used to cover the plug end 118 in the unplugged position 168 (see FIG. 16B) and the hinged ring 14 (see FIG. 16B) is closed and locked around the cap 52 and the plug 115.

Now referring to FIGS. 11A-11B, FIG. 11A is an illustration of a front perspective view of another exemplary version of the cap 52 used with a version of the access control assembly 10 (see FIG. 1) of the disclosure, and FIG. 11B is an illustration of a bottom view of the cap 52 of FIG. 11A. As shown in FIGS. 11A-11B, in this version, the second end 56 of the cap 52 has no drain holes 70 (see FIG. 10A) and the second end 56 is closed completely. In this version, the cap 52 may be attached to the hinged ring 14, and the hinged ring 14 is coupled to the power outlet 150 and the plug 115 in an indoor environment. All of the other features of the cap 52 in this version without the drain holes 70 (see FIG. 10A) are the same as the features of the cap 52 in FIG. 10A having the drain holes 70.

FIGS. 11A-11B show the first end 54, the cylindrical body 206 (see FIG. 11A) with the cylinder shape 207 (see FIG. 11A), the second end 56 (see FIG. 11A) opposite the first end 54, the exterior lip 58 formed around the exterior circumference of the first end 54, the attachment point tab 60 extending, or projecting, outwardly from the portion 58*a* of the exterior lip 58, and the attachment point tab 60 having the opening 62 formed through the thickness of the body of the attachment point tab 60. As further shown in FIG. 11B, the cap 52 has the internal cavity 64 with the opening 208 and with the interior wall 66 having the interior ridge 68 projecting from the portion 66*a* of the interior wall 66.

Now referring to FIGS. 12A-12B, FIG. 12A is an illustration of a perspective view of a version of an access control assembly 10 of the disclosure, including a top perspective view of the hinged ring 14 of the access control assembly 10 and a bottom perspective view of the cap 52 of the access control assembly 10, where the cap 52 is attached to the hinged ring 14 with the cap connector element 100, in the form of an aramid braided cord 106. FIG. 12B is an illustration of a top view of the hinged ring 14 and a side view of the cap 52 of the access control assembly 10 of FIG. 12A.

As shown in FIGS. 12A-12B, the cap connector element 100 has the first end 102, such as a looped first end 102*a*, connected to the attachment point tab 60 of the cap 52, and in particular, the first end 102, such as the looped first end 102*a*, is inserted through, or looped through, the opening 62 in the attachment point tab 60 of the cap 52. As further shown in FIGS. 12A-12B, the cap connector element 100 has the second end 104, such as a looped second end 104*a*, connected to, and inserted through, or looped through, the cap attachment hole 50 on the outer tab 38, such as the second portion outer tab 38*b*, at the non-hinged end 20, such as the second portion non-hinged end 20*b*, of the second portion 24, such as the bottom portion 24*a*, of the hinged ring 14.

The cap connector element 100 is of a sufficient length so that the cap 52 can be maintained at a sufficient distance from the hinged ring 14, when the hinged ring 14 is in the closed position 26 (see FIGS. 12A-12B, 17B) and in the locked position 86 (see FIGS. 12A-12B, 17B), such as around the power outlet 150 (see FIG. 17B) and the plug end 118 of the plug 115 plugged into the power outlet 150, so as not to interfere with the power outlet 150 and the plug end 118 of the plug 115 plugged into the power outlet 150. Further, the cap connector element 100 is of a sufficient length to allow the cap 52 to adequately cover the plug 115 (see FIG. 16B), when the hinged ring 14 is in the closed position 26 (see FIGS. 12A-12B, 16B) and in the locked position 86 (see FIGS. 12A-12B, 16B), such as around the cap 52 and the plug 115 in the unplugged position 168 (see FIG. 16B).

FIGS. 12A-12B further show the locking element 84, such as in the form of a padlock 88, locking together the first portion 22, such as the top portion 22*a*, and the second portion 24, such as the bottom portion 24*a*, of the hinged ring 14 in the locked position 86, when the hinged ring 14 is in the closed position 26. As shown in FIGS. 12A-12B, the padlock 88 comprises a shackle 210 inserted through the lockout holes 40 of the first portion 22 and the second portion 24 at the non-hinged end 20, such as the first portion non-hinged end 20*a* (see FIG. 12B) and the second portion non-hinged end 20*b* (see FIGS. 12A-12B). As further shown in FIGS. 12A-12B, the shackle 210 is attached to the padlock body 211 which has internal locking mechanisms within the padlock body 211.

FIGS. 12A-12B further show the hinged end 16 of the hinged ring 14, where the hinged end 16 comprises the first portion hinged end 16*a* coupled between, and to, the second portion hinged end 16*b* sides or portions, via a hinge pin 18 (see FIG. 2C). FIGS. 12A-12B further show the cap 52 attached to the cap connector element 100, where the cap 52 comprises the first end 54 with the exterior lip 58, the second end 56, the cylindrical body 206, and the internal cavity 64 (see FIG. 12A).

Now referring to FIG. 13 is an illustration of a perspective view of a power plug assembly 114 of which a version of the access control assembly 10 (see FIGS. 1, 12A) of the disclosure may be used with, and showing the power plug assembly 114 attached at a first end 212*a* to the power outlet 150 on a power cart 164 and attached at a second end 212*b* to an equipment apparatus 140, such as a fresh air supply unit 142. The power plug assembly 114 may be attached to another suitable equipment apparatus 140, or to another suitable structure or apparatus, powered with electrical power from a power source 144 (see FIG. 13), such as an electrical power source 144*a* (see FIG. 13). The power plug assembly 114 is part of the access control system 12 (see FIG. 1).

As shown in FIG. 13, the power plug assembly 114 comprises the plug, such as the power plug 115*a*, for example, in the form of the pin and sleeve plug 116, couple, or attached, to the power outlet 150, such as the pin and sleeve power outlet 152, having the hinged power outlet cover plate 154. As further shown in FIG. 13, the power plug assembly 114 comprises the coupling element 134 having a first end 145 coupled, or attached, to the plug 115, and having a second end 146 coupled, or attached, to the power cord 132. The coupling element 134 couples the power cord 132 to the plug 115. As shown in FIG. 13, the coupling element 134 has a body 148 formed between the first end 145 and the second end 146.

As further shown in FIG. 13, the power plug assembly 114 comprises the power cord 132 having a first end 136 coupled, or attached, to the second end 146 of the coupling element 134, and having a second end 138 coupled, or attached, to the equipment apparatus 140, such as a fresh air supply unit 142. The second end 138 of the power cord 132 may be attached to another suitable equipment apparatus 140, or to another suitable structure or apparatus. The power plug assembly 114 is part of the access control system 12 (see FIG. 1). As shown in FIG. 13, the power cord 132 has a cord body 213 formed between the first end 145 and the second end 146.

As shown in FIG. 13, the power outlet 150 is coupled, or attached, to the power source 144, such as the electrical power source 144*a*, comprising the power cart 164. As shown in FIG. 13, the power cart 164 is portable and movable via wheels 215, and the power cart 164 has a housing compartment 216 to store suitable power mechanisms and power systems to supply and distribute power, such as electrical power, to the equipment apparatus 140. The power cart 164 shown in FIG. 13 is an example of a power source 144. However, other suitable power sources 144, as shown in FIG. 1, may include a power station 176, a power strip 178, a power generator 180, electrical wiring 182 in a wall 184 of a structure 185, or another suitable power source. As shown in FIG. 13, the power cart 164 comprises two (2) upper power outlets 150*b* and four (4) lower power outlets 150*c* positioned underneath the upper power outlets 150*b*.

Now referring to FIGS. 14A-14B, FIG. 14A is an illustration of an enlarged side perspective view of a power outlet 150, such as an upper power outlet 150*b*, positioned on the power cart 164 of FIG. 13, and showing a hinged power outlet cover plate 154 of the power outlet 150 in a closed position 194. FIG. 14B is an illustration of an enlarged side perspective view of the power outlet 150, such as the upper power outlet 150*b*, on the power cart 164, of FIG. 14A, showing the hinged power outlet cover plate 154 in an open position 192. The power outlet 150 is part of the access control system 12 (see FIG. 1).

As shown in FIGS. 14A-14B, the power outlet 150, such as an upper power outlet 150*b*, preferably comprises a pin and sleeve power outlet 152, and has the hinged power outlet cover plate 154. As further shown in FIGS. 14A-14B, the power outlet 150, such as the upper power outlet 150*b*, has an inlet end 165 connecting with the power source 144, such as an electrical power source 144*a*, comprising the power cart 164. As further shown in FIGS. 14A-14B, the power outlet 150, such as the upper power outlet 150*b*, is mounted to an exterior surface 162 of the power cart 164, via a mount plate 218 attached with attachment elements 220, such as bolts, screws, or another suitable attachment element. FIGS. 14-14B further show the lower power outlets 150*c* positioned underneath the upper power outlet 150*b* and each lower power outlet 150*c* is also attached to the exterior surface 162 of the power cart 164 via a mount plates 218 and attachment elements 220. As shown in FIGS. 14A-14B, the lower power outlets 150*c* each has the hinged power outlet cover plate 154 comprising the spring-loaded hinged power outlet cover plate 154*a*.

FIG. 14A shows the hinged power outlet cover plates 154 of the upper power outlet 150*b* and the lower power outlets 150*c* in the closed position 194. FIG. 14B shows the hinged power outlet cover plate 154 of the upper power outlet 150*b* in the open position 192, and shows the spring-loaded hinged power outlet cover plates 154*a* of the lower power outlets 150*c* in the closed position 194.

As shown in FIG. 14B, the power outlet 150, such as the upper power outlet 150*b*, further comprises outlet openings 156, or socket openings, positioned within the interior 158 of the outlet receptacle 160, or outlet housing. In one version, as shown in FIG. 14B, the power outlet 150 has four (4) outlet openings 156, or socket openings, configured to receive the four (4) plug pins 126 of the plug 115 shown in FIG. 15A. However, in other versions, the power outlet 150 may comprise one (1), two (2), or three (3) outlet openings 156, or more than four (4) outlet openings 156, depending on the number of plug pins 126, or prongs, the plug 115 has. When the plug pins 126 (see FIG. 15A) of the plug 115 are plugged into the outlet openings 156, or socket openings, an electrical connection 172 is created or made to distribute power.

Now referring to FIGS. 15A-15B, FIG. 15A is an illustration of an enlarged top perspective view of the plug end 118 of the plug 115 of the power plug assembly 114 of FIG. 13, and FIG. 15B is an illustration of an enlarged side perspective view of the plug end 118 and the plug 115 of FIG. 15A, and showing the coupling element 134. As shown in FIGS. 15A-15B, the plug 115, such as the power plug 115*a*, preferably comprises the pin and sleeve plug 116. As shown in FIGS. 15A-15B, the plug 115 has the plug end 118, the coupling end 120, and the plug sleeve 122, or plug housing, disposed between the plug end 118 and the coupling end 120. As further shown in FIGS. 15A-15B, the plug sleeve 122, or plug housing, has the alignment slot 124, or alignment groove, formed in an exterior portion 125 of the plug sleeve 122. As shown in FIGS. 15A-15B, the length of the alignment slot 124, or alignment groove, runs along the plug sleeve 122 from the plug end 118 to the coupling end 120. The interior ridge 68 (see FIG. 10D) of the cap 52 (see FIG. 10D) is configured to mate with, or fit within, the alignment slot 124 of the plug sleeve 122, when the cap 52 (see FIG. 16B) is positioned over the plug end 118 and over the plug sleeve 122.

As shown in FIG. 15A, the plug 115 further comprises four (4) plug pins 126, or plug prongs, housed within the interior 128 of the plug sleeve 122, or plug housing. FIG. 15A shows the four (4) plug pins 126 projecting upwardly, or outwardly, from the interior base 130 within the interior 128 of the plug sleeve 122, or plug housing. The exemplary voltage and amperage ratings for the plug 115 with four (4) plug pins 126, shown in FIG. 15A, is 480 volt (V) 60 amp (A).

FIGS. 15A-15B further show the first end 145 and the collar portion 204 of the coupling element 134. FIG. 15B further shows the body 148 and the neck portion 205 of the coupling element 134.

Now referring to FIGS. 16A-16B, FIG. 16A is an illustration of a perspective view of a version of an access control assembly 10 of the disclosure, with the hinged ring 14 in the open position 28 and the cap 52 coupled to, and covering, the plug end 118 of the power plug assembly 114. FIG. 16B is an illustration of a perspective view of the access control assembly 10 of FIG. 16A, with the hinged ring 14 in the closed position 26 and locked in the locked position 86 around the cap 52 and the attached plug end 118 of the power plug assembly 114 of FIG. 16A, and showing a version of a locking element 84 in the form of a zip tie 90 locking together the first portion 22, such as the top portion 22*a*, and the second portion 24, such as the bottom portion 24*a*, of the hinged ring 14.

FIGS. 16A-16B show the access control assembly 10 with the hinged ring 14 comprising the first portion 22, such as the top portion 22*a*, pivotably connected to the second portion 24, such as the bottom portion 24*a*, at the hinged end 16, via the hinge pin 18. FIGS. 16A-16B further show the non-hinged end 20, such as the first portion non-hinged end 20*a*, of the first portion 22, and the second portion non-hinged end 20*b*, of the second portion 24. FIGS. 16A-16B further show the outer tabs 38, such as the first portion outer tab 38*a*, of the first portion 22, and the second portion outer tab 38*b*, of the second portion 24. As shown in FIG. 16A, the first portion outer tab 38*a* of the first portion 22 has the lockout hole 40, such as the first portion lockout hole 40*a*, and the second portion outer tab 38*b* of the second portion 24 has the lockout hole 40 (see also FIG. 16B), such as the second portion lockout hole 40*b*. FIG. 16B shows the aligned lockout holes 40*c* of the first portion 22 and the second portion 24. FIG. 16A further shows the interior cut-out portion 46 and the interior side 188*b* of the first portion 22, and shows the interior concave recessed portion 48 and the interior sides 198*b*, 198*c* of the second portion 24.

FIGS. 16A-16B further show the cap attachment hole 50 in the second portion outer tab 38*b* of the second portion 24, and show the first end 102 of the cap connector element 100, in the form of the plastic cable 110, inserted through the cap attachment hole 50 and attaching the cap 52 to the cap attachment hole 50 in the second portion outer tab 38*b* of the second portion 24. FIGS. 16A-16B further show the second end 104 of the cap connector element 100 inserted through the opening 62 through the attachment point tab 60 of the cap 52. FIG. 16A further shows the exterior portion 52*a* of the cap 52, the exterior portion 52*b* of the cap 52, and the exterior lip 58 of the cap 52.

FIGS. 16A-16B further show the power plug assembly 114 with the plug 115 (see FIG. 16B) covered by the cap 52, with the coupling element 134 having the collar portion 204 and the neck portion 205, and with the power cord 132 attached to the coupling element 134.

FIG. 16A shows the interior side 198*b* of the second portion 24 engaged with the exterior portion 52*b* of the cap 52 adjacent to a top end of the exterior lip 58 of the cap 52, with the hinged ring 14 in the open position 28. Further, as shown in FIG. 16A, the interior side 198*c* of the second portion 24 is engaged with the neck portion 205 of the coupling element 134 of the power plug assembly 114, with the hinged ring 14 in the open position 28. Further, as shown in FIG. 16A, the interior concave recessed portion 48 is engaged with the portion 58*a* of the exterior lip 58 of the cap 52, and is also engaged with the collar portion 204, with the hinged ring 14 in the open position 28.

FIG. 16B shows the plug end 118 of the plug 115 in the unplugged position 168 and covered with the cap 52. FIG. 16B further shows the interior concave recessed portion 48 of the second portion 24 engaged with the portion 58*a* of the exterior lip 58 of the cap 52, and with the collar portion 204 of the coupling element 134 of the power plug assembly 114, with the hinged ring 14 in the closed position 26 and in the locked position 86. The access control assembly 10 with the hinged ring 14 in the closed position 26 and in the locked position 86 around the plug 115 and the cap 52, as shown in FIG. 16B, provides connection prevention 174 (see FIG. 1) of the plug 115 in the unplugged position 168.

Figure 16C:
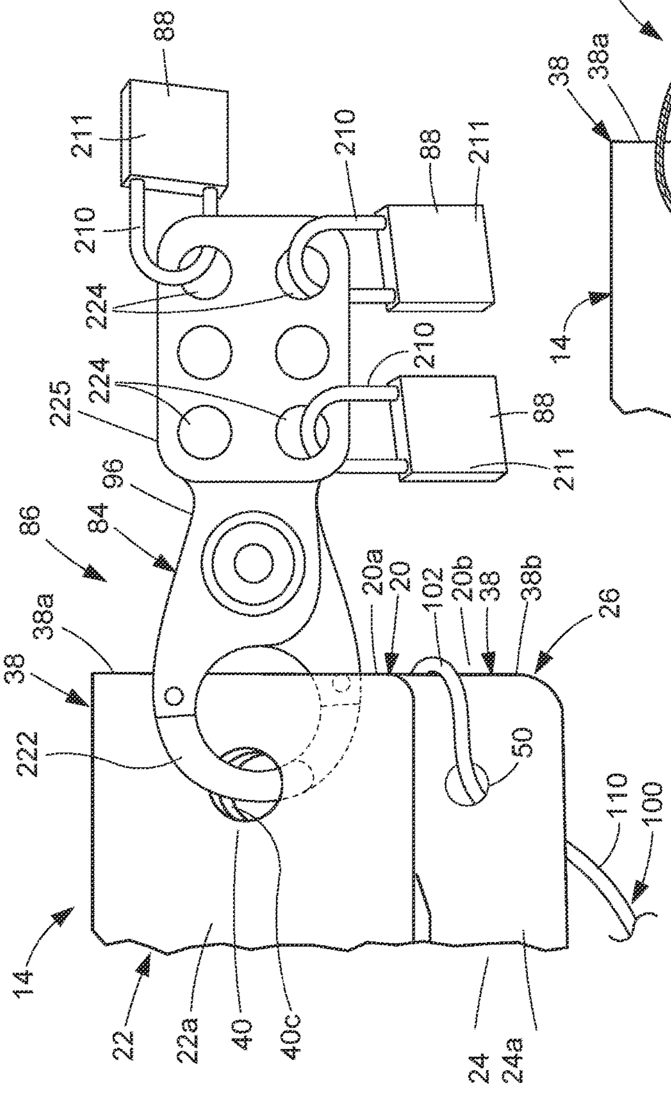
FIG. 16C is an illustration of a perspective view of another version of a locking element in the form of a lockout hasp with padlocks locking a hinged ring of an access control assembly in a closed position.

Now referring to FIG. 16C, FIG. 16C is an illustration of a perspective view of another version of a locking element 84 in the form of a lockout hasp 96 locking together the first portion 22, such as the top portion 22*a*, and the second portion 24, such as the bottom portion 24*a*, of the hinged ring 14 of the access control assembly 10 (see FIG. 16A) in the closed position 26 and in the locked position 86. FIG. 16C shows the lockout hasp 96 with a jaw portion 222 inserted through and locked around the lockout holes 40, such as the aligned lockout holes 40*c*, of the outer tabs 38, such as the first portion outer tab 38*a* and the second portion outer tab 38*b*, at the non-hinged end 20, such as the first portion non-hinged end 20*a* and the second portion non-hinged end 20*b*, of the first portion 22 and the second portion 24. As shown in FIG. 16C, the lockout hasp 96 has six (6) hasp holes 224 in a locking portion 225 of the lockout hasp 96 designed to accommodate six (6) different padlocks 88. FIG. 16C shows three (3) padlocks 88 each with a shackle 210 locked through a hasp hole 224 and locked to a padlock body 211. FIG. 16C shows three (3) hasp holes 224 of the locking portion 225 locked with the three (3) padlocks 88. FIG. 16C further shows the first end 102 of the cap connector element 100, such as the plastic cable 110, inserted through the cap attachment hole 50.

Figure 16D:
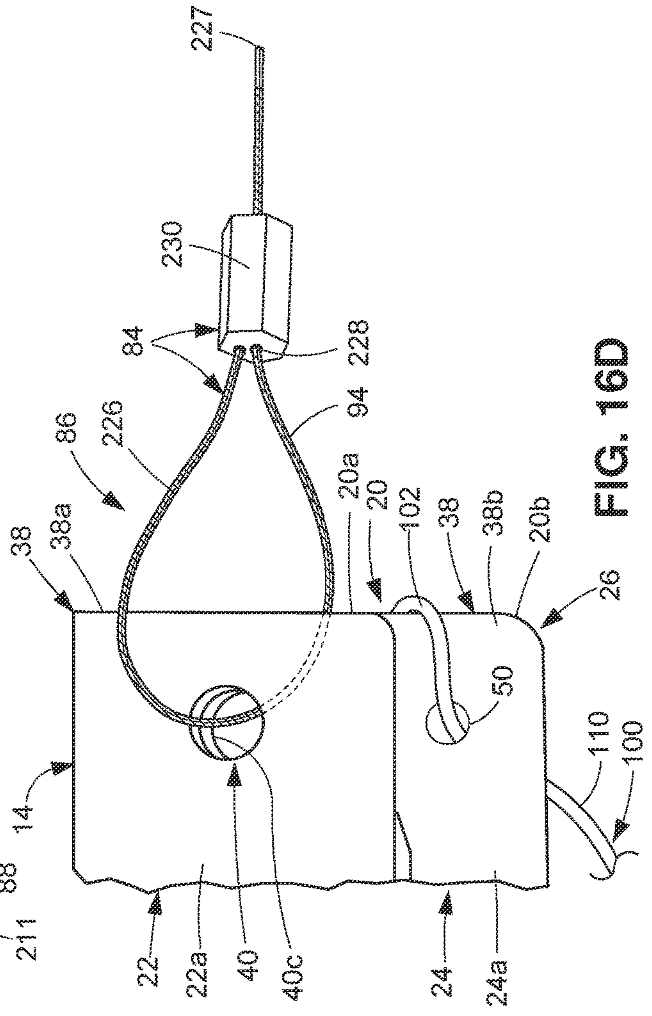
FIG. 16D is an illustration of a perspective view of yet another version of a locking element in the form of a cable seal locking a hinged ring of an access control assembly in a closed position.

Now referring to FIG. 16D, FIG. 16D is an illustration of a perspective view of yet another version of a locking element 84 in the form of a cable seal 94 locking together the first portion 22, such as the top portion 22*a*, and the second portion 24, such as the bottom portion 24*a*, of the hinged ring 14 of the access control assembly 10 (see FIG. 16A) in the closed position 26 and in the locked position 86.

FIG. 16D shows the cable seal 94 with a cable 226 inserted through and locked around the lockout holes 40, such as the aligned lockout holes 40*c*, of the outer tabs 38, such as the first portion outer tab 38*a* and the second portion outer tab 38*b*, at the non-hinged end 20, such as the first portion non-hinged end 20*a* and the second portion non-hinged end 20*b*, of the first portion 22 and the second portion 24. As shown in FIG. 16D, an end 227 of the cable 226 of the cable seal 94 is looped through the lockout holes 40 and inserted and threaded into an opening 228 in a lock portion 230 and pulled tight to secure the cable 226 in the lock portion 230. FIG. 16D further shows the first end 102 of the cap connector element 100, such as the plastic cable 110, inserted through the cap attachment hole 50.

Now referring to FIGS. 17A-17C, FIGS. 17A-17C show a version of the access control system 12 with a version of the access control assembly 10 of the disclosure, locking the power outlet 150 and the plug end 118 (see FIG. 15A) of the plug 115 (see FIG. 15A) plugged into the power outlet 150 on a power cart 164, to prevent disconnection or unplugging of the plug end 118 of the plug 115 from the power outlet 150.

FIG. 17A is an illustration of a perspective view of a version of the access control system 12 with the access control assembly 10 of the disclosure, where the hinged ring 14 is in the closed position 26 and the locked position 86 locked around the power outlet 150, such as a first upper power outlet 150*d*, on the power cart 164, and around the plug end 118 (see FIG. 15A) of the plug 115 (see FIG. 15A) of the power plug assembly 114, such as a first power plug assembly 114*a*, plugged into the first upper power outlet 150*d*. As shown in FIG. 17A, the hinged power outlet cover plate 154 of the power outlet 150 is in the open position 192. FIG. 17A further shows another power outlet 150, such as a second upper power outlet 150*e*, and lower power outlets 150*c*.

FIG. 17A shows the power plug assembly 114, such as the first power plug assembly 114*a*, comprising the power cord 132 coupled to the coupling element 134, which is coupled to the plug 115 (see FIG. 15A), which is in the plugged-in position 170. FIG. 17A further shows another power plug assembly 114, such as a second power plug assembly 114*b*.

FIG. 17A further shows the hinged ring 14 in the closed position 26 and the locked position 86, and the first portion 22, such as the top portion 22*a*, and the second portion 24, such as the bottom portion 24*a*, joined together at the hinged end 16. FIG. 17A shows the cap 52 attached to the hinged ring 14 via the cap connector element 100 in the form of a plastic cable 110. Aa shown in FIG. 17A, the first end 102 of the plastic cable 110 is attached to the opening 62 in the attachment point tab 60 of the cap 52, and the second end 104 of the plastic cable 110 is attached to the cap attachment hole 50 through the outer tab 38 of the hinged ring 14. As shown in FIG. 17A, the cap 52 further includes the first end 54 with the exterior lip 58, the second end 56, and the internal cavity 64.

FIG. 17A further shows the locking element 84, such as a zip tie 90, inserted through the lockout holes 40 of the first portion 22, such as the top portion 22*a*, and the second portion 24, such as the bottom portion 24*a*, of the hinged ring 14. FIG. 17A further shows the power source 144, such as the electrical power source 144*a*.

FIG. 17B is an illustration of a side perspective view of the access control system 12 and the access control assembly 10 of FIG. 17A, showing the hinged ring 14 locked around the power outlet 150, such as the first upper power outlet 150*d*, on the power cart 164, and around the plug end 118 (see FIG. 15A) of the plug 115 (see FIG. 15A) of the power plug assembly 114, such as the first power plug assembly, of FIG. 17A. As shown in FIG. 17B, the hinged power outlet cover plate 154 of the power outlet 150 is in the open position 192. An inlet end 165 (see FIG. 17B) of the power outlet 150 connects with the power source 144, such as an electrical power source 144*a* (see FIGS. 14A-14B), in the form of the power cart 164. FIG. 17B further shows lower power outlets 150*c* with the hinged power outlet cover plates 154, such as the spring-loaded hinged power outlet cover plate 154*a*, in the closed position 194.

FIG. 17B shows the hinged ring 14 in the closed position 26 and the locked position 86 locked around the power outlet 150, such as a first upper power outlet 150*d*, on the power cart 164, and around the plug end 118 (see FIG. 15A) of the plug 115 (see FIG. 15A) of the power plug assembly 114, such as a first power plug assembly 114*a*, plugged into the first upper power outlet 150*d*. As shown in FIG. 17B, with the plug end 118 (see FIG. 15A) of the plug 115 (see FIG. 15A) plugged into the power outlet 150 in the plugged-in position 170, and with the hinged ring 14 in the closed position 26 and in the locked position 86, the interior concave recessed portion 48 of the second portion 24, such as the bottom portion 24*a*, receives, and is engaged with, an exterior portion 150*a* of the power outlet 150, an exterior collar portion 204*a* of the coupling element 134, and an exterior portion 122*a* of the plug sleeve 122 housing the plug pins 126 (see FIG. 15A). Further, as shown in FIG. 17B, the interior side 198*c* of the second portion 24 is engaged with a neck portion 205*a* of the coupling element 134. Further, the interior side 188*b* (see FIG. 17B) is adjacent to the exterior portion 150*a* (see FIG. 17B) of the power outlet 150 (see FIG. 17B), with the hinged ring 14 (see FIG. 17B) in the closed position 26 (see FIG. 17B) and in the locked position 86 (see FIG. 17B) around the exterior portion 150*a* of the power outlet 150 and around the plug end 118 (see FIG. 15A) of the plug 115 (see FIG. 15A), with the plug 115 in the plugged-in position 170 (see FIG. 17B).

FIG. 17B shows the power plug assembly 114, such as the first power plug assembly 114*a*, comprising the power cord 132 (see FIG. 17B) coupled to the coupling element 134, which is coupled to the plug 115 (see FIG. 15A), which is in the plugged-in position 170.

FIG. 17B further shows the first portion 22, such as the top portion 22*a*, and the second portion 24, such as the bottom portion 24*a*, joined together at the hinged end 16, via the hinge pin 18. FIG. 17B shows the cap 52 attached to the hinged ring 14, via the cap connector element 100 in the form of a plastic cable 110. Aa shown in FIG. 17B, the first end 102 of the plastic cable 110 is attached to the opening 62 in the attachment point tab 60 of the cap 52, and the second end 104 of the plastic cable 110 is attached to the cap attachment hole 50 of the hinged ring 14. As shown in FIG. 17B, the cap 52 further includes the first end 54 with the exterior lip 58, the second end 56 with the drain holes 70, and the internal cavity 64.

FIG. 17C is an illustration of a side perspective view of the access control system 12 and the access control assembly 10 of FIG. 17A, showing the hinged ring 14 locked around the power outlet 150, such as a second upper power outlet 150*e*, in the form of the pin and sleeve power outlet 152, on the power cart 164, and around the plug end 118 (see FIG. 5A) of the plug 115 (see FIG. 5A) of the power plug assembly 114, such as a second power plug assembly 114*b*, of FIG. 17A. As shown in FIG. 17C, the hinged power outlet cover plate 154 of the power outlet 150 is in the open position 192. As further shown in FIG. 17C, the interior cut-out portion 46 of the first portion 22, such as the top portion 22*a*, provides clearance for the hinged power outlet cover plate 154 coupled to the power outlet 150, when the hinged power outlet cover plate 154 is in the open position 192 with the plug end 118 (see FIG. 15A) of the plug 115 (see FIG. 15A) plugged into the power outlet 150 in the plugged-in position 170, and with the hinged ring 14 locked around the plug end 118 and around the exterior portion 150*a* of the power outlet 150. FIG. 17C further shows the lower power outlets 150*c* with the hinged power outlet cover plates 154, such as the spring-loaded hinged power outlet cover plate 154*a*, in the closed position 194.

FIG. 17C shows the power plug assembly 114, such as the second power plug assembly 114*b*, comprising the power cord 132 coupled to the coupling element 134, which is coupled to the plug 115 (see FIG. 15A).

FIG. 17C further shows the hinged ring 14 in the closed position 26 and the locked position 86, and the first portion 22, such as the top portion 22*a*, and the second portion 24, such as the bottom portion 24*a*, joined together at the hinged end 16, via the hinge pin 18. FIG. 17C shows the cap 52 attached to the hinged ring 14 via the cap connector element 100 in the form of a plastic cable 110. The first end 102 of the plastic cable 110 is attached to the opening 62 in the attachment point tab 60 of the cap 52. As shown in FIG. 17C, the cap 52 includes the first end 54 with the exterior lip 58, the second end 56, and the internal cavity 64 with the interior ridge 68. FIG. 17C further shows the power source 144, such as the electrical power source 144*a*.

The access control assembly 10 with the hinged ring 14 in the closed position 26 and in the locked position 86 around the plug 115 and the power outlet 150, as shown in FIGS. 17A-17C, provides disconnection prevention 175 (see FIG. 1) of the plug 115 in the plugged-in position 170 from being disconnected from the power outlet 150.

Figure 18:
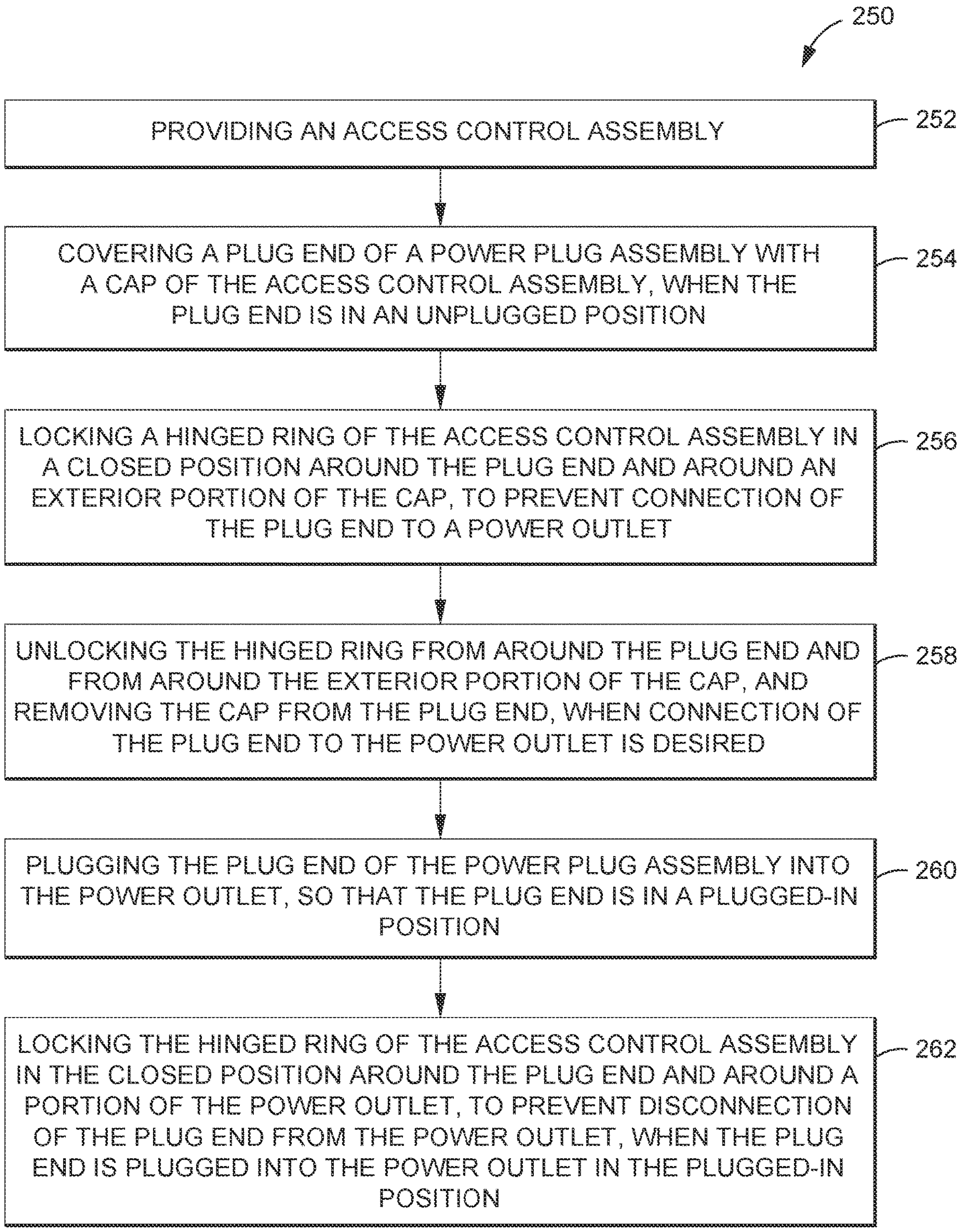
FIG. 18 is an illustration of a flow diagram of an exemplary version of a method of the disclosure.

Now referring to FIG. 18, FIG. 18 is an illustration of a flow diagram of an exemplary version of a method 250 of the disclosure. In another version of the disclosure, there is provided the method 250 for controlling access to a plug end 118 (see FIGS. 1, 15A, 16B) of a power plug assembly 114 (see FIGS. 1, 13, 16B) using an access control assembly 10 (see FIGS. 1, 12A, 16B), as discussed in detail above.

The blocks in FIG. 18 represent operations and/or portions thereof, or elements, and lines connecting the various blocks do not imply any particular order or dependency of the operations or portions thereof, or elements. FIG. 18 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 18, the method 250 comprises the step of providing 252 the access control assembly 10 (see FIGS. 1, 12A, 16B). The access control assembly 10 comprises the hinged ring 14 (see FIGS. 1, 2A, 3A) having the first portion 22 (see FIGS. 1, 2A, 3A, 4A), such as the top portion 22*a* (see FIGS. 1, 2A, 3A, 4A) pivotably connected to the second portion 24 (see FIGS. 1, 2A, 3A, 5A), such as the bottom portion 24*a* (see FIGS. 1, 2A, 3A, 5A), via a hinge pin 18 (see FIGS. 1, 3A) at the hinged end 16 (see FIGS. 1, 3A), so that the first portion 22, such as the top portion 22*a*, pivots toward and away from the second portion 24, such as the bottom portion 24*a*, to close and open the hinged ring 14. The first portion 22, such as the top portion 22*a*, and the second portion 24, such as the bottom portion 24*a*, each have one or more lockout holes 40 (see FIGS. 3A, 6A) formed through the outer tab 38 (see FIGS. 2B, 3A, 6A) at the non-hinged end 20 (see FIGS. 2B, 3A, 6A). The second portion 24, such as the bottom portion 24*a*, has the interior concave recessed portion 48 (see FIGS. 3A, 5C) and the cap attachment hole 50 (see FIGS. 2C, 3A, 5C), wherein when the hinged ring 14 is in the closed position 26 (see FIG. 2A), the first portion 22, such as the top portion 22*a*, and the second portion 24, such as the bottom portion 24*a*, define a circular opening 30 (see FIG. 2A). The outer tabs 38 (see FIG. 2B) of the first portion 22, such as the top portion 22*a*, and the second portion 24, such as the bottom portion 24*a*, abut against each other, and the one or more lockout holes 40 (see FIG. 2B) of the first portion 22, such as the top portion 22*a*, and the second portion 24, such as the bottom portion 24*a*, are aligned as aligned lockout holes 40*c* (see FIG. 2B).

The access control assembly 10 further comprises one or more locking elements 84 (see FIGS. 1, 12A, 16B-16D) configured to be inserted through the one or more aligned lockout holes 40*c* (see FIGS. 16B-16D) of the first portion 22, such as the top portion 22*a*, and the second portion 24, such as the bottom portion 24*a*, to lock the hinged ring 14 in the closed position 26 (see FIGS. 16B-16D) and in the locked position 86 (see FIGS. 16B-16D).

The access control assembly 10 further comprises the cap 52 (see FIGS. 1, 10A-10D, 11A-11B) having the internal cavity 64 (see FIGS. 1, 10B) with the interior ridge 68 (see FIGS. 1, 10B) and having the exterior lip 58 (see FIGS. 1, 10A) around the first end 54 (see FIG. 10A) of the cap 52. The exterior lip 58 has the attachment point tab 60 (see FIGS. 1, 10A) extending outwardly from the exterior lip 58, and the attachment point tab 60 comprises the opening 62 (see FIG. 10A).

The access control assembly 10 further comprises the cap connector element 100 (see FIGS. 1, 12A) having the first end 102 (see FIG. 12A) connected to the attachment point tab 60 (see FIG. 12A) of the cap 52 (see FIG. 12A) and having the second end 104 (see FIG. 12A) connected to the cap attachment hole 50 on the second portion 24 (see FIG. 12A), such as the bottom portion 24*a* (see FIG. 12A) of the hinged ring 14 (see FIG. 12A). As shown in FIG. 1, and discussed above, the cap connector element 100 may comprise the aramid braided cord 106, the plastic coated wire 108, the plastic cable 110, the plastic rope 112, or another suitable cap connector element.

As shown in FIG. 18, the method 250 further comprises the step of covering 254 the plug end 118 (see FIG. 16B) of the power plug assembly 114 (see FIG. 16B) with the cap 52 (see FIG. 16*b*), when the plug end 118 is in the unplugged position 168 (see FIG. 16B). The step of covering 254 the plug end 118 with the cap 52 may further comprise the steps of, mating the plug end 118 with the internal cavity 64 of the cap 52, and mating the interior ridge 68 of the cap 52 with an alignment slot 124 on a plug sleeve 122 of the plug 115.

As shown in FIG. 18, the method 250 further comprises the step of locking 256 the hinged ring 14 of the access control assembly 10 in the closed position 26 around the plug end 118 and around an exterior portion 52*a* of the cap 52, to prevent connection of the plug end 118 to a power outlet 150.

As shown in FIG. 18, the method 250 further comprises the step of unlocking 258 the hinged ring 14 from around the plug end 118 and from around the exterior portion 52*a* of the cap 52, and removing the cap 52 from the plug end 118, when connection of the plug end 118 to the power outlet 150 is desired.

As shown in FIG. 18, the method 250 further comprises the step of plugging 260 the plug end 118 of the power plug assembly 114 into the power outlet 150, so that the plug end 118 is in the plugged-in position 170 to create an electrical connection 172 (see FIG. 1). The step of plugging 260 the plug end 118 into the power outlet 150 further comprises, plugging the plug end 118 into the power outlet 150, wherein the power outlet 150 is coupled to the power source 144 (see FIG. 1) comprising one of, a power cart 164 (see FIGS. 1, 13, 17A), a power station 176 (see FIG. 1), a power strip 178 (see FIG. 1), a power generator 180 (see FIG. 1)), electrical wiring 182 (see FIG. 1) in a wall 184 (see FIG. 1) of a structure 185 (see FIG. 1), or another suitable power source.

As shown in FIG. 18, the method 250 further comprises the step of locking 262 the hinged ring 14 of the access control assembly 10 in the closed position 26 around the plug end 118 and around an exterior portion 150*a* of the power outlet 150, to prevent disconnection of the plug end 118 from the power outlet 150, when the plug end 118 is plugged into the power outlet 150 in the plugged-in position 170. The step of locking 262 the hinged ring 14 in the closed position 26 around the plug end 118 and around the exterior portion 150*a* of the power outlet 150 may further comprise the step of, providing clearance, with an interior cut-out portion 46 (see FIG. 3A) of the first portion 22, such as the top portion 22*a*, for a hinged power outlet cover plate 154 (see FIG. 17C) coupled to the power outlet 150 (see FIG. 17C), when the hinged power outlet cover plate 154 is in an open position 192 (see FIG. 17C) with the plug end 118 plugged into the power outlet 150.

The method 250 may further comprise the steps of, unlocking the hinged ring 14 from around the plug end 118 and from around the exterior portion 150*a* of the power outlet 150, unplugging the plug end 118 from the power outlet 150, so that the plug end 118 is in the unplugged position 168, covering the plug end 118 with the cap 52, and locking the hinged ring 14 in the closed position 26 around the plug end 118 and around the exterior portion 52*a* of the cap 52, to prevent connection of the plug end 118 to the power outlet 150.

The method 250 may further comprise, prior to the step of providing the access control assembly 10, the step of, manufacturing the hinged ring 14 and the cap 52 with a manufacturing process 78 (see FIG. 1) comprising one of, a three-dimensional (3D) printing process 80 (see FIG. 1), an injection molding process 82 (see FIG. 1), or another suitable manufacturing process.

Figure 19:
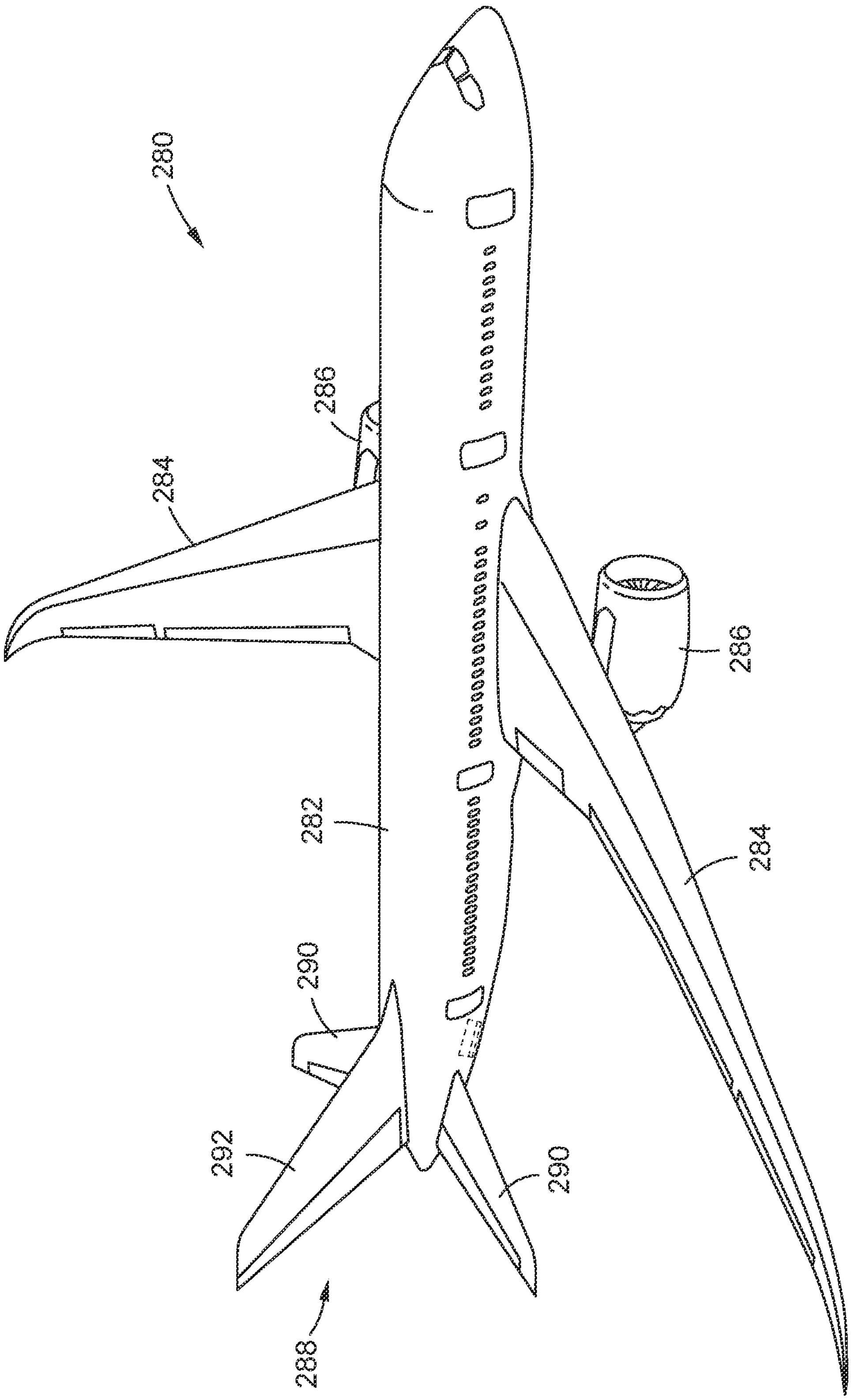
FIG. 19 is an illustration of a perspective view of an aircraft in which versions of an access control system having an access control assembly of the disclosure may be used when the aircraft is in different stages of production, service, or maintenance.

Now referring to FIG. 19, FIG. 19 is an illustration of a perspective view of an aircraft 280, in which versions of the access control system 12 (see FIG. 1) having the access control assembly 10 (see FIG. 1) of the disclosure may be used, when the aircraft 280 is in different stages of production, service, or maintenance. As shown in FIG. 19, the aircraft 280 comprises the fuselage 282, wings 284, and engines 286. In addition, as shown in FIG. 19, the aircraft 280 comprises a tail 288, including horizontal stabilizers 290 and a vertical stabilizer 292.

Although the aircraft 280 shown in FIG. 19 is generally representative of a commercial passenger aircraft, the teachings of the disclosed versions may be used with other passenger aircraft. For example, the teachings of the disclosed versions may be used with cargo aircraft, military aircraft, rotorcraft, and other types of aircraft or aerial vehicles, as well as other vehicles and architectural structures, such as buildings, warehouses, towers, and other structures.

Figure 21:
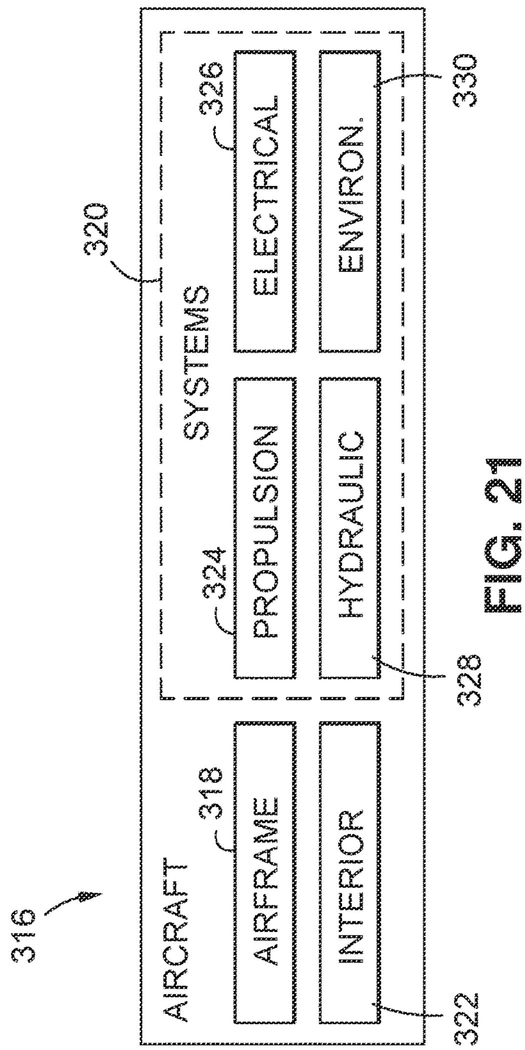
FIG. 21 is an illustration of an exemplary block diagram of an aircraft.
Figure 20:
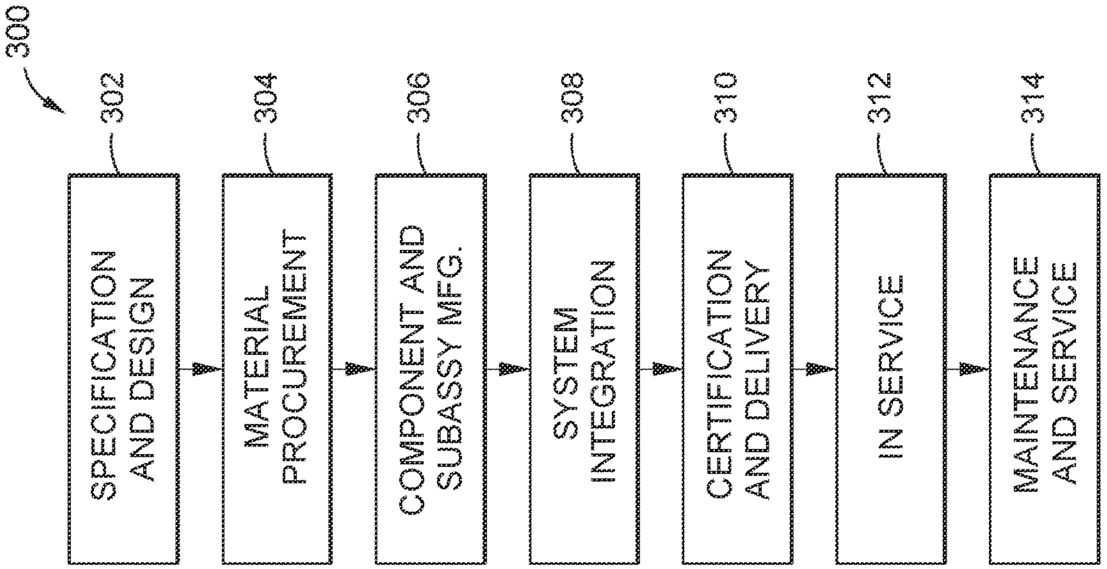
FIG. 20 is an illustration of a flow diagram of an exemplary aircraft manufacturing and service method.

Now referring to FIGS. 20 and 21, FIG. 20 is an illustration of a flow diagram of an exemplary aircraft manufacturing and service method 300, and FIG. 21 is an illustration of an exemplary block diagram of an aircraft 316. Referring to FIGS. 20 and 21, versions of the disclosure may be described in the context of the aircraft manufacturing and service method 300 as shown in FIG. 20, and the aircraft 316 as shown in FIG. 21.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 21, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the access control assembly 10 (see FIG. 1), the access control system 12 (see FIG. 1), and the method 250 (see FIG. 18) provide an improved access control assembly 10, access control system 12, and method 250 to lock a plug end 118 (see FIG. 15A) of a plug 115 (see FIG. 15A) of a power plug assembly 114 (see FIGS. 13, 16A-16B) to a power outlet 150 (see FIGS. 13, 17A-17C) in a plugged-in position 170 (see FIG. 1) on a power source 144 (see FIG. 1), such as a power cart 164 (see FIGS. 1, 13, 17A-17C), a power station 176 (see FIG. 1), a power strip 178 (see FIG. 1), a power generator 180 (see FIG. 1), electrical wiring 182 (see FIG. 1) in a wall 184 (see FIG. 1) of a structure 185 (see FIG. 1), or another suitable power source 144, to provide disconnection prevention 175 (see FIG. 1), to prevent electrical shock from unintentional disconnection and to avoid risk of an arc flash if proper power down procedures are not followed, to prevent unwanted energization of equipment during maintenance or service, and to provide locking out access to disconnecting the power feed from the power cart 164. Moreover, the improved access control assembly 10, access control system 12, and method 250 ensure only qualified personnel can connect and disconnect plug ends 118 of plugs 115 of power cords 132 (see FIGS. 13, 17A-17B) to and from the power sources 144, such as power carts 164, used to provide power to vehicles, such as aircraft 280 (see FIG. 19), or other suitable vehicles or structures. The hinged ring 14 (see FIG. 2A) of the access control assembly 10 (see FIG. 1) also has a first portion 22 (see FIGS. 2A, 3A), such as a top portion 22*a* (see FIGS. 2A, 3A) having an interior cut-out portion 46 (see FIG. 3A) that allows for clearance of a hinged power outlet cover plate 154 (see FIGS. 17A-17C) connected to the power outlet 150, when the plug end 118 of the plug 115 is plugged into the power outlet 150 in the plugged-in position 170.

In addition, disclosed versions of the access control assembly (see FIG. 1), the access control system 12 (see FIG. 1), and the method 250 (see FIG. 18) provide an improved access control assembly 10, access control system 12, and method 250 to provide connection prevention 174 (see FIG. 1), and to prevent the plug ends 118 of plugs 115 of power plug assemblies 114 from mistakenly being plugged into a power source 144, such as a power cart 164, or another type of power source. The access control assembly 10 provides lockout to the plug end 118 of the plug 115 of the power plug assembly 114 (see FIG. 16B) to prevent the plug end 118 of the plug 115 from being plugged into the power source 144, such as the power cart 164. The hinged ring 14 is configured to be closed around the cap 52 (see FIG. 16B) in the closed position 26 (see FIG. 16B) and in the locked position 86 (see FIG. 16B), and secured with a locking element 84 (see FIGS. 1, 12A) through the lockout holes 40 (see FIGS. 3A, 16B-16D).

The access control assembly 10 (see FIG. 1) comprises the hinged ring 14 (see FIGS. 1, 2A, 3A) with the first portion 22 (see FIG. 3A), such as the top portion 22*a* (see FIG. 3A), hingedly connected to the second portion 24 (see FIG. 3A), such as the bottom portion 24*a* (see FIG. 3A), via a hinge pin 18 (see FIG. 3A). The hinged ring 14 is smaller and lighter weight, as compared to known devices. The hinged ring 14 has a clamshell design to secure the plug end 118 of the plug 115 and the power cord 132 of the power plug assembly 114 to the power source 144, such as the power cart 164 (see FIGS. 13, 17A-17C), and to also secure the cap 52 to the plug end 118 (see FIG. 16B) of the plug 115, when the plug end 118 of the plug 115 of the power plug assembly 114 is not in use and is in the unplugged position 168 (see FIG. 16B).

The access control assembly 10 (see FIG. 1) comprises the cap 52 secured to the hinged ring 14, via the cap connector element 100 (see FIG. 12A), such as an aramid braided cord 106 (see FIGS. 1, 12A), a plastic coated wire 108 (see FIG. 1), a plastic cable 110 (see FIGS. 1, 17A), a plastic rope 112 (see FIG. 1), or another suitable cap connector element. The cap 52 (see FIG. 10B) has an internal cavity 64 (see FIG. 10B) that mates with the plug end 118 of the plug 115 of the power plug assembly 114 (see FIG. 16B). The cap 52 has the exterior lip 58 (see FIGS. 10B, 16B), or ridge, around the external diameter, such that the interior cut-out portion 46 (see FIG. 3A) of the first portion 22 (see FIG. 16B), such as the top portion 22*a* (see FIG. 16B), of the hinged ring 14 engages with the exterior lip 58 of the cap 52. The first portion 22, such as the top portion 22*a*, has the interior cut-out portion 46 around the interior diameter of the first portion 22.

The access control assembly 10 further comprises the locking element 84, such as one or more padlocks 88 (see FIGS. 1, 12A), one or more zip ties 90 (see FIGS. 1, 16B), one or more cable ties 92 (see FIG. 1), one or more cable seals 94 (see FIGS. 1, 16D), one or more lockout hasps 96 (see FIGS. 1, 16C), one or more lockout tagout devices 98 (see FIG. 1), one or more lockout tagout cable tags 98*a* (see FIG. 1), or another suitable locking element. The locking element 84 is attached to the aligned lockout holes 40*c* (see FIGS. 16B-16D) on the outer tab 38 (see FIGS. 16B-16D) of the hinged ring 14, when the hinged ring 14 is in the closed position 26 (see FIG. 16B) to lock the hinged ring 14 in the closed position 26 and in the locked position 86 (see FIGS. 16B-16D). A locking element 84 is inserted into the lockout holes 40 on the hinged ring 14 to lock out the device.

Thus, disclosed versions of the access control assembly 10 (see FIG. 1), the access control system 12 (see FIG. 1), and the method 250 (see FIG. 18) provide an improved access control assembly 10, access control system 12, and method 250 to both secure and lockout the plug end 118 of the plug 115, when the plug 115 is connected to the power outlet 150 in the plugged-in position 170 (see FIG. 1) on the power cart 164, and when the plug end 118 of the plug 115 is disconnected in the unplugged position 168 (see FIG. 16B) and not connected to the power source 144, such as the power cart 164 (see FIGS. 1, 13, 17A).

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. An access control assembly for controlling access to a plug end of a power plug assembly, the access control assembly comprising:

a hinged ring having a first portion pivotably connected to a second portion, via a hinge pin at a hinged end, so that the first portion pivots toward and away from the second portion to close and open the hinged ring, the first portion and the second portion each having one or more lockout holes formed through an outer tab at a non-hinged end, and the second portion having an interior concave recessed portion and a cap attachment hole, wherein when the hinged ring is in a closed position, the first portion and the second portion define a circular opening, the outer tabs of the first portion and the second portion abut against each other, and the one or more lockout holes of the first portion and the second portion are aligned as aligned lockout holes;

one or more locking elements configured to be inserted through one or more of the aligned lockout holes of the first portion and the second portion, to lock the hinged ring in the closed position;

a cap having an internal cavity with an interior ridge and having an exterior lip around a first end of the cap, the exterior lip having an attachment point tab extending outwardly from the exterior lip; and a cap connector element having a first end connected to the attachment point tab of the cap and having a second end connected to the cap attachment hole on the second portion of the hinged ring, wherein the access control assembly controls access to the plug end of the power plug assembly, by preventing connection of the plug end to a power outlet, when the plug end is in an unplugged position with the cap covering the plug end, and the hinged ring is locked around the plug end and around an exterior portion of the cap, and by preventing disconnection of the plug end from the power outlet, when the plug end is plugged into the power outlet in a plugged-in position and the hinged ring is locked around the plug end and around an exterior portion of the power outlet.

2. The access control assembly of claim 1, wherein the first portion and the second portion each has a semi-circular profile.

3. The access control assembly of claim 1, wherein the hinged ring and the cap are manufactured with a manufacturing process comprising one of a three-dimensional printing process, or an injection molding process.

4. The access control assembly of claim 1, wherein the hinged ring and the cap are made of one or more of, a thermoplastic material, a thermoplastic resin, polyetherimide, acrylonitrile butadiene styrene, polyether ether ketone, acetal, polyethylene, polyester, polyethylene terephthalate, nylon, a thermoset material, a thermoset plastic, a thermoset resin, a composite plastic, a fiber-reinforced plastic, a carbon fiber-reinforced plastic, a glass fiber-reinforced plastic, and fiberglass.

5. The access control assembly of claim 1, wherein the hinged ring and the cap are made of a non-conductive material.

6. The access control assembly of claim 1, wherein the first portion and the second portion have a same number of lockout holes in a range of from one lockout hole to eight lockout holes.

7. The access control assembly of claim 1, wherein the one or more locking elements comprise one or more of, one or more padlocks, one or more zip ties, one or more cable ties, one or more cable seals, one or more lockout hasps, one or more lockout tagout devices, and one or more lockout tagout cable tags.

8. The access control assembly of claim 1, wherein the cap further comprises one or more drain holes formed through a second end of the cap.

9. The access control assembly of claim 1, wherein the cap connector element comprises an aramid braided cord, a plastic coated wire, a plastic cable, or a plastic rope.

10. An access control system for controlling access to a plug end of a power plug assembly, the access control system comprising:

a power outlet coupled to a power source;

the power plug assembly comprising a plug with the plug end configured to be plugged into the power outlet in a plugged-in position to create an electrical connection, and the power plug assembly further comprising a power cord, and a coupling element coupling the power cord to the plug; and an access control assembly comprising:

a hinged ring having a first portion pivotably connected to a second portion, via a hinge pin at a hinged end, so that the first portion pivots toward and away from the second portion to close and open the hinged ring, the first portion and the second portion each having one or more lockout holes formed through an outer tab at a non-hinged end, and the second portion having an interior concave recessed portion and a cap attachment hole, wherein when the hinged ring is in a closed position, the first portion and the second portion define a circular opening, the outer tabs of the first portion and the second portion abut against each other, and the one or more lockout holes of the first portion and the second portion are aligned as aligned lockout holes;

one or more locking elements configured to be inserted through one or more of the aligned lockout holes of the first portion and the second portion, to lock the hinged ring in the closed position;

a cap having an internal cavity with an interior ridge and an exterior lip around a first end of the cap, the exterior lip having an attachment point tab extending outwardly from the exterior lip; and a cap connector element having a first end connected to the attachment point tab of the cap and having a second end connected to the cap attachment hole on the second portion of the hinged ring, wherein the access control assembly controls access to the plug end of the power plug assembly by preventing disconnection of the plug end from the power outlet, when the plug end is plugged into the power outlet in the plugged-in position and the hinged ring is locked around the plug end and around an exterior portion of the power outlet.

11. The access control system of claim 10, wherein the power outlet is coupled to the power source comprising one of, a power cart, a power station, a power strip, a power generator, or electrical wiring in a wall of a structure.

12. The access control system of claim 10, wherein the first portion further has an interior cut-out portion configured to provide clearance for a hinged power outlet cover plate coupled to the power outlet, when the hinged power outlet cover plate is in an open position with the plug end plugged into the power outlet and the hinged ring locked around the plug end and around the exterior portion of the power outlet.

13. The access control system of claim 10, wherein the one or more locking elements comprise one or more of, one or more padlocks, one or more zip ties, one or more cable ties, one or more cable seals, one or more lockout hasps, one or more lockout tagout devices, and one or more lockout tagout cable tags.

14. The access control system of claim 10, wherein the power outlet comprises a pin and sleeve outlet, and the plug comprises a pin and sleeve plug.

15. A method for controlling access to a plug end of a power plug assembly using an access control assembly, the method comprising the steps of:

providing the access control assembly comprising:

a hinged ring having a first portion pivotably connected to a second portion, via a hinge pin at a hinged end, so that the first portion pivots toward and away from the second portion to close and open the hinged ring, the first portion and the second portion each having one or more lockout holes formed through an outer tab at a non-hinged end, and the second portion having an interior concave recessed portion and a cap attachment hole, wherein when the hinged ring is in a closed position, the first portion and the second portion define a circular opening, the outer tabs of the first portion and the second portion abut against each other, and the one or more lockout holes of the first portion and the second portion are aligned as aligned lockout holes;

one or more locking elements configured to be inserted through one or more of the aligned lockout holes of the first portion and the second portion, to lock the hinged ring in the closed position;

a cap having an internal cavity with an interior ridge and having an exterior lip around a first end of the cap, the exterior lip having an attachment point tab extending outwardly from the exterior lip; and a cap connector element having a first end connected to the attachment point tab of the cap and having a second end connected to the cap attachment hole on the second portion of the hinged ring;

covering the plug end of the power plug assembly with the cap when the plug end is in an unplugged position;

locking the hinged ring of the access control assembly in the closed position around the plug end and around an exterior portion of the cap, to prevent connection of the plug end to a power outlet;

unlocking the hinged ring from around the plug end and from around the exterior portion of the cap, and removing the cap from the plug end, when the connection of the plug end to the power outlet is desired;

plugging the plug end of the power plug assembly into the power outlet, so that the plug end is in a plugged-in position to create an electrical connection; and locking the hinged ring of the access control assembly in the closed position around the plug end and around an exterior portion of the power outlet, to prevent disconnection of the plug end from the power outlet, when the plug end is plugged into the power outlet in the plugged-in position.

16. The method of claim 15, wherein the method further comprises the steps of:

unlocking the hinged ring from around the plug end and from around the exterior portion of the power outlet;

unplugging the plug end from the power outlet, so that the plug end is in the unplugged position;

covering the plug end with the cap; and locking the hinged ring in the closed position around the plug end and around the exterior portion of the cap, to prevent the connection of the plug end to the power outlet.

17. The method of claim 15, wherein the method further comprises, prior to the step of providing the access control assembly, the step of:

manufacturing the hinged ring and the cap with a manufacturing process comprising one, of a three-dimensional printing process, or an injection molding process.

18. The method of claim 15, wherein the step of covering the plug end with the cap further comprises the steps of:

mating the plug end with the internal cavity of the cap; and mating the interior ridge of the cap with an alignment slot on a plug sleeve of a plug.

19. The method of claim 15, wherein the step of plugging the plug end into the power outlet further comprises plugging the plug end into the power outlet, wherein the power outlet is coupled to a power source comprising one of, a power cart, a power station, a power strip, a power generator, or electrical wiring in a wall of a structure.

20. The method of claim 15, wherein the step of locking the hinged ring in the closed position around the plug end and around the exterior portion of the power outlet further comprises the step of:

providing clearance, with an interior cut-out portion of the first portion, for a hinged power outlet cover plate coupled to the power outlet, when the hinged power outlet cover plate is in an open position with the plug end plugged into the power outlet.

* * * * *